US012063933B1

(12) United States Patent
Chang et al.

(10) Patent No.: US 12,063,933 B1
(45) Date of Patent: Aug. 20, 2024

(54) ANTIMICROBIAL COMPOSITIONS INCLUDING COPPER(I) SALTS AND ADDITIVES

(71) Applicant: CORNING INCORPORATED, Corning, NY (US)

(72) Inventors: Theresa Chang, Painted Post, NY (US); Johnathan David Jr. Culpepper, Painted Post, NY (US); Huayun Deng, Painted Post, NY (US); Shu Yuan, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/224,348

(22) Filed: Jul. 20, 2023

(51) Int. Cl.
    *A01N 59/20* (2006.01)
    *A01N 25/08* (2006.01)
    *A01N 25/22* (2006.01)

(52) U.S. Cl.
    CPC ............ *A01N 59/20* (2013.01); *A01N 25/08* (2013.01); *A01N 25/22* (2013.01)

(58) Field of Classification Search
    CPC ......... A01N 59/20; A01N 25/08; A01N 25/22
    See application file for complete search history.

(56) References Cited

U.S. PATENT DOCUMENTS

| | | | |
|---|---|---|---|
| 9,622,483 B2 | 4/2017 | Bookbinder et al. | |
| 10,034,478 B2 | 7/2018 | Krasnow et al. | |
| 2012/0301528 A1 | 11/2012 | Uhlmann et al. | |
| 2015/0191607 A1 | 7/2015 | McDaniel | |
| 2015/0230476 A1 | 8/2015 | Bookbinder et al. | |
| 2017/0354143 A1* | 12/2017 | Rolfe | A01N 25/10 |
| 2018/0310568 A1* | 11/2018 | Jiang | C03C 4/0035 |
| 2019/0029260 A1 | 1/2019 | Jiang et al. | |
| 2020/0216613 A1 | 7/2020 | White | |
| 2021/0046506 A1 | 2/2021 | Mori et al. | |
| 2021/0277203 A1* | 9/2021 | Gopal | C08K 3/22 |

FOREIGN PATENT DOCUMENTS

| | | | | |
|---|---|---|---|---|
| CN | 101883663 | * | 11/2010 | |
| CN | 112335680 A | | 2/2021 | |
| WO | 2005/051961 A1 | | 6/2005 | |
| WO | WO-2009050251 A2 | * | 4/2009 | B05D 1/12 |
| WO | 2012/162557 A1 | | 11/2012 | |
| WO | 2013/176702 A1 | | 11/2013 | |
| WO | 2015/076840 A1 | | 5/2015 | |
| WO | 2015/168430 A1 | | 11/2015 | |
| WO | 2017/132302 A1 | | 8/2017 | |
| WO | 2021/055300 A1 | | 3/2021 | |
| WO | WO-2021055300 A1 | * | 3/2021 | A01N 59/16 |
| WO | 2022/084997 A1 | | 4/2022 | |
| WO | 2022/232089 A1 | | 11/2022 | |
| WO | 2023/034393 A1 | | 3/2023 | |

OTHER PUBLICATIONS

Abdelrahman et al; "Metal Complex Formation and Anticancer Activity of Cu(I) and Cu(II) Complexes With Metformin"; Molecules 2021, 26, 19 pages.
Alidori et al; "Synthesis, in Vitro and in Vivo Chanracterization of 64Cu(I) Complexes Derived From Hydrophilic Tris(Hydroxymethyl)Phosphane and 1,3,5-Triaza-7-Phosphaadamantane Ligands"; J. Biol. Inorg. Chem. (2008) 13, pp. 307-315.
Appleby et al; "Cu(I) Diimine Complexes as Immobilised Antibacterial Photosensitisers Operating in Water Under Visible Light"; Matter. Adv., 2020, 1, 11 pages.
Aronne et al; "Effect of Ligand Constraints Upon the Stabilities and Potentials of Macrocyclic Polythiaether Complexes. Copper(II) and Copper(I) Complexes With Cyclohexyl and Pheny Derivatives of [14]Anes4 in Water, 80% Methanol, and Actonitrile"; Inorg. Chem, 1995, 34, pp. 357-369.
Burda et al; "Thoretical Model of Copper Cu(I)/Cu(II) Hydration. DFT and AB Initio Quantum Chemical Study"; Journal of Molecular Structure (Theochem) 683 (2004), pp. 183-193.
Castillo et al; "Water-Compatible Synthesis of 1,2,3-Triazoles Under Ultrasonic Conditions by a Cu(I) Complex-Mediated Click Reaction"; ACS Omega, 2020, 5, pp. 30148-30159.
Castillo et al; "Water-Compatible Synthesis of 1,2,3-Triazoles Under Ultrasonic Conditions by a Cu(I) Complex-Mediated Click Reaction"; Supporting Information; ACS Omega, 202, 5, pp. 30148-30159.
Chen, X., et al., "Synthesis of novel copper sulfide hollow spheres generated from copper (II)-thiourea complex", Journal of Crystal Growth, vol. 263, No. 1-4, 2004, pp. 570-574.
Eastwood Safety Data Sheet; 2016, 6 Pages.
Kobayashi et al; "Effect of Water Coordination on Luminescent Properties of Pyrazine-Bridged Dinulcear Cu(I) Complexes"; Inorganic Chem, 2017, 56, pp. 4280-4288.
Kobayashi et al; "Effect of Water Coordination on Luminescent Properties of Pyrazine-Bridged Dinulcear Cu(I) Complexes"; Supporting Information; Dept. of Chem. Faculty of Science, Hokkaido Univ, 10 Pages.
Kobayashi et al; "Environmentally Friendly Mechanochemical Syntheses and Conversions of Highly Luminescent Cu(I) Dinuclear Complexes"; Inorg. Chem. 2016, 55, pp. 1978-1985.
Le Fur et al; "Improving the Stability and Inertness of Cu(II) and Cu(I) Complexes With Methylthiazolyl Ligands by Tuning the Macrocyclic Structure"; Dalton Trans., 2016, 45, 7406, 15 pages.

(Continued)

*Primary Examiner* — Snigdha Maewall
(74) *Attorney, Agent, or Firm* — Travis B. Gasa

(57) ABSTRACT

Biocidal compositions including a carrier, a copper(I) salt, and a copper-assisting additive different from the carrier are provided, which in some aspects have improved antimicrobial efficacy and/or total color difference. Also provided are biocidal compositions or UV curable films thereof that exhibit high transmittance that is similar to the transmittance of an otherwise identical composition or film thereof without either the copper(I) salt or the copper-assisting additive. Also provided are biocidal additive formulations in which a copper(I) salt has a molarity of at least 20 mM.

18 Claims, 9 Drawing Sheets

(56) References Cited

OTHER PUBLICATIONS

Le Fur et al; "Improving the Stability and Inertness of Cu(II) and Cu(I) Complexes With Methylthiazolyl Ligands by Tuning the Macrocyclic Structure"; Supplementary Information; Dalton Trans., 2016, 45, 28 pages.

Librando et al; "Synthesis of Novel Series of Cu(I) Complexes Bearing Alkylated 1,3,5-Triaza-7-Phosphaadamantane as Homogeneous and Carbon-Supported Catalysts for the Synthesis of 1- and 2-Substituted-1,2,3-Triazole"; Nanomaterials; 2021, 11, 29 pages.

Liu et al; "Alcohol Soluble Cu(I) Complexes With Aggregation-Induced Phosphorescent Emission in Ethanol/Water Solvents"; Polyhedron 164 (2019), pp. 152-158.

Manahan et al; "Complexes of Copper(I) and Silver (I) With Actonitrile in Water, the Lower Alcohols, Acetone, and Nitroethane"; J. Electroanal. Chem, 14, 1967, pp. 213-217.

Nekkanti et al; "Microwave-Assisted Direct Oxidative Synthesis of a-Ketoamides From Aryl Methyl Ketones and Amines by a Water Soluble Cu(I)-Complex"; Green Chem., 2016, 18, 19 pages.

Ohui et al; "New Water-Soluble Copper (II) Complexes With Morpholine-Thiosemicarbazone Hybrids: Insights Into the Anticancer and Antibacterial Mode of Action"; J. Med. Chem, 2019, 62, pp. 512-530.

Ozkal et al; "Covalently Immobilized Tris(Triazolyl)Methanol-Cu(I) Complexes: Highly Active and Recyclable Catalysts for CuAAC Reactions"; Catal. Sci. Technol., 2012, 2, pp. 195-200.

Pavelka et al; "Theoretical Description of Copper Cu(I)/Cu(II) Complexes in Mixed Ammine-Aqua Environement. DFT and AB Initio Quantum Chemical Study"; Chemical Physics, 312 (2005), pp. 193-204.

Pellei et al; "Syntheses and Biological Studies of Nitroimidazole Conjugated Heteroscorpionate Ligands and Related Cu(I) and Cu(II) Complexes"; Journal of Inorganic Biochemistry, 187 (2018), pp. 33-40.

Prochia et al; "Synthesis and Structural Characterization of Copper (I) Complexes Bearing N-Methyl-1,3,5-Triaza-7-Phosphaadamantane (mPTA) Cytotoxic Activity Evaluation of a Series of Water Soluble Cu(I) Derivatives Containing PTA, PTAH, and mPTA Ligands"; Journal of Inorganic Biochemistry 103 (2009), pp. 1644-1651.

Santini et al; "In Vitro Antitumour Activity of Water Soluble Cu(I), Ag(I), and Au(I) Complexes Supported by Hydrophilic Alkyl Phosphine Ligands"; Journal of Inorganic Biochemistry, 105 (2011), pp. 232-240.

Sponer et al; "Metal Ions in Noncomplementary DNA Base Pairs: an AB Initio Study of Cu(I), Ag(I), and Au(I) Complexes With the Cytosine-Adenine Base Pair"; JBIC *1999) 4:, pp. 537-545.

Tapanelli et al; "Novel Metalloantimalarials: Transmission Blocking Effects of Water Soluble Cu(I), Ag(I) Phosphane Complexes on the Murine Malaria Parasite Plasmodium Berghei"; Journal of Inorganic Biochemistry, 166 (2017), pp. 1-4.

Technical Data Sheet and Safety Data Sheets for the Wisebond® Bar & Table Top Epoxy Product; 2022, 14 Pages.

Tisato et al; "The Relationship Between the Electrospray Ionization Behaviour and Biological Activity of Some Phosphino Cu(I) Complexes"; Rapid Commun. Mass Spectrom., 2010, 24; pp. 1610-1616.

Veljko Gavrilovic, et al., "Effects of copper citrate as a defoliant in nursery fruit stock production", Pestic. Phytomed., vol. 32, No. 3-4, 2017, pp. 231-236.

Wan et al; "Multicomponent Synthesis of 1,2,3-Triazoles in Water Catalyzed by Silica-Immobilized NHC-Cu(I)"; Catal Lett, (2012) 142: pp. 1134-1140.

Wang et al; "Reusable Ammonium Salt-Tagged NHC-Cu(I) Complexes: Preparation and Catalytic Application in the Three Component Click Reaction"; Green Chem., 2011, 13, 6 pages.

Wanke et al; "Cu(I) Complexes Bearing the New Sterically Demanding and Coordination Flexible Tris(3-Phenyl-1-Pyrazolyl)Methanesulfonate Ligand and the Water-Soluble Phosphine 1,3,5-Triaza-7-Phosphaadamantane or Related Ligands"; Inorg. Chem., 2008, 47, pp. 10158-10168.

Yang et al; "Promoting Effect of Water on Light and Phenanthroline-Diphosphine Cu(I) Complex Initiated Iodine Atom Transfer Cyclisation"; Chem. Commun. 2022, 58, 4 pages.

Zuo et al; "Cu(I) Complexes With Aggregation-Induced Emission for Enhanced Photodynamic Antibacterial Application"; Dalton Trans., 2023, 52, 6 pages.

* cited by examiner

ANTIMICROBIAL COMPOSITIONS INCLUDING COPPER(I) SALTS AND ADDITIVES

TECHNICAL FIELD

The present disclosure relates to biocidal compositions. More particularly, the disclosure relates to biocidal compositions comprising copper(I) salts and copper-assisting additives.

BACKGROUND

Compositions may exist as articles, layers, or coatings, or as liquid compositions including suspensions and solutions. Liquid compositions may be applied on a surface or stored in a container (for example, prior to use). Copper-containing compositions initially having antimicrobial efficacy and/or color stability may experience reduced antimicrobial efficacy and/or color drift over time, which may render the compositions visually unattractive or unsuitable for a particular purpose. For example, although copper(I) ions and complexes may be colorless and have effective antimicrobial properties, over time copper(I) may be oxidized to copper (II), which has a green or blue/green color and has less effective antimicrobial properties. Such changes are typically undesired. Additionally, in certain compositions, the availability of copper at a surface (for example, the surface of an article) may be a challenge.

Thus, there is a need for copper-containing compositions having improved availability of copper, such as copper(I).

SUMMARY

In an example, the present disclosure provides a biocidal composition, including a carrier; a copper(I) salt; and a copper-assisting additive different from the carrier. The copper-assisting additive is a compound of formula (I), (II), (III), (IV), or any combination thereof:

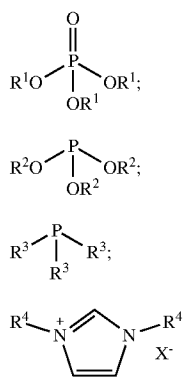

wherein each $R^1$ is independently selected from hydrogen, $C_1$-$C_{20}$ alkyl, aryl, and aryl($C_1$-$C_4$)alkyl; wherein each $R^2$ is independently selected from $C_1$-$C_{20}$ alkyl, optionally fluorosubstituted; wherein each $R^3$ is independently selected from $C_1$-$C_{20}$ alkyl, optionally substituted with a hydroxy group; wherein each $R^4$ is independently selected from $C_1$-$C_{20}$ alkyl; wherein X is a counterion; and wherein the biocidal composition, a film thereof, or an article thereof exhibits an antimicrobial efficacy of at least 3 log kill as measured with an EPA Test after storage of the biocidal composition or the film or article thereof at ambient temperature and ambient relative humidity for 50 days.

In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper (I) perchlorate, tetrakis(acetonitrile)copper(I) tetrafluoromethanesulfonate, tetrakis(acetonitrile)copper(I) hydrogen oxalate-oxalic acid-acetonitrile, copper(I) acetate, or any combination thereof. In certain examples, the copper-assisting additive may be 2-ethylhexyl phosphate, diphenyl phosphate, dibutyl phosphate, dibenzyl phosphate, triethyl phosphate, trimethyl phosphate, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof. In certain examples, the biocidal composition may be in a form of a paint, a coating, an elastomeric coating, a caulk, a sealant, a floor polish, a fabric treatment, a stain, a clear coat, a primer, a UV cured composition, a UV curable composition, or a plastic. In certain examples, the carrier may include an acrylate, a polyvinyl chloride, a latex, an organic solvent, water, or any combination thereof. In certain examples, the copper(I) salt may be copper(I) bromide; the copper-assisting additive may be trimethyl phosphite, triethyl phosphite, tris(2,2,2-trifluoroethyl) phosphite, or any combination thereof; and wherein the biocidal composition or the film or article thereof may exhibit the antimicrobial efficacy of at least 3 log kill after storage for 60 days. In certain examples, the copper-assisting additive may be triethyl phosphite; and the biocidal composition or the film or article thereof may exhibit the antimicrobial efficacy of at least 3 log kill after storage for 150 days. In certain examples, the copper(I) salt may be tetrakis(acetonitrile) copper(I) hexafluorophosphate; the copper-assisting additive may be 2-ethylhexyl phosphate; and the biocidal composition or the film or article thereof may exhibit the antimicrobial efficacy of at least 3 log kill after storage for 1 year. In certain examples, the copper(I) salt may be copper(I) bromide; the copper-assisting additive may be trimethyl phosphite, triethyl phosphite, tris(2,2,2-trifluoroethyl) phosphite, or any combination thereof; and the biocidal composition may exhibit a ΔE of less than 6, as calculated according to $$\Delta E = \sqrt{((L^* - L^*_{control})^2 + (a^* - a^*_{control})^2 + (b^* - b^*_{control})^2)};$$

and

L*, a*, and b* may be CIE values of the biocidal composition after preparing and then storing the biocidal composition at ambient temperature and ambient relative humidity for 150 days, and $L^*_{control}$, $a^*_{control}$, and $b^*_{control}$ may be CIE values of an otherwise identical composition without either the copper(I) salt or the copper-assisting additive. In certain examples, each $R^1$ may be selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; each $R^2$ may be selected from $C_1$-$C_5$ alkyl, optionally fluorosubstituted; each $R^3$ may be selected from $C_1$-$C_6$ alkyl (or $C_2$-$C_5$ alkyl, or $C_2$-$C_4$ alkyl, or $C_1$-$C_4$ alkyl), optionally substituted with a hydroxy group; and each $R^4$ may be selected from $C_1$-$C_6$ alkyl (or $C_2$-$C_5$ alkyl, or $C_2$-$C_4$ alkyl, or $C_1$-$C_4$ alkyl).

In another example, the present disclosure provides a biocidal composition, including a carrier; a copper(II) salt;

and a copper-assisting additive different from the carrier; wherein the biocidal composition or a film thereof exhibits an antimicrobial efficacy of at least 3 log kill as measured with an EPA Test after the biocidal composition or the film thereof has been stored at ambient temperature and ambient relative humidity for 90 days; and wherein the biocidal composition or the film or article thereof exhibits a transmittance of at least 98% as measured at each wavelength from 400 to 700 nanometers when measured at a thickness of 30 μm.

In certain examples, a film of the biocidal composition may have a thickness of from 30 μm to 1000 μm. In certain examples, the copper-assisting additive may be a compound of formula (II), (III), or any combination thereof.

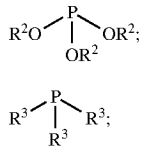
(II)

(III)

wherein each $R^2$ may be independently selected from $C_1$-$C_5$ alkyl, optionally fluorosubstituted; and wherein each $R^3$ may be independently selected from $C_1$-$C_6$ alkyl, optionally substituted with a hydroxy group. In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof. In certain examples, the copper-assisting additive may be triethyl phosphite, trimethyl phosphite, tris(2,2,2-trifluoroethyl) phosphite, tributyl phosphine, tris(3-hydroxypropyl) phosphine, or any combination thereof. In certain examples, the copper(I) salt may be copper(I) bromide; and the copper-assisting additive may be triethyl phosphite, trimethyl phosphite, tris(2,2,2-trifluoroethyl) phosphite, or any combination thereof. In certain examples, the biocidal composition may exhibit a ΔE of less than 6, as calculated according to $$\Delta E = \sqrt{((L^* - L^*_{control})^2 + (a^* - a^*_{control})^2 + (b^* - b^*_{control})^2)};$$

L*, a*, and b* may be CIE values of the biocidal composition after preparing and then storing the biocidal composition at ambient temperature and ambient relative humidity for 150 days, and $L^*_{control}$, $a^*_{control}$, and $b^*_{control}$ may be CIE values of an otherwise identical composition without either the copper(I) salt or the copper-assisting additive; and the biocidal composition, or the film thereof, may exhibit the antimicrobial efficacy of at least 3 log kill after storage for 150 days. In certain examples, the biocidal composition, or the film thereof, may exhibit a transmittance as measured at each wavelength from 400 to 700 nanometers that is within 10 percentage points of a second transmittance of an otherwise identical composition or film thereof without either the copper(I) salt or the copper-assisting additive when measured at a thickness of 30 μm.

In yet another example, the present disclosure provides a biocidal composition, including a carrier; a copper(I) salt; and a copper-assisting additive different from the carrier.

The copper-assisting additive is a compound of formula (I), (II), (III), (IV), or any combination

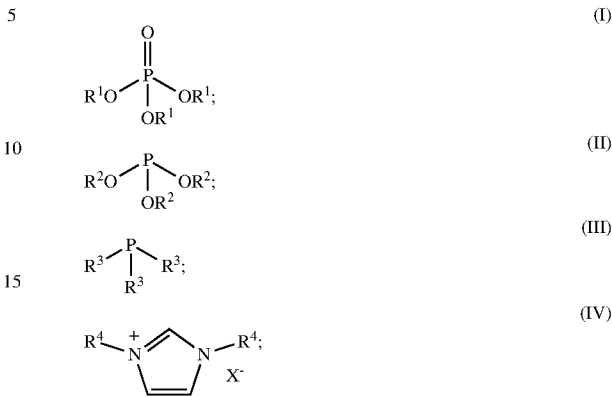

wherein each $R^1$ is independently selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; wherein each $R^2$ is independently selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; wherein each $R^3$ is independently selected from $C_1$-$C_6$ alkyl (or $C_2$-$C_5$ alkyl, or $C_2$-$C_4$ alkyl, or $C_1$-$C_4$ alkyl), optionally substituted with a hydroxy group; wherein each $R^4$ is independently selected from $C_1$-$C_6$ alkyl (or $C_2$-$C_5$ alkyl, or $C_2$-$C_4$ alkyl, or $C_1$-$C_4$ alkyl); wherein X is a counterion; wherein the copper(I) salt is a copper(I) halide, a tetrakis(acetonitrile)copper(I) salt, or any combination thereof; and wherein the biocidal composition, a film thereof, or an article thereof exhibits an antimicrobial efficacy of at least 3 log kill as measured with an EPA Test after storage of the biocidal composition or the film or article thereof at ambient temperature and ambient relative humidity for 50 days (or any other time period disclosed herein).

In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, or any combination thereof. In certain examples, the copper-assisting additive may be 2-ethylhexyl phosphate, diphenyl phosphate, dibutyl phosphate, dibenzyl phosphate, triethyl phosphite, trimethyl phosphite, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof. In certain examples, the biocidal composition may be in a form of a paint, a coating, an elastomeric coating, a caulk, a sealant, a floor polish, a fabric treatment, a stain, a clear coat, a primer, a UV cured composition, a UV curable composition, or a plastic. In certain examples, the carrier may include an acrylate, a polyvinyl chloride, a latex, an organic solvent, water, or any combination thereof. In certain examples, the copper(I) salt may be copper(I) bromide; the copper-assisting additive may be trimethyl phosphite, triethyl phosphite, tris(2,2,2-trifluoroethyl) phosphite, or any combination thereof; and the biocidal composition or the film or article thereof may exhibit the antimicrobial efficacy of at least 3 log kill after storage for 60 days.

In yet another example, the present disclosure provides a biocidal additive formulation, including a copper(I) salt and a copper-assisting additive. A biocidal composition including the biocidal additive formulation and a carrier, or a film or article of the biocidal composition, exhibits an antimicrobial efficacy of at least 3 log kill as measured with an EPA Test after storage of the biocidal composition, the film thereof, or the article thereof at ambient temperature and ambient relative humidity for 1 year. The biocidal composition exhibits a ΔE of less than 6, as calculated according to:

$$\Delta E = \sqrt{((L^* - L^*_{control})^2 + (a^* - a^*_{control})^2 + (b^* - b^*_{control})^2)};$$

and
L*, a*, and b* are CIE values of the biocidal composition after preparing and then storing the biocidal composition at ambient temperature and ambient relative humidity for 150 days, and L*$_{control}$, a*$_{control}$, and b*$_{control}$ are CIE values of an otherwise identical composition without either the copper (I) salt or the copper-assisting additive.

In certain examples, the copper-assisting additive may be a compound of formula (I), (II), (III), or any combination thereof:

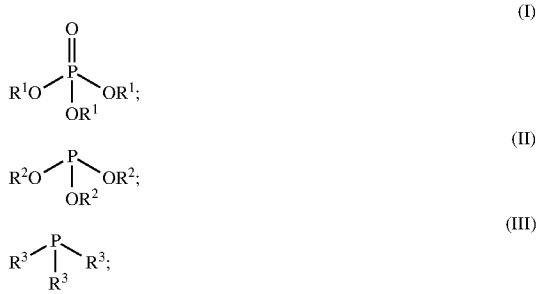

wherein each $R^1$ may be independently selected from hydrogen, $C_1$-$C_{20}$ alkyl, aryl, and benzyl; wherein each $R^2$ may be independently selected from $C_1$-$C_{20}$ alkyl, optionally substituted with a hydroxy group or fluorosubstituted; and wherein each $R^3$ may be independently selected from $C_1$-$C_{20}$ alkyl. In certain examples, the copper(I) salt may be copper (I) bromide, tetrakis(acetonitrile)copper(I) hexafluorophosphate, tetrakis(acetonitrile)copper(I) tetrafluoroborate, tetrakis(acetonitrile)copper(I) perchlorate, tetrakis (acetonitrile)copper(I) trifluoromethanesulfonate, tetrakis (acetonitrile)copper(I) hydrogen oxalate-oxalic acid-acetonitrile, or any combination thereof. In certain examples, the copper-assisting additive may be 2-ethylhexyl phosphate, triethyl phosphite, trimethyl phosphite, tris(2,2, 2-trifluoroethyl) phosphite, or any combination thereof. In certain examples, a molarity of the copper(I) salt dissolved in the biocidal additive formulation may be at least 20 mM. In certain examples, a film of the biocidal composition may have a transmittance of at least 98% as measured at each wavelength from 400 to 700 nanometers when measured at a thickness of 30 μm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the present disclosure may be well understood, there will now be described various forms thereof, given by way of example, reference being made to the accompanying drawings. The components in the figures are not necessarily to scale. Moreover, in the figures, like-referenced numerals designate corresponding parts throughout the different views. The drawings described herein are for illustration purposes only and are not intended to limit the scope of the present disclosure in any way.

Figure 1:
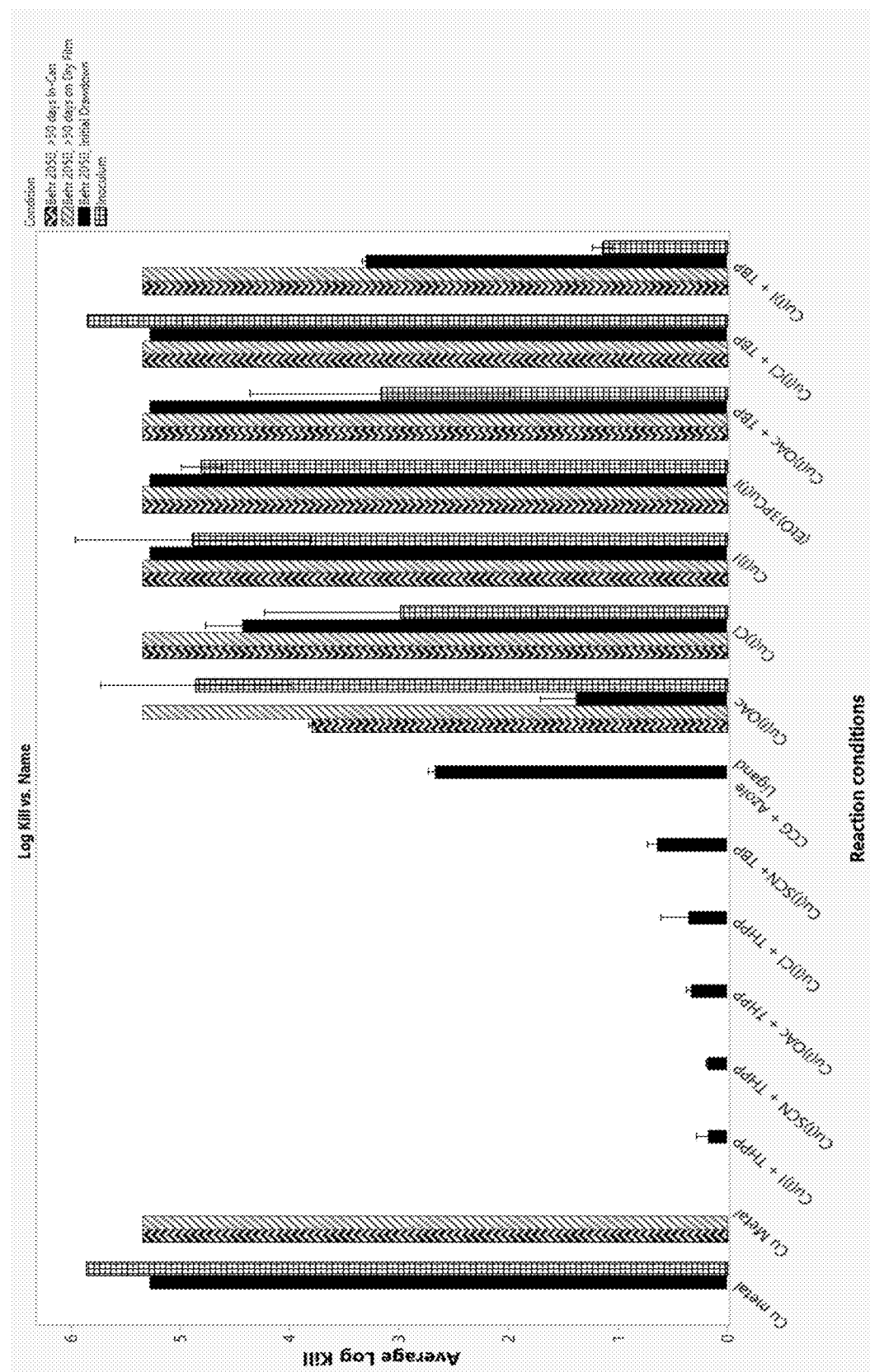
FIG. 1 illustrates a plot of antimicrobial efficacy for various paint samples at initial drawdown (0 days in-can, 7 days dried), as well as (50 days in-can, 7 days dried) and (0 days in-can, 50 days dried), including control paint samples and various examples of biocidal compositions according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In describing elements of the present disclosure, the terms "$1^{st}$," "$2^{nd}$," "first," "second," "A," "B," "(a)," "(b)," and the like may be used herein. These terms are only used to distinguish one element from another element, but do not limit the corresponding elements irrespective of the nature or order of the corresponding elements.

Numerical values, including endpoints of ranges, may be expressed herein as approximations preceded by the term "about," "approximately," or the like. In such cases, other examples include the particular numerical values. Regardless of whether a numerical value is expressed as an approximation, two examples are included in this disclosure: one expressed as an approximation, and another not expressed as an approximation. It will be further understood that an endpoint of each range is significant both in relation to another endpoint, and independently of another endpoint.

As used herein, the term "antimicrobial" refers to a composition, a material, or a surface of a material, including when such composition or material is in the form of a coating or dry film, that will kill or inhibit the growth of microbes including, but not limited to, bacteria, viruses, mildew, mold, algae, fungi, or any combination thereof. The term "antimicrobial," as used herein, does not necessarily mean the material or the surface of the material will kill or inhibit the growth of all species of microbes within such families, but that the material or the surface of the material will kill or inhibit the growth of one or more species of microbes from such families.

As used herein, the term "dry film" refers to a coating that has been applied to a surface and allowed to actively or passively dry, such that the coating has a moisture content that has reached equilibrium with the ambient environment. In some aspects, a moisture content may be used to describe a dry film, such as a moisture content of less than 20 wt. %, for example, less than 15 wt. %, less than 10 wt. %, less than 5 wt. %, less than 4 wt. %, less than 3 wt. %, less than 2 wt. %, less than 1 wt. %, less than 0.5 wt. %, or less than 0.1 wt. %; alternatively, or additionally, a moisture content of greater than 0 wt. %, greater than 0.1 wt. %, greater than 0.5 wt. %, greater than 1 wt. %, greater than 2 wt. %, greater than 3 wt. %, greater than 4 wt. %, greater than 5 wt. %, greater than 10 wt. %, or greater than 15 wt. %; or a range formed from any two of the foregoing weight percentages; including any subranges therebetween.

As used herein, the term "biocidal" refers to a composition or material with an active substance that is intended to destroy, deter, render harmless, prevent the action of, or otherwise exert a controlling effect on undesired organisms such as bacteria, viruses, mildew, mold, algae, and/or fungi, and in some aspects a biocidal composition has antimicrobial properties.

As used herein, the term "logarithmic reduction" refers to the negative value of log $(C_a/C_0)$, where $C_a$ refers to the colony form unit ("CFU") number of the antimicrobial surface and $C_0$ refers to the CFU of the control surface that is not an antimicrobial surface. As an example, a 3 logarithmic reduction equals 99.9% of the microbes killed and a logarithmic reduction of 5 equals 99.999% of microbes killed. The logarithmic reduction value may be measured according to one or more of the ASTM D2574-16 (2016) "Standard Test Method for Resistance of Emulsion Paints in the Container to Attack by Microorganisms," the Modified JIS Z 2801 Test for Bacteria, the Modified JIS Z 2801 Test for Viruses, or the EPA Test, as described in more detail elsewhere herein. "Logarithmic reduction" may also be referred to herein as "log kill."

The uses of the terms "a" and "an" and "the" and similar referents in the context of describing the present disclosure (especially in the context of the following claims) are to be construed to cover both the singular and the plural, unless otherwise indicated herein or clearly contradicted by context. Recitation of ranges of values herein are merely indicated to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

As used herein, the terms "comprise(s)," "include(s)," "having," "has," "can," "contain(s)," and variants thereof, are intended to be open-ended transitional phrases, terms, or words that do not preclude the possibility of additional acts, structures, elements, or components. The present description also contemplates other examples "comprising," "consisting of," and "consisting essentially of," the examples or elements presented herein, whether explicitly set forth or not.

As used herein, the term "about," when used in the context of a numerical value or range set forth refers to a variation of 15%, or less, of the numerical value. For example, a value differing by ±15%, ±14%, +10%, or ±5%, among others, would satisfy the definition of "about," unless more narrowly defined in particular instances.

The term "alkyl," by itself or as part of another substituent, refers, unless otherwise stated, to a straight, branched, or cyclic chain hydrocarbon ("cycloalkyl") having the number of carbon atoms designated (in other words, "$C_1$-$C_{30}$" means one to thirty carbons). Examples include methyl, ethyl, propyl, isopropyl, cyclopropyl, butyl, isobutyl, sec-butyl, tert-butyl, cyclobutyl, methylcyclopropyl, cyclopropylmethyl, pentyl, neopentyl, hexyl, and cyclohexyl. Other examples are —$(C_1$-$C_{18})$alkyl, —$(C_1$-$C_{15})$alkyl, —$(C_1$-$C_{10})$alkyl, —$(C_1$-$C_8)$alkyl, —$(C_1$-$C_6)$alkyl, and —$(C_2$-$C_6)$alkyl. Such alkyl groups and depicted ranges of carbon counts may apply to any formula, R group, or chemical species disclosed herein. In certain examples of the present disclosure, a —$(C_1$-$C_{30})$alkyl group, whether straight, branched, or cyclic, may not be a —$C_1$alkyl group, and/or may not be a —$C_2$alkyl group, and/or may not be a —$C_3$alkyl group, and/or may not be a —$C_4$alkyl group, and/or may not be a —$C_5$alkyl group, and/or may not be a —$C_6$alkyl group, and/or may not be a —$C_7$alkyl group, and/or may not be a —$C_8$alkyl group, and/or may not be a —$C_9$alkyl group, and/or may not be a —$C_{10}$alkyl group, and/or may not be a —$C_{11}$alkyl group, and/or may not be a —$C_{12}$alkyl group, and/or may not be a —$C_{13}$alkyl group, and/or may not be a —$C_{14}$alkyl group, and/or may not be a —$C_{15}$alkyl group, and/or may not be a —$C_{16}$alkyl group, and/or may not be a —$C_{17}$alkyl group, and/or may not be a —$C_{18}$alkyl group, and/or may not be a —$C_{19}$alkyl group, and/or may not be a —$C_{20}$alkyl group, and/or may not be a —$C_{21}$alkyl group, and/or may not be a —$C_{22}$alkyl group, and/or may not be a —$C_{23}$alkyl group, and/or may not be a —$C_{24}$alkyl group, and/or may not be a —$C_{25}$alkyl group, and/or may not be a —$C_{26}$alkyl group, and/or may not be a —$C_{27}$alkyl group, and/or may not be a —$C_{28}$alkyl group, and/or may not be a —$C_{29}$alkyl group, and/or may not be a —$C_{30}$alkyl group. In certain examples of the present disclosure, at least one hydrogen of the alkyl group is replaced with a hydroxy group, represented by —OH.

The term "aromatic" generally refers to a carbocycle or heterocycle having one or more polyunsaturated rings having aromatic character (in other words, having (4n+2) delocalized R (pi) electrons where n is an integer).

The term "aryl," by itself or in combination with another substituent, refers, unless otherwise stated, to a carbocyclic aromatic system containing one or more rings (typically one, two, or three rings) wherein such rings may be attached together in a pendant manner, such as a biphenyl, or may be fused, such as naphthalene. Examples may include phenyl, anthracyl, and naphthyl. Preferred are phenyl and naphthyl, most preferred is phenyl.

The term "aryl($C_1$-$C_4$)alkyl" refers to a functional group wherein a one to four carbon alkylene chain is attached to an aryl group, for example, —$CH_2$—$CH_2$-phenyl. Examples may include benzyl.

The term "fluorosubstituted" refers to an organic chemical compound or moiety either (1) contains both carbon-hydrogen bonds and carbon-fluorine bonds; or (2) is "perfluorinated," in which case carbon is bonded to fluorine atoms and no hydrogen atoms.

The term "counterion" refers to an ion that accompanies an ionic species in order to maintain in order to maintain or at least contribute to overall charge neutrality. Counterions may be positively charged and are termed "cations," or counterions may be negatively charged and are terms "anions." As an example, in the compound NaCl, the Na$^+$ (sodium ion) is a cation that is the counterion to the Cl$^-$ (chloride ion) anion. The chloride anion, in turn, is the counterion to the sodium cation.

As used herein, unless otherwise specified, the term "carrier" may refer to polymers, monomers, binders, solvents, or a combination thereof, as described herein. In a specific example, the carrier is a paint that is used for application to surfaces (which may include interior or exterior surfaces). The paint may be a dispersion of finely divided solids in a liquid medium (for example, water, organic solvent, and/or inorganic solvent) that may be applied to a surface to form a film that adheres to the surface. Examples of solids used in paints may include polymers, pigments, fillers, extenders, driers, and rheology modifiers. In some examples, the paint may be a latex paint or coating. In some examples, the paint may be a direct-to-metal ("DTM") paint or coating. In some aspects, the paint may be a liquid (for example, aqueous, organic solvent, and/or oil) composition or may be in the form of a coating (for example, dry film). Examples of solvents may include water and organic solvents, such as acetonitrile and methyl ethyl ketone. Examples of polymers may include an acrylic, a polyvinyl acetate, a polyvinyl chloride, a polyurethane (for example, polyurethane dispersions ("PUDs")), an epoxy, an alkyd (for example, waterborne alkyds), a fluoropolymer, a polyester, any copolymer thereof, or any combination thereof. Examples of an acrylic polymer may include polyacrylic acid, poly(methyl)methacrylate (PMMA), polymethacrylate, styrene acrylic, any copolymer thereof, or any combination thereof. In some aspects, the polymer is an emulsion polymer (for example, a latex, a waterborne acrylic, a PUD, a waterborne alkyd, or any combination thereof). In some aspects, a biocidal composition includes an emulsion polymer dispersed in a solvent (for example, water, organic solvent, and/or oil). In some aspects, the biocidal composition is a paint including an emulsion polymer dispersed in a solvent (for example, water, organic solvent, and/or oil). In some aspects, the biocidal composition includes a paint that includes titanium dioxide, diphenyl ketone, kaolin, and a binder including a polymer (for example, acrylic polymer). In some aspects, the biocidal composition includes a paint that includes titanium dioxide, 2-(2-butoxyethoxy)ethanol, and propoxylated propane-1,2-diol (MW<2000). In some aspects, the composition is polymer that is a plastic article (for example, a plastic article or film). In some aspects, the plastic includes a polymer that can be a nylon, a polyvinyl chloride (PVC), a polyester, polycarbonate (PC), polybutylene terephthalate, polypropylene, polyethylene, polyethyleneimine, an aramid precursor polymer, polyetherimide, a polyamide-imide, polystyrene, poly(methyl)methacrylate (PMMA), polyimide, melamine resin, urea-formaldehyde, polyacrylonitrile, a copolyimide, an amine-containing polymer, an amide-containing polymer, an imide-containing polymer, a pyrrole-containing polymer, an indole-containing polymer, any copolymer thereof, or any combination thereof.

As used herein, a "direct-to-metal" or "DTM" composition (for example, paint or coating) refers to a composition that can be applied directly to a metal surface without first coating the metal surface with a paint primer layer. DTM compositions typically are used in industrial, marine, construction, and automotive applications.

As used herein, the term "secondary carbon" refers to a carbon of a compound or substituent group thereof that is covalently bonded to two other carbon atoms.

As used herein, the term "tertiary carbon" refers to a carbon atom of a compound or substituent group thereof that is covalently bonded to three other carbon atoms.

As used herein, the term "alpha (a) carbon" refers to a carbon atom in a compound that is covalently bonded to a functional group or to an atom other than a hydrogen or carbon atom.

As used herein, the term "any salt thereof" (and grammatical variations thereof), in reference to a chemical formula or other chemical species, refers to (1) a protonated version of the referenced chemical formula or chemical species; (2) a chemical formula or chemical species in which any C(O)OH, P(O)OH, S(O)OH, or alpha, beta-unsaturated carboxylic acid may be replaced with C(O)OM$^1$, P(O)OM$^2$, S(O)OM$^3$, or alpha, beta-unsaturated M$^4$ carboxylate, respectively, wherein M$^1$, M$^2$, M$^3$, and M$^4$ independently are any alkali metal cation (for example, Li$^+$, Na$^+$, K$^+$, Rb$^+$, or Cs$^+$); or (3) any combination thereof. For example, a protonated version of a chemical formula or other chemical species (for example, by protonating the nitrogen atom of an amino group) may be a HX salt thereof, in which H is a proton and X is a counterion optionally selected from fluoride, chloride, bromide, iodide, hexafluorophosphate, sulfate, an alkylsulfonate, and an arylsulfonate. Moreover, by way of explanation, C(O)OH may be replaced in any chemical formula or chemical species with C(O)Ona or any other alkali metal salt.

As used herein, the term "alkali metal" is interchangeable with "alkali metal cation" and means $Li^+$, $Na^+$, $K^+$, $Rb^+$, or $Cs^+$.

As used herein, the term "copper-assisting additive" refers to an additive that promotes the availability and/or persistence of copper(I) ions in a composition or material, including promoting availability of copper(I) at a surface and/or interface of a composition or material, consistent with the following explanation. Without wishing to be bound by theory, it is believed that copper(I) is largely colorless and more antimicrobially efficacious, while copper (II) is typically energetically favorable but produces color and has lower antimicrobial efficacy. As such, copper(I) is generally favored for function and color, but copper(II) is usually more stable. To promote the persistence and/or availability of copper(I) in a composition or material, several strategies/mechanisms may be considered, including employing a reducing agent (for example, to reduce copper (II) to copper(I), or to reduce other oxidants that may be present), an antioxidant (for example, to scavenge oxidants either by reduction or by sequestering by coordination or binding so as to make such oxidants unavailable to oxidize copper(II) to copper(I)), a ligand with a hydrophobic and/or bulky side chain (for example, to limit oxidant access to copper(I) in a copper complex), a ligand with a hydrophilic side chain and/or a side chain without steric bulk, a ligand that favors complexation with copper(I) over copper(II) (for example, to energetically favor copper(I) to be maintained), a ligand that facilitates migration of copper(I) to a surface and/or interface, or any combination thereof. Accordingly, the copper-assisting additives disclosed herein generally are believed to perform one or more of the aforementioned functions to promote the persistence of copper(I), including in some aspects in a composition in liquid (for example, aqueous) form, in a coating (for example, dry film), and/or in a bulk material (for example, a plastic article). In some aspects, the copper-assisting additive is a reducing agent, an antioxidant, a copper-coordinating ligand (for example, coordinating with copper(I) and/or copper(II)) with one or more hydrophobic side chains, a copper-coordinating ligand (for example, coordinating with copper(I) and/or copper(II)) with one or more bulky side chains, a copper-coordinating ligand (for example, coordinating with copper(I) and/or copper(II)) that complexes with copper(I) preferentially over complexing with copper(II), a copper-coordinating ligand (for example, coordinating with copper(I) and/or copper(II)) that has two or more copper coordination sites, or any combination thereof.

As used herein, the term "at. %" refers to atomic weight percent. In some aspects, "at. %" is used in reference to an amount of copper in a composition. Simply by way of example, the biocidal composition may include copper in an amount of "X at. %" (where X is a number), and this means the mass of copper atoms (using molecular weight) is summed and expressed as a percent relative to a given basis (for example, based on mass of biocidal composition). In this regard, the mass of other species in a copper complex or molecule (for example, the oxygen atom in $Cu_2O$) is excluded when determining mass of copper, but included as part of the biocidal composition. The amount of copper in terms of at. % may be determined by methods known in the art.

As used herein, "weight" and "mass" are used interchangeably.

As used herein, the naming convention for functional groups containing phosphorus are standardized herein. Generally, the naming convention of a functional group with respect to a given phosphorus atom is determined by how many oxygen atoms are double-bonded to a phosphorus atom ("A"), the total number of carbon and hydrogen atoms single-bonded to the phosphorus atom ("B"), and the number of oxygen atoms single-bonded to the phosphorus atom ("C"). In this regard, the coordinate "(A,B,C)" may be employed to identify a phosphorus-containing functional group. In this regard, a "phosphate" has coordinate (1,0,3); a "phosphite" has coordinate (0,0,3); a "phosphine" has coordinate (0,3,0). Formula (I) is an example of a phosphate. Formula (II) is an example of a phosphite. Formula (III) is an example of a phosphine.

As used herein, the term "ambient temperature" refers to the temperature of the atmosphere in the immediate surrounding environment of an object or equipment.

As used herein, the term "ambient relative humidity" refers to an amount of water vapor present in a specific volume of immediately surrounding atmosphere at ambient temperature expressed as a percentage of the amount of water vapor needed for saturation at the same temperature. In certain examples, ambient relative humidity may have a value of 42%.

As used herein, the term "percentage point" refers to a unit for an arithmetic difference between two percentages. For example, a difference between transmittance values of 88 percent and 98 percent for a particular measurement is a difference of 10 percentage points on the same measurement scale (calculated by subtracting 98 from 88; or 88 from 98). Percentages, by contrast, indicate the relative or proportionate part of a total; in the above example, 88 constitutes 90% of 98 (calculated by dividing 88 by 98 and multiplying by 100), and 98 constitutes 111% of 88 (calculated by dividing 98 by 88 and multiplying by 100).

In an example, the present disclosure provides a biocidal composition, including a carrier, a copper(I) salt, and a copper-assisting additive. In certain examples, a copper-assisting additive is combined with a copper(I) salt in a molar ratio of copper(I) ion to copper-assisting additive of from 1:0.1 to 1:15. In other examples, the copper-assisting additive may be combined with the copper(I) salt and added to a carrier at a sum total concentration of both components of from 1 to 300 grams per liter of biocidal composition. In still other examples, the copper(I) salt may be pre-treated with a pretreatment solution.

In an example, the copper(I) salt may include copper(I) chloride, copper(I) bromide, copper(I) iodide, copper(I) thiocyanate, copper(I) acetate, tetrakis(acetonitrile)copper (I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, chloro[1,3-bis(2,6-diisopropylphenyl)15midazole-2-ylidene]copper(I), iodo(triethyl phosphite)copper(I), copper(I) oxide, copper(I) nitrate, and copper(I) thiophene-2-carboxylate.

In an example, the biocidal composition may include a carrier, a copper(I) salt optionally pre-treated with a pretreatment solution, and a copper-assisting additive. In certain examples, the biocidal composition may be a paint, a coating, an elastomeric coating, a caulk, a sealant, a floor polish, a fabric treatment, a stain, a clear coat, a primer, a UV cured composition, a UV curable composition, or a plastic (for example, a plastic article). The plastic article may be any article disclosed elsewhere herein. In other examples, the copper(I) salt, which may optionally be pretreated with a pretreatment solution, may be combined with a copper-assisting additive and a carrier while maintaining antimicrobial efficacy (or preventing a decrease in antimicrobial efficacy to below a particular level) and/or stabilizing the color of the carrier when the copper(I) salt is combined with the copper-assisting additive and the carrier or when the copper(I) salt and the copper-assisting additive are combined with the carrier. Examples of the present disclosure may maintain antimicrobial efficacy (or prevent a decrease in antimicrobial efficacy to below a particular level) and/or reduce changes in color of the carrier at the time of combining the copper(I) salt with the copper-assisting additive and the carrier or combining the copper(I) salt and the copper-assisting additive with the carrier.

Examples of the present disclosure may reduce changes in the antimicrobial efficacy and/or reduce changes in the color of the carrier between a period of time after combining the copper(I) salt with the copper-assisting additive and the carrier or combining the copper(I) salt and the copper-assisting additive with the carrier and the final antimicrobial efficacy and/or color of the carrier.

In an example, a material (for example, a coating such as a dry film) may exhibit the logarithmic reductions described herein under one or more of the U.S. Environmental Protection Agency "Test Method of Efficacy of Copper Alloy as a Sanitizer" (2009) (also referred to herein as "the EPA Test"), the Modified Japanese Industrial Standard (JIS) Z 2801 Test for Bacteria and/or the Modified JIS Z 2801 Test for Viruses, for a period of one month or greater or for a period of three months or greater, or any of the other time periods described elsewhere herein. The time periods (for example, one-month period or three-month period) may commence at or after the application of the material to a surface as a layer. In such examples, the layer exhibits the logarithmic reductions described herein. Each of the EPA Test, the Modified Japanese Industrial Standard (JIS) Z 2801 Test for Bacteria, and the Modified JIS Z 2801 Test for Viruses are incorporated herein by reference in their entireties.

In an example, antimicrobial efficacy of a composition or coating may be maintained, or at least a decrease in antimicrobial efficacy to below a particular level may be prevented, in the biocidal compositions disclosed herein, for example, by use of a copper-assisting additive. The effectiveness of a composition (for example, a coating such as a dry film) of the present disclosure as a biocidal composition may be measured as a function of the logarithmic reduction of the biocidal composition. The logarithmic reduction value of the biocidal composition may be relevant to the ability of the biocidal composition to kill a wide variety of biological organisms to which the biocidal composition is exposed, but may also allow the copper(I) salt to act as a preservative for the composition during storage (for example, in a container such as, but not limited to, a tank, a can, a bucket, a drum, a bottle, or a tube).

According to examples of the present disclosure, a logarithmic reduction of the biocidal composition may be at least 2, at least 3, at least 4, at least 5, at least 6, at least 7, at least 8, at least 9, at least 10, in a range from 1 to 10, 3 to 7, 4 to 6, or less than, equal to, or greater than 1, 2, 3, 4, 5, 6, 7, 8, 9, or 10. In certain examples, the logarithmic reduction may be maintained (for example, prevented from falling below) at or above any of the aforementioned values over a given time period, as described elsewhere herein. The biocidal properties of the composition may make it effective for substantially killing a wide variety of biological organisms including bacteria, viruses, and fungi. Where the coating is configured to have biocidal properties with respect to bacteria, suitable examples of bacteria include *Staphylococcus aureus, Enterobacter aerogenes, Pseudomonas aeruginosa,* Methicillin Resistant *Staphylococcus aureus, E. coli,* and mixtures thereof. In certain examples, the copper(I) salt exhibits at least a 3 logarithmic reduction, a 4 logarithmic reduction, a 5 logarithmic reduction, or even a 6 logarithmic reduction in the concentration of at least one of *Staphylococcus aureus, Enterobacter aerogenes, Pseudomonas aeruginosa* bacteria, Methicillin Resistant *Staphylococcus aureus,* and *E. coli* under the EPA Test, or a 3 logarithmic reduction or greater, or a 4 logarithmic reduction or greater (for example, 5 logarithmic reduction or greater) under JIS Z 2801 (2000) testing conditions or under the Modified JIS Z 2801 Test for Bacteria. In other examples, the copper(I) salt exhibits a 2 logarithmic reduction or greater, a 3 logarithmic reduction or greater, a 4 logarithmic reduction or greater, or a 5 logarithmic reduction or greater in the concentration of Murine Novovirus or severe acute respiratory syndrome ("SARS") coronavirus 2 ("SARS-CoV-2") under a Modified JIS Z 2801 for Viruses test. The procedures for the Modified JIS Z 2801 (2000) Test for Bacteria, and the Modified JIS Z 2801 (2000) Test for Viruses, are provided in International Patent Application Pub. No. WO 2021/055300 A1, COLOR STABILIZATION OF BIOCIDAL COATINGS, which is incorporated by reference herein in its entirety.

Briefly, as used herein, Modified JIS Z 2801 Test for Bacteria includes evaluating the bacteria under the standard JIS Z 2801 (2000) test with modified conditions including heating the glass or article to a temperature of 23 degrees Celsius to 37 degrees Celsius at a humidity of 38 percent to 42 percent for 6 hours. The Modified JIS Z 2801 (2000) Test for Viruses includes the following procedure. For each material tested (for example, a biocidal composition, a composition including the copper(I) salt, a composition including the copper-assisting additive, control compositions), three samples of the material (contained in individual sterile petri dishes) are each inoculated with a 20 pL aliquot of a test virus (where antimicrobial activity is measured) or a test medium including an organic soil load of 5% fetal bovine serum with or without the test virus (where cytotoxicity is measured). The inoculum is then covered with a film and the film is pressed down so the test virus and/or the test medium spreads over the film, but does not spread past the edge of the film. The exposure time begins when each sample was inoculated. The inoculated samples are transferred to a control chamber set to room temperature or "ambient" temperature (20° C.) in a relative humidity of 42% for 2 hours. Exposure time with respect to control samples are discussed below. Following the 2-hour exposure time, the film is lifted off using sterile forces and a 2.00 mL aliquot of the test virus and/or test medium is pipetted individually onto each sample of material and the underside of the film (or the side of the film exposed to the sample) used to cover each sample. The surface of each sample is individually scraped with a sterile plastic cell scraper to collect the test virus or test medium. The test virus and/or test medium is collected (at $10^2$ dilution), mixed using a vortex type mixer and serial 10-fold dilutions are prepared. The dilutions are then assayed for antimicrobial activity and/or cytotoxicity.

To prepare a control sample for testing antimicrobial activity (which are also referred to as "zero time vims controls") for the Modified JIS Z 2801 Test for Viruses, three control samples (contained in individual sterile petri dishes) are each inoculated with a 20 pL aliquot of the test virus. Immediately following inoculation, a 2.00 mL aliquot of test virus is pipetted onto each control sample. The surface of each sample was individually scraped with a sterile plastic cell scraper to collect test virus. The test virus is collected (at $10^2$ dilution), mixed using a vortex type mixer, and serial 10-fold dilutions were prepared. The dilutions are assayed for antimicrobial activity.

To prepare control samples for cytotoxicity (which are also referred to as "2 hour control virus") for the Modified JIS Z 2801 Test for Viruses, one control sample (contained in an individual sterile petri dish) is inoculated with a 20 pL aliquot of a test medium containing an organic soil load (5% fetal bovine serum), without the test virus. The inoculum is covered with a film and the film is pressed so the test medium spreads over the film but does not spread past the edge of the film. The exposure time begins when each control sample is inoculated. The control sample is transferred to a controlled chamber set to room temperature (20° C.) in a relative humidity of 42% for a duration of 2 hours exposure time. Following this exposure time, the film is lifted off using sterile forceps and a 2.00 mL aliquot of the test medium is pipetted individually onto each control sample and the underside of the film (the side exposed to the sample). The surface of each sample is individually scraped with a sterile plastic cell scraper to collect the test medium. The test medium is collected (at $10^2$ dilution), mixed using a vortex type mixer, and serial 10-fold dilutions were prepared. The dilutions were assayed for cytotoxicity.

A representative description of performing the EPA Test is as follows. A copper(I) salt is milled to powder using a 2-inch jet mill. The jet milled powder of the copper(I) salt is then added to a coating formulation (for example, commercially available BEHR™ 2050 latex paint) and mixed. Control coupons coated with a coating formulation without copper(I) salt were prepared alongside coupons coated with the copper(I) salt. A 7-mil wet film thickness drawdown bar was used to form films onto Leneta Scrub Charts (P121-10N). The films were dried for 2 days at ambient lab temperature before the antimicrobial test was conducted. Dry film thickness was around 80 μm. 1-Inch×1-inch square coupons were cut from the center of the painted scrub test panels. Stainless steel carriers, used as reference, were cleaned and sterilized by immersion in a 75% ethanol solution following by rinsing with DI water. Vials containing *Staphylococcus aureus* (ATCC 6538) bacterial stock culture were stored at −80° C. until use. 20 μL aliquots of thawed bacterial cultures were added to 10 mL of Tryptic Soy Broth. These bacterial suspensions were serially incubated 3× at 36° C. for 18-24 hours in an orbital shaker, and then 1× in polypropylene snap tubes for 48 hours. Cultures were subsequently mixed on a vortex mixer and allowed to settle. The upper two-thirds of suspension from each tube was aspirated and $OD_{600}$ was measured to estimate bacterial density.

The culture was diluted with phosphate buffer saline to achieve a bacterial inoculum concentration near a target value of 1.0·$10^7$ CFU/mL. 0.25 mL of 5% fetal bovine serum and 0.05 mL Triton™ X-100 were added to 4.70 mL bacterial suspension to aid in spreading the inoculum. Each test coupon was inoculated with 20 μL of the bacterial test culture. The inoculum volume was spread evenly using bent sterile pipette tips to ensure full and even coverage, spreading as close to the edge of the coupon as possible. Coupons were then incubated in a controlled environment set at 42% relative humidity and 23° C. for a period of 120 minutes. Following the 120-minute exposure period, coupons were neutralized in Letheen broth. Ten-fold serial dilutions of the neutralized solutions were plated using standard spread plate technique on Tryptic Soy Agar plates and incubated for 24 hours at 36° C. to yield countable numbers of survivors (approximately 20-200 colonies per plate). Log and percentage of reductions for bactericidal efficacy tests measure differences in CFUs between stainless steel and glass containing coupons. The antimicrobial efficacy measurements in terms of logarithmic reduction were performed in duplicate and the results averaged to provide an average log kill value.

In an example, it is possible to combine the copper(I) salt with a copper-assisting additive to prevent reduction of antimicrobial efficacy below a certain threshold (for example, less than a 3 logarithmic reduction or any other value disclosed herein) and/or limit the shift of the color of the biocidal composition from the color of a standard coating material (for example, the material in the absence of either the copper(I) salt or the copper-assisting additive). For example, it is possible to achieve a CIE L*a*b* ΔE* between the observed color and a standard of less than 30, less than 25, less than 20, less than 15, less than 12, less than 10, less than 9, less than 8, less than 7, less than 6, less than 5, less than 4, less than 3, less than 2, less than 1, in a range of from 1 to 30, 2 to 25, 5 to 15, 3 to 8, 4 to 7, 5 to 6, less than, equal to, or greater than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

As understood, the CIE L*a*b* color space is a color scale for determining a color. The three coordinates (or dimensions/components) of CIE L*a*b* represent the lightness of the color (L*=0 indicates black and L*=100 indicates white), the position between red (sometimes referenced as magenta) and green (negative a* values indicate green while positive a* values indicate red), and the position between yellow and blue (negative b* values indicate blue and positive b* values indicate yellow). The L* component closely matches human perception of lightness. Related to the CIE L*a*b* color space is the CIE L*C*h* color space that is a cylindrical representation of the three perceptual color correlates: lightness, chroma, and hue. The axial component of CIE L*C*h* is the same lightness attribute L* as CIE L*a*b*, the radial component is the chroma, and the angular component is hue. Using the CIE L*a*b* and CIE L*C*h* color spaces, the difference (for example, a ΔE*) in color between a standard and observed color may be measured, and the extent to which the desired color of a coating is altered by the components therein may be measured.

In an example, disclosed is a biocidal composition including: a carrier; a copper(I) salt; and a copper-assisting additive.

In certain examples, employing a copper-assisting additive allows the achievement of a desired level of antimicrobial efficacy (for example, via any test disclosed herein, such as the EPA Test).

In certain examples, the carrier and the copper-assisting additive are different. As used herein, "different" means that a given chemical species (for example, an acrylic polymer) cannot qualify as both the carrier and the copper-assisting additive; rather, if the carrier is, for example, an acrylic polymer, then the copper-assisting additive cannot be an acrylic polymer but must instead be another chemical species (for example, diphenyl phosphate).

In certain examples, the carrier may include or may be any of the carriers disclosed herein. For example, in some examples, the carrier includes a polymer, a monomer, a binder, a solvent, or any combination thereof. In some examples, the carrier is or includes a paint. In some examples, the paint may be used for application to surfaces (which may include interior or exterior surfaces). In some examples, the paint may be a dispersion of finely divided solids in a liquid medium (for example, water, organic solvent, and/or inorganic solvent) that may be applied to a surface to form a film that adheres to the surface. Examples of solids used in paints may include polymers, pigments, fillers, extenders, driers, rheology modifiers, or any combination thereof. In some examples, the paint may be a latex paint or coating. In some examples, the paint may be a direct-to-metal ("DTM") paint or coating. In some examples, the paint may be in liquid form (for example, aqueous, organic solvent, and/or oil) composition, or may be in the form of a coating (for example, dry film). Examples of solvent may include water and organic solvents. Examples of a polymer may include an acrylic or acrylate, a polyvinyl chloride, a polyvinyl acetate, a polyurethane (for example, polyurethane dispersions (PUDs)), an epoxy, an alkyd (for example, waterborne alkyds), a fluoropolymer, a polyester, any copolymer thereof, or any combination thereof. In some examples, a polymer is an emulsion polymer (for example, a latex, a PUD, a waterborne alkyd, or any combination thereof). In some examples, a biocidal composition includes an emulsion polymer dispersed in a medium (for example, an organic solvent, water, and/or oil). In some examples, a biocidal composition is a paint including an emulsion polymer dispersed in a solvent (for example, water, organic solvent, and/or oil). In some examples, a biocidal composition includes a paint that includes titanium dioxide, diphenyl ketone, kaolin, and a binder including a polymer (for example, acrylic polymer). In some examples, a biocidal composition includes a paint that includes titanium dioxide, 2-(2-butoxyethoxy)ethanol, and propoxylated propane-1,2-diol (MW<2000).

In certain examples, the biocidal composition may be in a form of a paint, a coating, an elastomeric coating, a caulk, a sealant, a floor polish, a fabric treatment, a stain, a clear coat, a primer, a UV cured composition, a UV curable composition, or a plastic. In certain examples, the biocidal composition does not contain (for example, and/or the composition is not in the form of) a paint, and/or does not contain a coating, and/or does not contain an elastomeric coating, and/or does not contain a caulk, and/or does not contain a sealant, and/or does not contain a floor polish, and/or does not contain a fabric treatment, and/or does not contain a stain, and/or does not contain a clear coat, and/or does not contain a primer, and/or does not contain a UV cured composition, and/or does not contain a UV curable composition, and/or does not contain a plastic.

In certain examples, the biocidal composition does not contain (for example, and/or the carrier is not or does not contain) a polymer, and/or does not contain a monomer, and/or does not contain a binder, and/or does not contain an organic solvent, and/or does not contain an inorganic solvent, and/or does not contain a paint, and/or does not contain water. In certain examples, the biocidal composition does not contain a dispersion of finely divided solids in a liquid medium that may be applied to a surface to form a film; for example, the composition does not contain a pigment, and/or does not contain a filler, and/or does not contain an extender, and/or does not contain a drier, and/or does not contain a rheology modifier. In certain examples, the biocidal composition does not contain a latex paint and/or does not contain a coating. In certain examples, the biocidal composition does not contain a DTM coating. In certain examples, the biocidal composition does not contain paint in liquid form. In certain examples, the biocidal composition does not contain an acrylic, and/or does not contain an acrylate, and/or does not contain a polyvinyl chloride, and/or does not contain a polyvinyl acetate, and/or does not contain a polyurethane, and/or does not contain an epoxy, and/or does not contain an alkyd, and/or does not contain a fluoropolymer, and/or does not contain a polyester, and/or does not contain a copolymer, and/or does not contain an emulsion polymer, and/or does not contain an emulsion polymer dispersed in a medium. In certain examples, the biocidal composition does not contain a paint containing titanium dioxide, and/or does not contain a paint containing diphenyl ketone, and/or does not contain a paint containing kaolin, and/or does not contain a paint containing 2-(2-butoxyethoxy)ethanol, and/or does not contain a paint containing propoxylated propane-1,2-diol.

In an example, the copper(I) salt, which may have optionally been pre-treated with a pretreatment solution, may be combined with a copper-assisting additive (for example, one or more copper-assisting additives).

In an example, a copper-assisting additive is or includes a phosphate, a phosphite, a phosphine, an imidazolium, any salt thereof, or any combination thereof. In certain examples, any of the copper-assisting additives may be hydrophobic, hydrophilic, or amphiphilic, and any of the aforementioned copper-assisting additives (or any other copper-assisting additive disclosed herein) may be characterized as hydrophobic, hydrophilic, or amphiphilic. For example, the copper-assisting additive may be or may include a hydrophilic phosphine, a hydrophobic phosphine, a hydrophobic phosphite, a hydrophobic phosphate, or any combination thereof.

In certain examples, the biocidal composition does not contain (for example, and/or the copper-assisting additive is not) a phosphate, and/or does not contain a phosphite, and/or does not contain a phosphine, and/or does not contain an imidazolium, and/or does not contain a nitrile, and/or does not contain a hydrophobic copper-assisting additive, and/or does not contain a hydrophilic copper-assisting additive, and/or does not contain an amphiphilic copper-assisting additive, and/or does not contain a hydrophilic phosphine, and/or does not contain a hydrophobic phosphine, and/or does not contain a hydrophobic phosphite, and/or does not contain a hydrophobic phosphate.

In an example, a copper-assisting additive is a compound of any of formulae (I), (II), (III), or (IV), or any combination thereof.

In an example, a copper-assisting additive may be a compound of formula (I):

(I)

wherein each $R^1$ is independently selected from the group consisting of hydrogen, an alkali metal, $C_1$-$C_{20}$ alkyl, aryl, and aryl($C_1$-$C_4$)alkyl. In certain examples, all $R^1$ are not simultaneously hydrogen. In other examples, at least one $R^1$ is hydrogen or an alkali metal. In still other examples, $R^1$ is a combination of hydrogen and alkali metal.

In certain examples, each $R^1$ is independently selected from the group consisting of hydrogen, an alkali metal, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), aryl, and benzyl, provided that all $R^1$ are not simultaneously hydrogen.

In certain examples, the alpha-carbon of at least one $R^1$ is a secondary or tertiary carbon.

In certain examples, the compound of formula (I) may include a compound of formula (Ia) or any salt thereof:

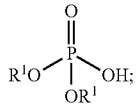
(Ia)

and any reference herein to "formula (I)" also includes formula (Ia).

Certain examples of compounds of formula (I) may include particular combinations of $R^1$ selected independently such that the compounds of formula (I) complex with, interact with, or otherwise affect copper (for example, by affecting the persistence of a given oxidation state, such as copper(I)), but not as desirably or preferably as other particular combinations of $R^1$ due to the combined effects of chemical phenomena understood by those skilled in the art, including, but not limited to, hydrophobicity, solubility, electronic effects, and/or steric effects resulting from the chemical structure of a particular compound of formula (I). In certain examples of compounds of formula (I), each $R^1$ independently may not be hydrogen, and/or may not be any one of $C_1$-$C_{20}$ alkyl, and/or may not be aryl, and/or may not be aryl($C_1$-$C_4$)alkyl. In certain examples, a biocidal composition does not include a compound of formula (I) and/or the copper-assisting additive is not a compound of formula (I).

Examples of compounds of formula (I) may include 2-ethylhexyl phosphate, bis(2-ethylhexyl)phosphate, tris(2-ethylhexyl)phosphate, methyl phosphate, dimethyl phosphate, trimethyl phosphate, butyl phosphate (for example, n-butyl, sec-butyl, or tert-butyl), dibutyl phosphate (for example, n-butyl, sec-butyl, and/or tert-butyl), tributyl phosphate (for example, n-butyl, sec-butyl, and/or tert-butyl), phenyl phosphate, diphenyl phosphate, triphenyl phosphate, monosodium phosphate, disodium phosphate, trisodium phosphate, benzyl phosphate, dibenzyl phosphate, tribenzyl phosphate, any salt thereof, or any combination thereof. In certain examples, the biocidal composition does not include (for example, the copper-assisting additive is not) one or more of 2-ethylhexyl phosphate, bis(2-ethylhexyl)phosphate, tris(2-ethylhexyl)phosphate, methyl phosphate, dimethyl phosphate, trimethyl phosphate, butyl phosphate (for example, n-butyl, sec-butyl, or tert-butyl), dibutyl phosphate (for example, n-butyl, sec-butyl, and/or tert-butyl), tributyl phosphate (for example, n-butyl, sec-butyl, and/or tert-butyl), phenyl phosphate, diphenyl phosphate, triphenyl phosphate, monosodium phosphate, disodium phosphate, trisodium phosphate, benzyl phosphate, dibenzyl phosphate, tribenzyl phosphate, or any salt thereof.

In certain examples, for compounds of any of formulae (I), (II), (III), or (IV), $C_1$-$C_{20}$ alkyl may include $C_1$-$C_{19}$ alkyl, $C_1$-$C_{18}$ alkyl, $C_1$-$C_{17}$ alkyl, $C_1$-$C_{16}$ alkyl, $C_1$-$C_{15}$ alkyl, $C_1$-$C_{14}$ alkyl, $C_1$-$C_{13}$ alkyl, $C_1$-$C_{12}$ alkyl, $C_1$-$C_{11}$ alkyl, $C_1$-$C_{10}$ alkyl, $C_1$-$C_9$ alkyl, $C_1$-$C_8$ alkyl, $C_1$-$C_7$ alkyl, $C_1$-$C_6$ alkyl, $C_1$-$C_5$ alkyl, $C_1$-$C_4$ alkyl, $C_1$-$C_3$ alkyl, $C_1$-$C_2$ alkyl, $C_2$-$C_{20}$ alkyl, $C_2$-$C_{19}$ alkyl, $C_2$-$C_{18}$ alkyl, $C_2$-$C_{17}$ alkyl, $C_2$-$C_{16}$ alkyl, $C_2$-$C_{15}$ alkyl, $C_2$-$C_{14}$ alkyl, $C_2$-$C_{13}$ alkyl, $C_2$-$C_{12}$ alkyl, $C_2$-$C_{11}$ alkyl, $C_2$-$C_{10}$ alkyl, $C_2$-$C_9$ alkyl, $C_2$-$C_8$ alkyl, $C_2$-$C_7$ alkyl, $C_2$-$C_6$ alkyl, $C_2$-$C_5$ alkyl, $C_2$-$C_4$ alkyl, $C_2$-$C_3$ alkyl, $C_3$-$C_{20}$ alkyl, $C_3$-$C_{19}$ alkyl, $C_3$-$C_{18}$ alkyl, $C_3$-$C_{17}$ alkyl, $C_3$-$C_{16}$ alkyl, $C_3$-$C_{15}$ alkyl, $C_3$-$C_{14}$ alkyl, $C_3$-$C_{13}$ alkyl, $C_3$-$C_{12}$ alkyl, $C_3$-$C_{11}$ alkyl, $C_3$-$C_{10}$ alkyl, $C_3$-$C_9$ alkyl, $C_3$-$C_8$ alkyl, $C_3$-$C_7$ alkyl, $C_3$-$C_6$ alkyl, $C_3$-$C_5$ alkyl, $C_3$-$C_4$ alkyl, $C_4$-$C_{20}$ alkyl, $C_4$-$C_{19}$ alkyl, $C_4$-$C_{18}$ alkyl, $C_4$-$C_{17}$ alkyl, $C_4$-$C_{16}$ alkyl, $C_4$-$C_{15}$ alkyl, $C_4$-$C_{14}$ alkyl, $C_4$-$C_{13}$ alkyl, $C_4$-$C_{12}$ alkyl, $C_4$-$C_{11}$ alkyl, $C_4$-$C_{10}$ alkyl, $C_4$-$C_9$ alkyl, $C_4$-$C_8$ alkyl, $C_4$-$C_7$ alkyl, $C_4$-$C_6$ alkyl, $C_4$-$C_5$ alkyl, $C_5$-$C_{20}$ alkyl, $C_5$-$C_{19}$ alkyl, $C_5$-$C_{18}$ alkyl, $C_5$-$C_{17}$ alkyl, $C_5$-$C_{16}$ alkyl, $C_5$-$C_{15}$ alkyl, $C_5$-$C_{14}$ alkyl, $C_5$-$C_{13}$ alkyl, $C_5$-$C_{12}$ alkyl, $C_5$-$C_{11}$ alkyl, $C_5$-$C_{10}$ alkyl, $C_5$-$C_9$ alkyl, $C_5$-$C_8$ alkyl, $C_5$-$C_7$ alkyl, $C_5$-$C_6$ alkyl, $C_6$-$C_{20}$ alkyl, $C_6$-$C_{19}$ alkyl, $C_6$-$C_{18}$ alkyl, $C_6$-$C_{17}$ alkyl, $C_6$-$C_{16}$ alkyl, $C_6$-$C_{15}$ alkyl, $C_6$-$C_{14}$ alkyl, $C_6$-$C_{13}$ alkyl, $C_6$-$C_{12}$ alkyl, $C_6$-$C_{11}$ alkyl, $C_6$-$C_{10}$ alkyl, $C_6$-$C_9$ alkyl, $C_6$-$C_8$ alkyl, $C_6$-$C_7$ alkyl, $C_7$-$C_{20}$ alkyl, $C_7$-$C_{19}$ alkyl, $C_7$-$C_{18}$ alkyl, $C_7$-$C_{17}$ alkyl, $C_7$-$C_{16}$ alkyl, $C_7$-$C_{15}$ alkyl, $C_7$-$C_{14}$ alkyl, $C_7$-$C_{13}$ alkyl, $C_7$-$C_{12}$ alkyl, $C_7$-$C_{11}$ alkyl, $C_7$-$C_{10}$ alkyl, $C_7$-$C_9$ alkyl, $C_7$-$C_8$ alkyl, $C_8$-$C_{20}$ alkyl, $C_8$-$C_{19}$ alkyl, $C_8$-$C_{18}$ alkyl, $C_8$-$C_{17}$ alkyl, $C_8$-$C_{16}$ alkyl, $C_8$-$C_{15}$ alkyl, $C_8$-$C_{14}$ alkyl, $C_8$-$C_{13}$ alkyl, $C_8$-$C_{12}$ alkyl, $C_8$-$C_{11}$ alkyl, $C_8$-$C_{10}$ alkyl, $C_8$-$C_9$ alkyl, $C_9$-$C_{20}$ alkyl, $C_9$-$C_{19}$ alkyl, $C_9$-$C_{18}$ alkyl, $C_9$-$C_{17}$ alkyl, $C_9$-$C_{16}$ alkyl, $C_9$-$C_{15}$ alkyl, $C_9$-$C_{14}$ alkyl, $C_9$-$C_{13}$ alkyl, $C_9$-$C_{12}$ alkyl, $C_9$-$C_{11}$ alkyl, $C_9$-$C_{10}$ alkyl, $C_{10}$-$C_{20}$ alkyl, $C_{10}$-$C_{19}$ alkyl, $C_{10}$-$C_{18}$ alkyl, $C_{10}$-$C_{17}$ alkyl, $C_{10}$-$C_{16}$ alkyl, $C_{10}$-$C_{15}$ alkyl, $C_{10}$-$C_{14}$ alkyl, $C_{10}$-$C_{13}$ alkyl, $C_{10}$-$C_{12}$ alkyl, $C_{10}$-$C_{11}$ alkyl, $C_{11}$-$C_{20}$ alkyl, $C_{11}$-$C_{19}$ alkyl, $C_{11}$-$C_{18}$ alkyl, $C_{11}$-$C_{17}$ alkyl, $C_{11}$-$C_{16}$ alkyl, $C_{11}$-$C_{15}$ alkyl, $C_{11}$-$C_{14}$ alkyl, $C_{11}$-$C_{13}$ alkyl, $C_{11}$-$C_{12}$ alkyl, $C_{12}$-$C_{20}$ alkyl, $C_{12}$-$C_{19}$ alkyl, $C_{12}$-$C_{18}$ alkyl, $C_{12}$-$C_{17}$ alkyl, $C_{12}$-$C_{16}$ alkyl, $C_{12}$-$C_{15}$ alkyl, $C_{12}$-$C_{14}$ alkyl, $C_{12}$-$C_{13}$ alkyl, $C_{13}$-$C_{20}$ alkyl, $C_{13}$-$C_{19}$ alkyl, $C_{13}$-$C_{18}$ alkyl, $C_{13}$-$C_{17}$ alkyl, $C_{13}$-$C_{16}$ alkyl, $C_{13}$-$C_{15}$ alkyl, $C_{13}$-$C_{14}$ alkyl, $C_{14}$-$C_{20}$ alkyl, $C_{14}$-$C_{19}$ alkyl, $C_{14}$-$C_{18}$ alkyl, $C_{14}$-$C_{17}$ alkyl, $C_{14}$-$C_{16}$ alkyl, $C_{14}$-$C_{15}$ alkyl, $C_{15}$-$C_{20}$ alkyl, $C_{15}$-$C_{19}$ alkyl, $C_{15}$-$C_{18}$ alkyl, $C_{15}$-$C_{17}$ alkyl, $C_{15}$-$C_{16}$ alkyl, $C_{16}$-$C_{20}$ alkyl, $C_{16}$-$C_{19}$ alkyl, $C_{16}$-$C_{18}$ alkyl, $C_{16}$-$C_{17}$ alkyl, $C_{17}$-$C_{20}$ alkyl, $C_{17}$-$C_{19}$ alkyl, $C_{17}$-$C_{18}$ alkyl, $C_{18}$-$C_{20}$ alkyl, $C_{18}$-$C_{19}$ alkyl, and $C_{19}$-$C_{20}$ alkyl.

In certain examples of compounds of formula (I), each $R^1$ may not be $C_1$ alkyl, and/or may not be $C_2$ alkyl, and/or may not be $C_3$ alkyl, and/or may not be $C_4$ alkyl, and/or may not be $C_5$ alkyl, and/or may not be $C_6$ alkyl, and/or may not be $C_7$ alkyl, and/or may not be $C_8$ alkyl, and/or may not be $C_9$ alkyl, and/or may not be $C_{10}$ alkyl, and/or may not be $C_{11}$ alkyl, and/or may not be $C_{12}$ alkyl, and/or may not be $C_{13}$ alkyl, and/or may not be $C_{14}$ alkyl, and/or may not be $C_{15}$ alkyl, and/or may not be $C_{16}$ alkyl, and/or may not be $C_{17}$ alkyl, and/or may not be Cis alkyl, and/or may not be $C_{19}$ alkyl, and/or may not be $C_{20}$ alkyl.

Without being bound by any particular theory, it is believed that the presence or maintenance of copper(I) is promoted by employing a compound of formula (I) or any salt thereof, and a biocidal composition containing a compound of formula (I) or any salt thereof exhibits one or more effects when combined with a copper(I) salt, including maintaining antimicrobial efficacy of a biocidal composition, preventing reduction of antimicrobial efficacy of a biocidal composition below a certain level (for example, less than 3 logarithmic reduction), minimizing color drift of a biocidal composition, or any combination thereof. Antimicrobial efficacy may be measured as described elsewhere herein, such as by using the EPA Test.

In an example, a copper-assisting additive may be a compound of formula (II) or any salt thereof:

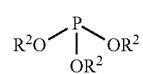
(II)

wherein each $R^2$ is independently selected from the group consisting of hydrogen and $C_1$-$C_{20}$ alkyl, which is optionally fluorosubstituted. In certain examples, all $R^2$ are not simultaneously hydrogen.

In certain examples, each $R^2$ is independently selected from the group consisting of hydrogen and $C_1$-$C_8$ alkyl, which is optionally fluorosubstituted, provided that all $R^2$ are not simultaneously hydrogen.

In certain examples, each $R^2$ is independently selected from the group consisting of hydrogen and $C_1$-$C_5$ alkyl, which is optionally fluorosubstituted, provided that all $R^2$ are not simultaneously hydrogen.

In certain examples, the alpha-carbon of at least one $R^2$ is a secondary or tertiary carbon.

Certain examples of compounds of formula (II) may include particular combinations of $R^2$ selected independently such that the compounds of formula (II) complex with, interact with, or otherwise affect copper (for example, by affecting the persistence of a given oxidation state, such as copper(I)), but not as desirably or preferably as other particular combinations of $R^2$ due to the combined effects of chemical phenomena understood by those skilled in the art, including, but not limited to, hydrophobicity, solubility, electronic effects, and/or steric effects resulting from the chemical structure of a particular compound of formula (II). In certain examples of compounds of formula (II), each $R^2$ independently may not be hydrogen, and/or may not be $C_1$ alkyl, and/or may not be optionally fluorosubstituted $C_1$ alkyl, and/or may not be $C_2$ alkyl, and/or may not be optionally fluorosubstituted $C_2$ alkyl, and/or may not be $C_3$ alkyl, and/or may not be optionally fluorosubstituted $C_3$ alkyl, and/or may not be $C_4$ alkyl, and/or may not be optionally fluorosubstituted $C_4$ alkyl, and/or may not be $C_5$ alkyl, and/or may not be optionally fluorosubstituted $C_5$ alkyl, and/or may not be $C_6$ alkyl, and/or may not be optionally fluorosubstituted $C_6$ alkyl, and/or may not be $C_7$ alkyl, and/or may not be optionally fluorosubstituted $C_7$ alkyl, and/or may not be $C_8$ alkyl, and/or may not be optionally fluorosubstituted $C_8$ alkyl, and/or may not be $C_9$ alkyl, and/or may not be optionally fluorosubstituted $C_9$ alkyl, and/or may not be $C_{10}$ alkyl, and/or may not be optionally fluorosubstituted $C_{10}$ alkyl, and/or may not be $C_{11}$ alkyl, and/or may not be optionally fluorosubstituted $C_{11}$ alkyl, and/or may not be $C_{12}$ alkyl, and/or may not be optionally fluorosubstituted $C_{12}$ alkyl, and/or may not be $C_{13}$ alkyl, and/or may not be optionally fluorosubstituted $C_{13}$ alkyl, and/or may not be $C_{14}$ alkyl, and/or may not be optionally fluorosubstituted $C_{14}$ alkyl, and/or may not be $C_{15}$ alkyl, and/or may not be optionally fluorosubstituted $C_{15}$ alkyl, and/or may not be $C_{16}$ alkyl, and/or may not be optionally fluorosubstituted $C_{16}$ alkyl, and/or may not be $C_{17}$ alkyl, and/or may not be optionally fluorosubstituted $C_{17}$ alkyl, and/or may not be $C_{18}$ alkyl, and/or may not be optionally fluorosubstituted $C_{18}$ alkyl, and/or may not be $C_{19}$ alkyl, and/or may not be optionally fluorosubstituted $C_{19}$ alkyl, and/or may not be $C_{20}$ alkyl, and/or may not be optionally fluorosubstituted $C_{20}$ alkyl. In certain examples, a biocidal composition does not include a compound of formula (II) and/or the copper-assisting additive is not a compound of formula (II).

Examples of compounds of formula (II) may include trimethyl phosphite, triethyl phosphite, tris(2,2,2-trifluoroethyl) phosphite, tris(2-ethylhexyl) phosphite, triisopropyl phosphite, tris(1,1,1,3,3,3-hexafluoro-2-propyl) phosphite, or any salt thereof. In certain examples, the biocidal composition does not include (for example, the copper-assisting additive is not) one or more of trimethyl phosphite, triethyl phosphite, tris(2,2,2-trifluoroethyl) phosphite, tris(2-ethylhexyl) phosphite, triisopropyl phosphite, tris(1,1,1,3,3,3-hexafluoro-2-propyl) phosphite, or any salt thereof.

Without being bound by any particular theory, it is believed that the presence or maintenance of copper(I) is promoted by employing a compound of formula (II) or any salt thereof, and a biocidal composition containing a compound of formula (II) or any salt thereof exhibits one or more effects when combined with a copper(I) salt, including maintaining antimicrobial efficacy of a biocidal composition, preventing reduction of antimicrobial efficacy of a biocidal composition below a certain level (for example, less than 3 logarithmic reduction), minimizing color drift of a biocidal composition, or any combination thereof. Antimicrobial efficacy may be measured as described elsewhere herein, such as by using the EPA Test.

In an example, a copper-assisting additive may be a compound of formula (III) or any salt thereof:

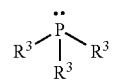

(III)

wherein each $R^3$ is independently selected from the group consisting of hydrogen and $C_1$-$C_{20}$ alkyl, optionally substituted with a hydroxy group. In certain examples, all $R^3$ are not simultaneously hydrogen.

In certain examples, each $R^3$ is independently selected from the group consisting of hydrogen and $C_1$-$C_{10}$ alkyl, optionally substituted with a hydroxy group, provided that all $R^3$ are not simultaneously hydrogen.

In certain examples, each $R^3$ is independently selected from the group consisting of hydrogen and $C_1$-$C_6$ alkyl, optionally substituted with a hydroxy group, provided that all $R^3$ are not simultaneously hydrogen.

In certain examples, an alpha-carbon of at least one $R^3$ is a secondary carbon or a tertiary carbon.

Certain examples of compounds of formula (III) may include particular combinations of $R^3$ selected independently such that the compounds of formula (III) complex with, interact with, or otherwise affect copper (for example, by affecting the persistence of a given oxidation state, such as copper(I)), but not as desirably or preferably as other particular combinations of $R^3$ due to the combined effects of chemical phenomena understood by those skilled in the art, including, but not limited to, hydrophobicity, solubility, electronic effects, and/or steric effects resulting from the chemical structure of a particular compound of formula (III). In certain examples of compounds of formula (III), each $R^3$ independently may not be hydrogen, and/or may not be $C_1$ alkyl, and/or may not be $C_1$ alkyl optionally substituted with a hydroxy group, and/or may not be $C_2$ alkyl, and/or may not be $C_2$ alkyl optionally substituted with a hydroxy group, and/or may not be $C_3$ alkyl, and/or may not be $C_3$ alkyl optionally substituted with a hydroxy group, and/or may not be $C_4$ alkyl, and/or may not be $C_4$ alkyl optionally substituted with a hydroxy group, and/or may not be $C_5$ alkyl, and/or may not be $C_5$ alkyl optionally substituted with a hydroxy group, and/or may not be $C_6$ alkyl, and/or may not be $C_6$ alkyl optionally substituted with a hydroxy group, and/or may not be $C_7$ alkyl, and/or may not be $C_7$ alkyl optionally substituted with a hydroxy group, and/or may not be $C_8$ alkyl, and/or may not be $C_8$ alkyl optionally substituted with a hydroxy group, and/or may not be $C_9$ alkyl, and/or may not be C$_9$ alkyl optionally substituted with a hydroxy group, and/or may not be C$_{10}$ alkyl, and/or may not be C$_{10}$ alkyl optionally substituted with a hydroxy group, and/or may not be C$_{11}$ alkyl, and/or may not be C$_{11}$ alkyl optionally substituted with a hydroxy group, and/or may not be C$_{12}$ alkyl, and/or may not be C$_{12}$ alkyl optionally substituted with a hydroxy group, and/or may not be C$_{13}$ alkyl, and/or may not be C$_{13}$ alkyl optionally substituted with a hydroxy group, and/or may not be C$_{14}$ alkyl, and/or may not be C$_{14}$ alkyl optionally substituted with a hydroxy group, and/or may not be C$_{15}$ alkyl, and/or may not be C$_{15}$ alkyl optionally substituted with a hydroxy group, and/or may not be C$_{16}$ alkyl, and/or may not be C$_{16}$ alkyl optionally substituted with a hydroxy group, and/or may not be C$_{17}$ alkyl, and/or may not be C$_{17}$ alkyl optionally substituted with a hydroxy group, and/or may not be C$_{18}$ alkyl, and/or may not be C$_{18}$ alkyl optionally substituted with a hydroxy group, and/or may not be C$_{19}$ alkyl, and/or may not be C$_{19}$ alkyl optionally substituted with a hydroxy group, and/or may not be C$_{20}$ alkyl, and/or may not be C$_{20}$ alkyl optionally substituted with a hydroxy group. In certain examples, a biocidal composition does not include a compound of formula (III) and/or the copper-assisting additive is not a compound of formula (III).

Examples of compounds of formula (III) may include tris(hydroxypropyl) phosphine and tributyl phosphine. In certain examples, the biocidal composition does not include (for example, the copper-assisting additive is not) one or more of tris(hydroxypropyl) phosphine or tributyl phosphine.

Without being bound by any particular theory, it is believed the presence or maintenance of copper(I) is promoted by employing a compound of formula (III) or any salt thereof, and a biocidal composition containing a compound of formula (III) or any salt thereof exhibits one or more effects when combined with a copper(I) salt, including maintaining antimicrobial efficacy of a biocidal composition, preventing reduction of antimicrobial efficacy of a biocidal composition below a certain level (for example, less than 3 logarithmic reduction), minimizing color drift of a biocidal composition, or any combination thereof.

In an example, a copper-assisting additive may be a compound of formula (IV), or any salt thereof:

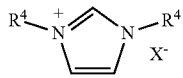

(IV)

wherein each R$^4$ is independently selected from the group consisting of hydrogen and C$_1$-C$_{20}$ alkyl; and wherein X is a counterion.

In certain examples, each R$^4$ is independently selected from the group consisting of C$_1$-C$_{10}$ alkyl.

In certain examples, each R$^4$ is independently selected from the group consisting of C$_1$-C$_6$ alkyl.

Examples of compounds of formula (IV) may include 1-butyl-3-methylimidazolium ("BMIM") bromide and 1-butyl-3-methylimidazolium chloride. In certain examples, the biocidal composition does not include (for example, the copper-assisting additive is not) one or more of 1-butyl-3-methylimidazolium bromide and 1-butyl-3-methylimidazolium chloride.

In certain examples, X may be selected from the group consisting of fluoride, chloride, bromide, iodide, hydrogen carbonate, hydrogen sulfate, hydrogen sulfite, hydroxide, nitrate, nitrite, acetate, formate, cyanide, tetrafluoroborate, hexafluorophosphate, perchlorate, and trifluoromethanesulfonate.

Certain examples of compounds of formula (IV) may include particular combinations of R$^4$ selected independently such that the compounds of formula (IV) complex with, interact with, or otherwise affect copper (for example, by affecting the persistence of a given oxidation state, such as copper(I)), but not as desirably or preferably as other particular combinations of R$^4$ due to the combined effects of chemical phenomena understood by those skilled in the art, including, but not limited to, hydrophobicity, solubility, electronic effects, and/or steric effects resulting from the chemical structure of a particular compound of formula (IV). In certain examples of compounds of formula (IV), each R$^4$ may not be hydrogen, and/or may not be C$_1$ alkyl, and/or may not be C$_2$ alkyl, and/or may not be C$_3$ alkyl, and/or may not be C$_4$ alkyl, and/or may not be C$_5$ alkyl, and/or may not be C$_6$ alkyl, and/or may not be C$_7$ alkyl, and/or may not be Cs alkyl, and/or may not be C$_9$ alkyl, and/or may not be C$_{10}$ alkyl, and/or may not be C$_{11}$ alkyl, and/or may not be C$_{12}$ alkyl, and/or may not be C$_{13}$ alkyl, and/or may not be C$_{14}$ alkyl, and/or may not be C$_{15}$ alkyl, and/or may not be C$_{16}$ alkyl, and/or may not be C$_{17}$ alkyl, and/or may not be C$_{18}$ alkyl, and/or may not be C$_{19}$ alkyl, and/or may not be C$_{20}$ alkyl. In certain examples, a biocidal composition does not include a compound of formula (IV) and/or the copper-assisting additive is not a compound of formula (IV).

Certain examples of compounds of formula (IV) may include particular counterions such that the compounds of formula (IV) complex with, interact with, or otherwise affect copper (for example, by affecting the persistence of a given oxidation state, such as copper(I)), but not as desirably or preferably as other particular counterions due to the combined effects of chemical phenomena understood by those skilled in the art, including, but not limited to, hydrophobicity, solubility, electronic effects, and/or steric effects resulting from the chemical structure of a particular compound of formula (IV). In certain examples of compounds of formula (IV), a counterion may not be fluoride, and/or may not be chloride, and/or may not be bromide, and/or may not be iodide, and/or may not be hydrogen carbonate, and/or may not be hydrogen sulfate, and/or may not be hydrogen sulfite, and/or may not be hydroxide, and/or may not be nitrate, and/or may not be nitrite, and/or may not be acetate, and/or may not be formate, and/or may not be cyanide, and/or may not be tetrafluoroborate, and/or may not be hexafluorophosphate, and/or may not be perchlorate, and/or may not be trifluoromethanesulfonate.

In an example, the biocidal composition includes copper in an amount of at least 0.01 at. % based on 100 weight percent of the biocidal composition. In certain examples, the biocidal composition includes copper in an amount of less than 10 at. % based on a total 100 weight percent of the biocidal composition. In certain examples, the biocidal composition includes copper in an amount (at. % based on 100 weight percent of the biocidal composition) of 0.01-10, 0.01-9, 0.01-8, 0.01-7, 0.01-6, 0.01-5, 0.01-4, 0.01-3, 0.01-2, 0.01-1, 0.01-0.9, 0.01-0.8, 0.01-0.7, 0.01-0.6, 0.01-0.5, 0.01-0.4, 0.01-0.3, 0.01-0.2, 0.01-0.1, 0.01-0.05, 0.02-10, 0.02-9, 0.02-8, 0.02-7, 0.02-6, 0.02-5, 0.02-4, 0.02-3, 0.02 2, 0.02-1, 0.02-0.9, 0.02-0.8, 0.02-0.7, 0.02-0.6, 0.02-0.5, 0.02-0.4, 0.02-0.3, 0.02-0.2, 0.02-0.1, 0.02-0.05, 0.05-10, 0.05-9, 0.05-8, 0.05-7, 0.05-6, 0.05-5, 0.05-4, 0.05-3, 0.05-2, 0.05-1, 0.05-0.9, 0.05-0.8, 0.05-0.7, 0.05-0.6, 0.05-0.5, 0.05-0.4, 0.05-0.3, 0.05-0.2, 0.05-0.1, 0.1-10, 0.1-9, 0.1-8, 0.1-7, 0.1-6, 0.1-5, 0.1-4, 0.1-3, 0.1-2, 0.1-1, 0.1-0.9, 0.1-0.8, 0.1-0.7, 0.1-0.6, 0.1-0.5, 0.1-0.4, 0.1-0.3, 0.1-0.2, 0.2-10, 0.2-9, 0.2-8, 0.2-7, 0.2-6, 0.2-5, 0.2-4, 0.2-3, 0.2-2, 0.2-1, 0.2-0.9, 0.2-0.8, 0.2-0.7, 0.2-0.6, 0.2-0.5, 0.2-0.4, 0.2-0.3, 0.3-10, 0.3-9, 0.3-8, 0.3-7, 0.3-6, 0.3-5, 0.3-4, 0.3-3, 0.3-2, 0.3-1, 0.3-0.9, 0.3-0.8, 0.3-0.7, 0.3-0.6, 0.3-0.5, 0.3-0.4, 0.4-10, 0.4-9, 0.4-8, 0.4-7, 0.4-6, 0.4-5, 0.4-4, 0.4-3, 0.4-2, 0.4-1, 0.4-0.9, 0.4-0.8, 0.4-0.7, 0.4-0.6, 0.4-0.5, 0.5-10, 0.5-9, 0.5 8, 0.5-7, 0.5-6, 0.5-5, 0.5-4, 0.5-3, 0.5-2, 0.5-1, 0.5-0.9, 0.5-0.8, 0.5-0.7, 0.5 0.6, 0.6-10, 0.6-9, 0.6-8, 0.6-7, 0.6-6, 0.6-5, 0.6-4, 0.6-3, 0.6-2, 0.6-1, 0.6-0.9, 0.6-0.8, 0.6-0.7, 0.7-10, 0.7-9, 0.7-8, 0.7-7, 0.7-6, 0.7-5, 0.7-4, 0.7-3, 0.7-2, 0.7-1, 0.7-0.9, 0.7-0.8, 0.8-10, 0.8-9, 0.8-8, 0.8-7, 0.8-6, 0.8-5, 0.8-4, 0.8 3, 0.8-2, 0.8-1, 0.8-0.9, 0.9-10, 0.9-9, 0.9-8, 0.9-7, 0.9-6, 0.9-5, 0.9-4, 0.9-3, 0.9-2, 0.9-1, 1-10, 1-9, 1-8, 1-7, 1-6, 1-5, 1-4, 1-3, 1-2, 2-10, 2-9, 2-8, 2-7, 2-6, 2-5, 2-4, 2-3, 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9, 9-10, 0.06-0.5, 0.07-0.4, 0.08-0.3, 0.09-0.2, 0.02-1.9, 0.03-1.8, 0.03-1.7, 0.04-1.7, 0.05-1.8, 0.06-1.7, 0.07-1.6, 0.08-1.5, 0.09-1.4, 0.1-1.3, 0.2-1.2, 0.3-1.1; or any combination thereof; or any range formed from any two of the foregoing at. % values; including any subranges therebetween.

In an example, the copper(I) salt alone, the copper-assisting additive alone, or a sum total of both the copper(I) salt and the copper-assisting additive may be described by any of the following numbers and ranges: from 0.01 wt. % based on total 100 wt. % of the carrier or the biocidal composition to 20 wt. % based on weight of the carrier of the biocidal composition, such as, an amount (wt. % based on 100 wt. % of the carrier or the biocidal composition) of 0.01 19, 0.01-18, 0.01-17, 0.01-16, 0.01-15, 0.01-14, 0.01-13, 0.01-12, 0.01-11, 0.01 10, 0.01-9, 0.01-8, 0.01-7, 0.01-6, 0.01-5, 0.01-4.9, 0.01-4.8, 0.01-4.7, 0.01-4.6, 0.01-4.5, 0.01-4.4, 0.01-4.3, 0.01-4.2, 0.01-4.1, 0.01-4, 0.01-3.9, 0.01-3.8, 0.01-3.7, 0.01-3.6, 0.01-3.5, 0.01-3.4, 0.01-3.3, 0.01-3.2, 0.01-3.1, 0.01-3, 0.01-2.9, 0.01-2.8, 0.01-2.7, 0.01-2.6, 0.01-2.5, 0.01-2.4, 0.01-2.3, 0.01-2.2, 0.01-2.1, 0.01-2, 0.01-1.9, 0.01-1.8, 0.01-1.7, 0.01-1.6, 0.01-1.5, 0.01-1.4, 0.01-1.3, 0.01-1.2, 0.01-1.1, 0.01-1, 0.01-0.9, 0.01-0.8, 0.01-0.7, 0.01-0.6, 0.01-0.5, 0.01-0.4, 0.01-0.3, 0.01-0.2, 0.01-0.1, 0.02-5, 0.03-5, 0.04-5, 0.05-5, 0.06-5, 0.07-5, 0.08-5, 0.09-5, 0.1-5, 0.2-5, 0.3-5, 0.4-5, 0.5-5, 0.6-5, 0.7-5, 0.8-5, 0.9-5, 1-5, 1-4, 1-3, 1-2, 2-5, 2-4, 2-3, 3-5, 4-5, 0.1-3, 0.1-2, 0.1-1, 0.1-1.9, 0.1-1.8, 0.1-1.7, 0.1-1.6, 0.1-1.5, 0.1-1.4, 0.1-1.3, 0.1-1.2, 0.1-1.1, 0.1-1, 0.1-0.9, 0.1-0.8, 0.1-0.7, 0.1-0.6, 0.1-0.5, 0.1-0.4, 0.1-0.3, 0.1-0.2, 0.1-5, 0.2-4.5, 0.3-4, 0.4-3.5, 0.5-3, 0.6-2.5, 0.7-2, 0.8-1.5, 0.9-1, 0.15-1.8, 0.2-1.6, 0.25-1.4, 0.3-1.2, 0.35-1, 0.4-0.95, 0.45-0.9, 0.5-0.85, 6-20, 7-20, 8-20, 9-20, 10-20, 11-20, 12 20, 13-20, 14-20, 15-20, 16-20, 17-20, 18-20, 19-20, 0.1-15, 0.5-14, 1-13, 1.5-12, 2-10, or any combination thereof. Such numbers may refer to the absolute amount present, or to the amount added to a composition. The basis weight may be either the carrier or the biocidal composition, as will be made clear from context because, in certain examples, the carrier is a main component of the biocidal composition. As such, in certain examples, the amount of a given component (or components) relative to either the carrier or the biocidal composition will be a similar value.

In one or more examples, the copper(I) salt and the copper-assisting additive may be present in a sum total amount of at least 10 grams per liter of carrier (or biocidal composition), or at least 15 grams per liter of carrier (or biocidal composition), or at least 20 grams per liter of carrier (or biocidal composition), or at least 25 grams per liter of carrier (or biocidal composition), or at least 30 grams per liter of carrier (or biocidal composition), or at least 35 grams per liter of carrier (or biocidal composition), or at least 40 grams per liter of carrier (or biocidal composition).

In an example, the copper(I) salt and copper-assisting additive may be present in a sum total amount (grams per liter of carrier or biocidal composition) of from 1-50, 1-45, 1-40, 1-35, 1-30, 1-25, 1-20, 1-15, 1-10, 1-5, 2-50, 2-45, 2-40, 2-35, 2-30, 2-25, 2-20, 2-15, 2-10, 2-5, 3-50, 3-45, 3-40, 3-35, 3-30, 3-25, 3-20, 3-15, 3-10, 3-5, 4-50, 4-45, 4-40, 4-35, 4-30, 4-25, 4-20, 4-15, 4-10, 4-5, 5-50, 5-45, 5-40, 5-35, 5-30, 5-25, 5-20, 5-15, 5-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25 30, 30-50, 30-45, 30-40, 30-35, 35-50, 35-45, 35-40, 40-50, 40-45, 45-50, 6-50, 6-45, 6-40, 6-35, 6-30, 6-25, 6-20, 6-15, 6-10, 7-50, 7-45, 7-40, 7-35, 7-30, 7-25, 7-20, 7-15, 7-10, 8-50, 8-45, 8-40, 8-35, 8-30, 8-25, 8-20, 8-15, 8-10, 9-50, 9-45, 9-40, 9-35, 9-30, 9-25, 9-20, 9-15, or 9-10. As disclosed elsewhere herein, the basis may be expressed as either carrier or biocidal composition.

In an example, the copper(I) salt may be present in the biocidal composition in an amount of at least 1 gram per liter of biocidal composition or carrier. In certain examples, the copper(I) salt may be present in the biocidal composition or carrier in an amount of less than 135 grams per liter of biocidal composition or carrier. In certain examples, the copper(I) salt may be present in the biocidal composition or carrier in an amount (grams per liter of biocidal composition or carrier) of 1-135, 1-130, 1-125, 1-120, 1-115, 1-110, 1-105, 1-100, 1-95, 1-90, 1-85, 1-80, 1-75, 1-70, 1-65, 1-60, 1-55, 1-50, 1-45, 1-40, 1-35, 1-30, 1-25, 1-20, 1-15, 1-10, 1-5, 2-135, 2-130, 2-125, 2-120, 2-115, 2-110, 2-105, 2-100, 2-95, 2-90, 2-85, 2-80, 2-75, 2-70, 2-65, 2-60, 2-55, 2-50, 2-45, 2-40, 2-35, 2-30, 2-25, 2-20, 2-15, 2-10, 2-5, 5-135, 5-130, 5-125, 5-120, 5-115, 5-110, 5-105, 5-100, 5-95, 5-90, 5-85, 5-80, 5-75, 5-70, 5-65, 5-60, 5-55, 5-50, 5-45, 5-40, 5-35, 5-30, 5-25, 5-20, 5-15, 5-10, 10-135, 10-130, 10-125, 10-120, 10-115, 10-110, 10-105, 10-100, 10-95, 10-90, 10-85, 10-80, 10-75, 10-70, 10-65, 10-60, 10-55, 10-50, 10-45, 10-40, 10-35, 10-30, 10-25, 10-20, 10-15, 15-135, 15-130, 15-125, 15-120, 15-115, 15-110, 15-105, 15-100, 15-95, 15-90, 15-85, 15-80, 15-75, 15-70, 15-65, 15-60, 15-55, 15-50, 15-45, 15-40, 15-35, 15-30, 15-25, 15-20, 20-135, 20-130, 20-125, 20-120, 20-115, 20-110, 20-105, 20-100, 20-95, 20-90, 20-85, 20-80, 20-75, 20-70, 20-65, 20-60, 20-55, 20-50, 20-45, 20-40, 20-35, 20-30, 20-25, 25-135, 25-130, 25-125, 25-120, 25-115, 25-110, 25-105, 25-100, 25-95, 25-90, 25 85, 25-80, 25-75, 25-70, 25-65, 25-60, 25-55, 25-50, 25-45, 25-40, 25-35, 25-30, 30-125, 30-120, 30-115, 30-110, 30-105, 30-100, 30-95, 30-90, 30-85, 30-80, 30-75, 30-70, 30-65, 30-60, 30-55, 30-50, 30-45, 30-40, 30-35, 35-135, 35-130, 35-125, 35-120, 35-115, 35-110, 35-105, 35-100, 35-95, 35-90, 35-85, 35-80, 35-75, 35-70, 35-65, 35-60, 35-55, 35-50, 35-45, 35-40, 40-135, 40-130, 40-125, 40-120, 40-115, 40-110, 40-105, 40-100, 40-95, 40-90, 40-85, 40-80, 40-75, 40-70, 40-65, 40-60, 40-55, 40-50, 40-45, 45-135, 45-130, 45-125, 45-120, 45-115, 45-110, 45-105, 45-100, 45-95, 45-90, 45-85, 45-80, 45-75, 45-70, 45-65, 45-60, 45-55, 45-50, 50-135, 50-130, 50-125, 50-120, 50 115, 50-110, 50-105, 50-100, 50-95, 50-90, 50-85, 50-80, 50-75, 50-70, 50-65, 50-60, 50-55, 55-135, 55-130, 55-125, 55-120, 55-115, 55-110, 55-105, 55 100, 55-95, 55-90, 55-85, 55-80, 55-75, 55-70, 55-65, 55-60, 60-135, 60-130, 60-125, 60-120, 60-115, 60-110, 60-105, 60-100, 60-95, 60-90, 60-85, 60-80, 60-75, 60-70, 60-65, 65-135, 65-130, 65-125, 65-120, 65-115, 65-110, 65 105, 65-100, 65-95, 65-90, 65-85, 65-80, 65-75, 65-70, 70-135, 70-130, 70-125, 70-120, 70-115, 70-110, 70-105, 70-100, 70-95, 70-90, 70-85, 70-80, 70-75, 75-135, 75-130, 75-125, 75-120, 75-115, 75-110, 75-105, 75-100, 75-95, 75-90, 75-85, 75-80, 80-135, 80-130, 80-125, 80-120, 80-115, 80-110, 80-105, 80-100, 80-95, 80-90, 80-85, 85-135, 85-130, 85-125, 85-120, 85-115, 85-110, 85-105, 85-100, 85-95, 85-90, 90-135, 90-130, 90-125, 90-120, 90-115, 90-110, 90-105, 90-100, 90-95, 95-135, 95-130, 95-125, 95-120, 95-115, 95-110, 95-105, 95-100, 100-135, 100-130, 100-125, 100-120, 100-115, 100-110, 100-105, 105-135, 105-130, 105-125, 105-120, 105-115, 105-110, 110-135, 110-130, 110-125, 110-120, 110-115, 115-135, 115-130, 115-125, 115-120, 120-135, 120 130, 120-125, 125-135, 125-130, 130-135; any combination thereof; or any range formed from any two of the foregoing amounts of grams per liter; including any subranges therebetween.

In an example, the molar ratio of the copper in the biocidal composition or the carrier to the copper-assisting additive may be from 1:1 to 1:50, from 1:1 to 1:49, from 1:1 to 1:48, from 1:1 to 1:47, from 1:1 to 1:46, from 1:1 to 1:45, from 1:1 to 1:44, from 1:1 to 1:43, from 1:1 to 1:42, from 1:1 to 1:41, from 1:1 to 1:40, from 1:1 to 1:39, from 1:1 to 1:38, from 1:1 to 1:37, from 1:1 to 1:36, from 1:1 to 1:35, from 1:1 to 1:34, from 1:1 to 1:33, from 1:1 to 1:32, from 1:1 to 1:31, from 1:1 to 1:30, from 1:1 to 1:29, from 1:1 to 1:28, from 1:1 to 1:27, from 1:1 to 1:26, from 1:1 to 1:25, from 1:1 to 1:24, from 1:1 to 1:23, from 1:1 to 1:22, from 1:1 to 1:21, from 1:1 to 1:20, from 1:1 to 1:19, from 1:1 to 1:18, from 1:1 to 1:17, from 1:1 to 1:16, from 1:1 to 1:15, from 1:1 to 1:14.9, from 1:1 to 1:14.8, from 1:1 to 1:14.7, from 1:1 to 1:14.6, from 1:1 to 1:14.5, from 1:1 to 1:14.4, from 1:1 to 1:14.3, from 1:1 to 1:14.2, from 1:1 to 1:14.1, from 1:1 to 1:14.0, from 1:1 to 1:13.9, from 1:1 to 1:13.8, from 1:1 to 1:13.7, from 1:1 to 1:13.6, from 1:1 to 1:13.5, from 1:1 to 1:13.4, from 1:1 to 1:13.3, from 1:1 to 1:13.2, from 1:1 to 1:13.1, from 1:1 to 1:13.0, from 1:1 to 1:12.9, from 1:1 to 1:12.8, from 1:1 to 1:12.7, from 1:1 to 1:12.6, from 1:1 to 1:12.5, from 1:1 to 1:12.4, from 1:1 to 1:12.3, from 1:1 to 1:12.2, from 1:1 to 1:12.1, from 1:1 to 1:12.0, from 1:1 to 1:11.9, from 1:1 to 1:11.8, from 1:1 to 1:11.7, from 1:1 to 1:11.6, from 1:1 to 1:11.5, from 1:1 to 1:11.4, from 1:1 to 1:11.3, from 1:1 to 1:11.2, from 1:1 to 1:11.1, from 1:1 to 1:11.0, from 1:1 to 1:10.9, from 1:1 to 1:10.8, from 1:1 to 1:10.7, from 1:1 to 1:10.6, from 1:1 to 1:10.5, from 1:1 to 1:10.4, from 1:1 to 1:10.3, from 1:1 to 1:10.2, from 1:1 to 1:10.1, from 1:1 to 1:10.0, from 1:1 to 1:9.9, from 1:1 to 1:9.8, from 1:1 to 1:9.7, from 1:1 to 1:9.6, from 1:1 to 1:9.5, from 1:1 to 1:9.4, from 1:1 to 1:9.3, from 1:1 to 1:9.2, from 1:1 to 1:9.1, from 1:1 to 1:9.0, from 1:1 to 1:8.9, from 1:1 to 1:8.8, from 1:1 to 1:8.7, from 1:1 to 1:8.6, from 1:1 to 1:8.5, from 1:1 to 1:8.4, from 1:1 to 1:8.3, from 1:1 to 1:8.2, from 1:1 to 1:8.1, from 1:1 to 1:8.0, from 1:1 to 1:7.9, from 1:1 to 1:7.8, from 1:1 to 1:7.7, from 1:1 to 1:7.6, from 1:1 to 1:7.5, from 1:1 to 1:7.4, from 1:1 to 1:7.3, from 1:1 to 1:7.2, from 1:1 to 1:7.1, from 1:1 to 1:7.0, from 1:1 to 1:6.9, from 1:1 to 1:6.8, from 1:1 to 1:6.7, from 1:1 to 1:6.6, from 1:1 to 1:6.5, from 1:1 to 1:6.4, from 1:1 to 1:6.3, from 1:1 to 1:6.2, from 1:1 to 1:6.1, from 1:1 to 1:6.0, from 1:1 to 1:5.9, from 1:1 to 1:5.8, from 1:1 to 1:5.7, from 1:1 to 1:5.6, from 1:1 to 1:5.5, from 1:1 to 1:5.4, from 1:1 to 1:5.3, from 1:1 to 1:5.2, from 1:1 to 1:5.1, from 1:1 to 1:5.0, from 1:1 to 1:4.9, from 1:1 to 1:4.8, from 1:1 to 1:4.7, from 1:1 to 1:4.6, from 1:1 to 1:4.5, from 1:1 to 1:4.4, from 1:1 to 1:4.3, from 1:1 to 1:4.2, from 1:1 to 1:4.1, from 1:1 to 1:4.0, from 1:1 to 1:3.9, from 1:1 to 1:3.8, from 1:1 to 1:3.7, from 1:1 to 1:3.6, from 1:1 to 1:3.5, from 1:1 to 1:3.4, from 1:1 to 1:3.3, from 1:1 to 1:3.2, from 1:1 to 1:3.1, from 1:1 to 1:3.0, from 1:1 to 1:2.9, from 1:1 to 1:2.8, from 1:1 to 1:2.7, from 1:1 to 1:2.6, from 1:1 to 1:2.5, from 1:1 to 1:2.4, from 1:1 to 1:2.3, from 1:1 to 1:2.2, from 1:1 to 1:2.1, from 1:1 to 1:2.0, from 1:1 to 1:1.9, from 1:1 to 1:1.8, from 1:1 to 1:1.7, from 1:1 to 1:1.6, from 1:1 to 1:1.5, from 1:1 to 1:1.4, from 1:1 to 1:1.3, from 1:1 to 1:1.2, from 1:1 to 1:1.1, from 1:1 to 1:0.9, from 1:1 to 1:0.8, from 1:1 to 1:0.7, from 1:1 to 1:0.6, from 1:1 to 1:0.5, from 1:1 to 1:0.4, from 1:1 to 1:0.3, from 1:1 to 1:0.2, from 1:1 to 1:0.1, from 50:1 to 1:1, from 49:1 to 1:1, from 48:1 to 1:1, from 47:1 to 1:1, from 46:1 to 1:1, from 45:1 to 1:1, from 44:1 to 1:1, from 43:1 to 1:1, from 42:1 to 1:1, from 41:1 to 1:1, from 40:1 to 1:1, from 39:1 to 1:1, from 38:1 to 1:1, from 37:1 to 1:1, from 36:1 to 1:1, from 35:1 to 1:1, from 34:1 to 1:1, from 33:1 to 1:1, from 32:1 to 1:1, from 31:1 to 1:1, from 30:1 to 1:1, from 29:1 to 1:1, from 28:1 to 1:1, from 27:1 to 1:1, from 26:1 to 1:1, from 25:1 to 1:1, from 24:1 to 1:1, from 23:1 to 1:1, from 22:1 to 1:1, from 21:1 to 1:1, from 20:1 to 1:1, from 19:1 to 1:1, from 18:1 to 1:1, from 17:1 to 1:1, from 16:1 to 1:1, from 15:1 to 1:1, from 14.9:1 to 1:1, from 14.8:1 to 1:1, from 14.7:1 to 1:1, from 14.6:1 to 1:1, from 14.5:1 to 1:1, from 14.4:1 to 1:1, from 14.3:1 to 1:1, from 14.2:1 to 1:1, from 14.1:1 to 1:1, from 14.0:1 to 1:1, from 13.9:1 to 1:1, from 13.8:1 to 1:1, from 13.7:1 to 1:1, from 13.6:1 to 1:1, from 13.5:1 to 1:1, from 13.4:1 to 1:1, from 13.3:1 to 1:1, from 13.2:1 to 1:1, from 13.1:1 to 1:1, from 13.0:1 to 1:1, from 12.9:1 to 1:1, from 12.8:1 to 1:1, from 12.7:1 to 1:1, from 12.6:1 to 1:1, from 12.5:1 to 1:1, from 12.4:1 to 1:1, from 12.3:1 to 1:1, from 12.2:1 to 1:1, from 12.1:1 to 1:1, from 12.0:1 to 1:1, from 11.9:1 to 1:1, from 11.8:1 to 1:1, from 11.7:1 to 1:1, from 11.6:1 to 1:1, from 11.5:1 to 1:1, from 11.4:1 to 1:1, from 11.3:1 to 1:1, from 11.2:1 to 1:1, from 11.1:1 to 1:1, from 11.0:1 to 1:1, from 10.9:1 to 1:1, from 10.8:1 to 1:1, from 10.7:1 to 1:1, from 10.6:1 to 1:1, from 10.5:1 to 1:1, from 10.4:1 to 1:1, from 10.3:1 to 1:1, from 10.2:1 to 1:1, from 10.1:1 to 1:1, from 10.0:1 to 1:1, from 9.9:1 to 1:1, from 9.8:1 to 1:1, from 9.7:1 to 1:1, from 9.6:1 to 1:1, from 9.5:1 to 1:1, from 9.4:1 to 1:1, from 9.3:1 to 1:1, from 9.2:1 to 1:1, from 9.1:1 to 1:1, from 9.0:1 to 1:1, from 8.9:1 to 1:1, from 8.8:1 to 1:1, from 8.7:1 to 1:1, from 8.6:1 to 1:1, from 8.5:1 to 1:1, from 8.4:1 to 1:1, from 8.3:1 to 1:1, from 8.2:1 to 1:1, from 8.1:1 to 1:1, from 8.0:1 to 1:1, from 7.9:1 to 1:1, from 7.8:1 to 1:1, from 7.7:1 to 1:1, from 7.6:1 to 1:1, from 7.5:1 to 1:1, from 7.4:1 to 1:1, from 7.3:1 to 1:1, from 7.2:1 to 1:1, from 7.1:1 to 1:1, from 7.0:1 to 1:1, from 6.9:1 to 1:1, from 6.8:1 to 1:1, from 6.7:1 to 1:1, from 6.6:1 to 1:1, from 6.5:1 to 1:1, from 6.4:1 to 1:1, from 6.3:1 to 1:1, from 6.2:1 to 1:1, from 6.1:1 to 1:1, from 6.0:1 to 1:1, from 5.9:1 to 1:1, from 5.8:1 to 1:1, from 5.7:1 to 1:1, from 5.6:1 to 1:1, from 5.5:1 to 1:1, from 5.4:1 to 1:1, from 5.3:1 to 1:1, from 5.2:1 to 1:1, from 5.1:1 to 1:1, from 5.0:1 to 1:1, from 4.9:1 to 1:1, from 4.8:1 to 1:1, from 4.7:1 to 1:1, from 4.6:1 to 1:1, from 4.5:1 to 1:1, from 4.4:1 to 1:1, from 4.3:1 to 1:1, from 4.2:1 to 1:1, from 4.1:1 to 1:1, from 4.0:1 to 1:1, from 3.9:1 to 1:1, from 3.8:1 to 1:1, from 3.7:1 to 1:1, from 3.6:1 to 1:1, from 3.5:1 to 1:1, from 3.4:1 to 1:1, from 3.3:1 to 1:1, from 3.2:1 to 1:1, from 3.1:1 to 1:1, from 3.0:1 to 1:1, from 2.9:1 to 1:1, from 2.8:1 to 1:1, from 2.7:1 to 1:1, from 2.6:1 to 1:1, from 2.5:1 to 1:1, from 2.4:1 to 1:1, from 2.3:1 to 1:1, from 2.2:1 to 1:1, from 2.1:1 to 1:1, from 2.0:1 to 1:1, from 1.9:1 to 1:1, from 1.8:1 to 1:1, from 1.7:1 to 1:1, from 1.6:1 to 1:1, from 1.5:1 to 1:1, from 1.4:1 to 1:1, from 1.3:1 to 1:1, from 1.2:1 to 1:1, from 1.1:1 to 1:1, from 0.9:1 to 1:1, from 0.8:1 to 1:1, from 0.7:1 to 1:1, from 0.6:1 to 1:1, from 0.5:1 to 1:1, from 0.4:1 to 1:1, from 0.3:1 to 1:1, from 0.2:1 to 1:1, or from 0.1:1 to 1:1; or any range formed from any two of the foregoing ratios, including any subratios therebetween. The foregoing ratios generally refer to the moles of copper (calculated on an atomic basis) relative to moles of copper-assisting additive, but such ratios may also be used to express moles of copper(I) salt relative to moles of copper-assisting additive.

Upon combination of the copper(I) salt and the copper-assisting additive with a carrier, as described herein, the composition (for example, biocidal composition) or resulting material may be formed into a desired article (for example, plastic article) or be applied to a surface. Where the composition includes or is, for example, a paint, a clear coat, a UV curable composition, or the like, such a composition may be applied to a surface as a layer. Examples of surfaces to which the biocidal composition may be applied include wood, polymer, metal, glass, ceramic, stone, concrete, cement, mineral, drywall, asphalt, or any combination thereof. Examples of articles that may be formed using the compositions described herein include housings or cases for electronic devices (for example, mobile phones, smart phones, tablets, video players, information terminal devices, laptop computers), architectural structures (for example, countertops, walls, trim, ceilings, floors, exterior facades, and trim), appliances (for example, cooktops, refrigerator doors, and dishwasher doors), information displays (for example, whiteboards), automotive components (for example, dashboard panels, windshields, window components), and high touch surfaces (for example, a computer mouse, a computer keyboard, a railing, a door, a doorknob, a door push plate, a phone, a phone button, or an elevator button). Articles may be formed by any method know in the art, such as by forming a biocidal composition into pellets or a masterbatch, and then extruding, molding (for example, injection molding), or otherwise forming the article into a desired shape. In certain examples, an entire article may include the biocidal composition (for example, an entire article is formed from the biocidal composition). In certain examples, only a portion of an article may be formed from the biocidal composition (for example, by adhering, laminating, coating, or otherwise attaching the biocidal composition to a larger article), facilitating a lower usage amount of the biocidal composition in a larger article. In certain examples, disclosed is a method of forming an article, the method including providing a pellet or masterbatch of the biocidal composition, and then forming the article therefrom by any known technique, such as by extrusion or molding (for example, injection molding). In certain examples, disclosed is a method of preparing a pellet, including forming a biocidal composition into a pellet shape. In certain examples, disclosed is a method of preparing a masterbatch, including mixing a concentrated form of the biocidal composition.

The compositions described herein may include pigments to impart color. Accordingly, the coatings or layers made from such compositions may exhibit a wide variety of colors, depending on the carrier color, mixture of carriers, and amount of particle loading. Moreover, it is contemplated that the compositions and/or coatings described herein will show no adverse effect to paint adhesion as measured by ASTM D4541. In certain examples, the adhesion of the composition or coating to an underlying substrate is greater than the cohesive strength of the substrate. In other words, in testing, the adhesion between the coating and the substrate is so strong that the underlying substrate failed before the coating was separated from the surface of the substrate.

One or more examples of the biocidal compositions of the present disclosure may include the copper(I) salt (which may optionally be pre-treated with a pretreatment solution), a copper-assisting additive, and a carrier with a loading level of the copper(I) salt such that the composition may exhibit resistance or preservation against the presence or growth of foulants (for example, microbes). Foulants include fungi, bacteria, viruses, mold, mildew, algae, and combinations thereof. In certain examples, the presence of foulants in materials, such as paints, varnishes, and the like may cause color changes to the composition, may degrade the integrity of the composition, and may negatively affect various properties of the composition. By including a minimum loading of copper(I) salt (for example, 5 weight % or less, 4 weight % or less, 3 weight % or less, 2 weight % or less, or 1 weight % or less; alternatively or additionally, in an amount of 0 weight % or more, for example, greater than 0 weight %, 0.01 weight % or more, 0.05 weight % or more, 0.1 weight % or more, 0.5 weight % or more, 1 weight % or more, 2 weight % or more, 3 weight % or more, or 4 weight % or more, based on weight of the carrier or composition) and copper-assisting additive in the carrier, the foulants may be eliminated or reduced. In certain examples, the compositions may not include certain components, when fouling is eliminated or reduced. Therefore, the formulations used in one or more examples of the compositions described herein may have more flexibility and variations than previously possible, when used in known compositions that do not include the copper(I) salt.

According to examples of the present disclosure, the biocidal composition may include a carrier, a copper-assisting additive, and a copper(I) salt that has been or has not been pre-treated with a pretreatment solution prior to combining the copper(I) salt with the copper-assisting additive and the carrier. A copper(I) salt that has been pretreated with a pretreatment solution may be referred to as a "treated copper(I) salt." The treated copper(I) salt may be present in the pretreatment solution (for example, dissolved and/or suspended therein), which may then be combined with the copper-assisting additive and the carrier, optionally without an intermediate step to separate the treated copper(I) salt from the pretreatment solution.

In certain examples, the pretreatment solution may contain an ammonia-based material, examples of which may include ammonia and ammonium buffers. For example, the pretreatment solution may include ammonium chloride and/or ammonium phosphate. The ammonium buffers may be made using any suitable material or combination of materials to provide an ammonium buffer having the desired pH, examples of which may include ammonium phosphate monobasic, ammonium phosphate dibasic, monoammonium phosphate ($NH_4H_2PO_4$), ammonium carbonate, and ammonium hydroxide.

In certain examples, the pretreatment solution may contain an ammonia-based and/or amine-based solution having a pH of from 8 to 12, from 8 to 11, from 8 to 10, from 8 to 9, from 9 to 12, from 9 to 11, from 9 to 10, or from 10 to 12.

In certain examples, the pretreatment solution may contain a group (I) hydroxide and/or a group (II) hydroxide. In certain examples, the pretreatment solution may contain a hard base, examples of which may include potassium hydroxide and sodium hydroxide. The group (I) hydroxide, group (II) hydroxide, and/or the hard base may be used alone or in combination with other materials to provide a treatment solution adapted to react with copper when used to treat the copper(I) salt. In certain examples, the group (I) hydroxides, group (II) hydroxides, and/or the hard bases are used to form a pre-treatment solution having a pH of at least 9.

In certain examples, the pretreatment solution may be an alkaline buffer containing one or more components that provide a desired pH and/or a desired chemical group (for example, an amine-based or ammonium-based group). Examples of suitable alkaline buffers may include phosphate buffers, borate buffers, ammonium buffers, carbonate buffers, and combinations thereof. For example, the alkaline buffer may include ammonium phosphate monobasic, potassium phosphate monobasic, ammonium phosphate dibasic, monoammonium phosphate ($NH_4H_2PO_4$), ammonium carbonate, ammonium hydroxide, boric acid, sodium borate (for example, borax decahydrate), potassium chloride, sodium hydroxide, dihydrogen potassium phosphate, sodium phosphate dibasic, sodium phosphate monobasic, sodium phosphate tribasic, potassium phosphate tribasic, phosphoric acid, potassium phosphate dibasic, potassium phosphate monobasic, sodium carbonate, ammonium carbonate, potassium bicarbonate, sodium bicarbonate, and ammonium bicarbonate. In an example, the alkaline buffer may contain dihydrogen potassium phosphate and sodium phosphate dibasic. In another example, the alkaline buffer may contain potassium phosphate monobasic and sodium hydroxide. In yet another example, the alkaline buffer may contain boric acid, potassium chloride, and sodium hydroxide. In yet another example, the alkaline buffer may contain ammonium chloride, ammonium phosphate monobasic, and potassium phosphate monobasic.

In certain examples, the alkaline buffer has a pH of at least 9. For example, the alkaline buffer may have a pH of at least 9, at least 9.5, at least 10, at least 10.5, or at least 11. In certain examples, the alkaline buffer may have a pH of from 9 to 12, from 9.5 to 12, from 10 to 12, from 10.5 to 12, from 11 to 12, from 9 to 11.5, from 9.5 to 11.5, from 10 to 11.5, from 10.5 to 11.5, from 11 to 11.5, from 9 to 11, from 9.5 to 11, from 10 to 11, from 10.5 to 11, from 9 to 10.5, from 9.5 to 10.5, from 10 to 10.5, from 9 to 10, or from 9.5 to 10.

The pretreatment solution may have a pH of between 7 and 12. For example, the pretreatment solution may have a pH of between 8 and 12, or between 8.5 and 10.5. In certain examples, the pretreatment solution may have a pH of from 7 to 12, from 7 to 11.5, from 7 to 11, from 7 to 10.5, from 7 to 10, from 7 to 9.5, from 7 to 9, from 7 to 8, from 7.5 to 12, from 7.5 to 11.5, from 7.5 to 11, from 7.5 to 10.5, from 7.5 to 10, from 7.5 to 9.5, from 7.5 to 9, from 7.5 to 8, from 8 to 12, from 8 to 11.5, from 8 to 11, from 8 to 10.5, from 8 to 10, from 8 to 9.5, from 8 to 9, from 8.5 to 12, from 8.5 to 11.5, from 8.5 to 11, from 8.5 to 10.5, from 8.5 to 10, from 8.5 to 9.5, from 8.5 to 9, from 9 to 12, from 9 to 11.5, from 9 to 11, from 9 to 10.5, from 9 to 10, from 9 to 9.5, from 9.5 to 12, from 9.5 to 11.5, from 9.5 to 11, from 9.5 to 10.5, from 9.5 to 10, from 10 to 12, from 10 to 11.5, or from 10 to 11.

In certain examples, an amount and/or a pH of the pretreatment solution may be selected such that a pH of the combined mixture of the carrier and the copper-assisting additive and the treated copper(I) salt (for example, the copper(I) salt that has been already been treated with the pretreatment solution) is within a predetermined range of an initial pH of the carrier (for example, the pH of the carrier prior to combining with the treated copper-containing material). For example, an amount and/or a pH of the pretreatment solution used to treat the copper(I) salt may be selected such that the pH of the mixture of the carrier and the copper-assisting additive and the treated copper(I) salt is within ±1 units of the initial pH of the carrier. In certain examples, an amount and/or a pH of the pretreatment solution used to treat the copper(I) salt may be selected such that the pH of the mixture of the carrier and the copper-assisting additive and the treated copper(I) salt is within ±0.5, or even ±0.3 units of the initial pH of the carrier. Without wishing to be bound by any theory, it is believed that in some applications, the addition of a solution or a suspension of treated copper(I) salt that significantly affects the total volume and/or pH of the carrier may result in an undesirable change in one or more characteristics of the carrier. For example, when the carrier is a paint, large changes in volume and/or pH following the addition of the treated copper(I) salt may undesirably affect other components of the paint or properties of the paint, such as the color or dispersion of one or more materials in the paint (for example, pigment dispersion).

In certain examples, the copper(I) salt may be neutralized prior to combining with a carrier. In certain examples, and without wishing to be bound by theory, the neutralization is performed to prevent a copper(I) salt that is more acidic or basic than the carrier from destabilizing the carrier. For example, the copper(I) salt may be neutralized to a pH of 7-10, for example, 7-8, 7-9, 8-10, 8-9, or 9-10, or any subrange thereof. In certain examples, a pH of the copper(I) salt may be adjusted to within 3 pH units (for example, within 2.5, 2, 1.5, 1.2, 1, 0.8, 0.5, or 0.2 pH units) of the carrier.

The copper(I) salt may be treated in the pretreatment solution for any amount of time, for example, between 5 minutes and 24 hours, or between 1 hour and 12 hours, and all ranges and sub-ranges therebetween. In certain examples, the copper(I) salt may be pretreated in the pretreatment solution for greater than 5 minutes, greater than 10 minutes, greater than 1 hour, greater than 2 hours, greater than 5 hours, greater than 10 hours, greater than 15 hours, greater than 20 hours, greater than 24 hours, or greater than 48 hours. For example, the copper(I) salt may be pretreated in the pretreatment solution for from 5 minutes to 72 hours, from 5 minutes to 48 hours, from 5 minutes to 36 hours, from 5 minutes to 24 hours, from 5 minutes to 20 hours, from 5 minutes to 10 hours, from 5 minutes to 5 hours, from 5 minutes to 2 hours, from 10 minutes to 72 hours, from 10 minutes to 48 hours, from 10 minutes to 36 hours, from 10 minutes to 24 hours, from 10 minutes to 20 hours, from 10 minutes to 10 hours, from 10 minutes to 5 hours, from 10 minutes to 2 hours, from 60 minutes to 72 hours, from 60 minutes to 48 hours, from 60 minutes to 36 hours, from 60 minutes to 24 hours, from 60 minutes to 20 hours, from 60 minutes to 10 hours, from 60 minutes to 5 hours, from 60 minutes to 2 hours, from 2 hours to 72 hours, from 2 hours to 48 hours, from 2 hours to 36 hours, from 2 hours to 24 hours, from 2 hours to 20 hours, from 2 hours to 10 hours, from 2 hours to 5 hours, from 5 hours to 72 hours, from 5 hours to 48 hours, from 5 hours to 36 hours, from 5 hours to 24 hours, from 5 hours to 20 hours, from 5 hours to 10 hours, from 10 hours to 72 hours, from 10 hours to 48 hours, from 10 hours to 36 hours, from 10 hours to 24 hours, from 10 hours to 20 hours, from 20 hours to 72 hours, from 20 hours to 48 hours, from 20 hours to 36 hours, from 20 hours to 24 hours, from 24 hours to 72 hours, or from 24 hours to 48 hours. In certain examples, the copper(I) salt may be treated in the pretreatment solution for a predetermined period of time and then immediately combined with the carrier and the copper-assisting additive. In other examples, the copper(I) salt may be treated in the pretreatment solution for a minimum period of time and immediately combined with the carrier and the copper-assisting additive and/or stored for a period of time before combining with the carrier and the copper-assisting additive. In certain examples, the mixture of the treated copper(I) salt and the pretreatment solution may be combined directly with the carrier and the copper-assisting additive without an immediate step to separate the treated copper(I) salt from the pretreatment solution. In certain examples, following the pretreatment period, the mixture of the treated copper(I) salt and the pretreatment solution may be combined with one or more additional materials (for example, a solvent or additional buffer) prior to combining the mixture with the carrier and the copper-assisting additive.

Without wishing to be bound by any particular theory, it is believed that the copper(I) salt at least partially or fully dissolves upon being combined with a copper-assisting additive, and copper ions from the copper(I) salt may cause changes in the antimicrobial efficacy and/or a color of the carrier.

Without wishing to be bound by any particular theory, it is believed that treated copper(I) salt that has been pretreated with a pretreatment solution as described herein may provide complexing or precipitating agents that, when combined with a carrier and a copper-assisting additive, may reduce or eliminate the formation of copper-based species that would otherwise cause changes to the antimicrobial efficacy and/or color of the carrier or may result in antimicrobial efficacy and/or a color that does not change substantially over a given time period (for example, at least 7 days, at least 20 days, at least 30 days, at least 60 days, at least 90 days, at least 120 days, at least 150 days, at least 180 days, at least 270 days, at least 1 year, at least 1.5 year, at least 2.0 years, at least 2.5 years, at least 3.0 years, at least 3.5 years, at least 4.0 years, at least 4.5 years, or at least 5.0 years). In an example, when a copper(I) salt is pretreated with monoammonium phosphate, a copper-based complex of $CuH_2PO_4$ may be formed, which stabilizes the copper ions released from the copper(I) salt and may prevent formation of other copper-based complexes that would otherwise cause changes to the antimicrobial efficacy and/or the color of the carrier. It is also believed that a copper(I) salt, when combined with a carrier and a copper-assisting additive, may reduce or eliminate the formation of copper-based complexes that would otherwise cause changes to the antimicrobial efficacy and/or color of the carrier or may result in antimicrobial efficacy and/or a color that does not change substantially over a given time period. Stabilizing the antimicrobial efficacy and/or the color of the carrier may include preventing a reduction of the antimicrobial efficacy below a certain level (for example, below 3 logarithmic reduction) and/or decreasing a shift in color of the carrier after mixing. For example, in paint, clear coat, or UV curable applications, when copper is added to the paint, clear coat, or UV curable composition, the copper may affect the antimicrobial efficacy and/or the color thereof when initially mixed and/or may affect the antimicrobial efficacy and/or the color over time as it is stored and/or after use. In certain examples, the copper(I) salt combined with the copper-assisting additive may result in a maintenance of the antimicrobial efficacy, a prevention of a reduction of the antimicrobial efficacy below a certain level (for example, below 3 logarithmic reduction), a decrease in the color change of the mixture, or any combination thereof, compared to a copper(I) salt absent the copper-assisting additive or the copper-assisting additive absent the copper(I) salt. In certain examples, the treated copper(I) salt and the copper-assisting additive may result in a decrease in the color change of the carrier and/or an increase in the stability of the color of the carrier over time as compared to the copper(I) salt absent the copper-assisting additive or the copper-assisting additive absent the copper(I) salt.

In an example, a biocidal composition may exhibit one or more of the following effects: (1) a greater than 3 logarithmic reduction in a concentration of a microbe selected from the group consisting of *Staphylococcus aureus, Enterobacter aerogenes, Pseudomonas aeruginosa*, Methicillin Resistant *Staphylococcus aureus, E. coli*, SARS-Cov-2, and mixtures thereof; (2) a change in color in the biocidal composition is minimized relative to a change in color of a mixture of the carrier and the copper(I) salt in the absence of the copper-assisting additive or the carrier and the copper-assisting additive absent the copper(I) salt; or (3) any combination thereof. Antimicrobial efficacy may be measured as described elsewhere herein, such as by using the EPA Test.

In an example, a biocidal composition including a carrier, a copper(I) salt, and a copper-assisting additive has better antimicrobial efficacy over time (for example, at least 7 days, or any other time period disclosed herein, such as at least 30 days or at least 90 days) compared to an otherwise identical composition that does not include the copper-assisting additive or does not include the copper(I) salt (for example, in the amounts specified, such as copper in an amount of 0.01 at. % to 10 at. % or 0.01 at. % to 2 at. %; copper(I) salt in the composition in an amount of 0.01 wt. % to 15 wt. %; and/or a molar ratio of the amount of copper to an amount of the copper-assisting additive is from 1:0.1 to 1:25). Similarly, in certain examples, such a biocidal composition also has minimized color change (for example, color drift and/or color shift) compared to an otherwise identical composition, as disclosed elsewhere herein.

In an example, when the biocidal composition is formed into a coating (for example, a dry film) or an article within one day of preparing the biocidal composition and the coating or article is stored at ambient conditions for 7 days or at least 7 days (for example, 10 days or at least 10 days, 15 days or at least 15 days, 20 days or at least 20 days, 25 days or at least 25 days, 30 days or at least 30 days, 40 days or at least 40 days, 50 days or at least 50 days, 60 days or at least 60 days, 75 days or at least 75 days, 90 days or at least 90 days, 100 days or at least 100 days, 120 days or at least 120 days, 150 days or at least 150 days, 180 days or at least 180 days, 365 days or at least 365 days, 2 years or at least 2 years, 3 years or at least 3 years, 4 years or at least 4 years, 5 years or at least 5 years, or 6 years or at least 6 years; alternatively, or additionally, less than 6 years, less than 5 years, less than 4 years, less than 3 years, less than 2 years, less than 365 days, less than 180 days, less than 150 days, less than 120 days, less than 100 days, less than 90 days, less than 75 days, less than 60 days, less than 50 days, less than 40 days, less than 30 days, less than 25 days, less than 20 days, less than 15 days, or less than 10 days) to form a stored coating or stored article, the stored coating or article exhibits greater than 1 logarithmic reduction (for example, greater than 2.5 logarithmic reduction, greater than 3 logarithmic reduction, greater than 3.5 logarithmic reduction, greater than 4 logarithmic reduction, greater than 4.5 logarithmic reduction, or greater than 5 logarithmic reduction; alternatively, or additionally, less than 6 logarithmic reduction, less than 5.5 logarithmic reduction, less than 5 logarithmic reduction, less than 4.5 logarithmic reduction, less than 4 logarithmic reduction, less than 3.5 logarithmic reduction, less than 3 logarithmic reduction, less than 2.5 logarithmic reduction, less than 2 logarithmic reduction, or less than 1.5 logarithmic reduction) in the concentration of microbe selected from the group consisting of *Staphylococcus aureus*, *Enterobacter aerogenes*, *Pseudomonas aeruginosa*, Methicillin Resistant *Staphylococcus aureus*, *E. coli*, SARS-Cov-2, and mixtures thereof. Generally, and without wishing to be bound by theory, it is believed that the above feature shows the longevity of antimicrobial efficacy of a coating (for example, dry film) or article including the biocidal composition overtime. Antimicrobial efficacy can be measured as described elsewhere herein, such as by using the EPA Test.

As used herein, the term "for X days" or "for X years" in which X is a number, means that the longevity of a specified property lasts minimally for X days (or for X years). The longevity of the specified property may last for a longer period of time, and after such longer period of time the specified property (e.g., log reduction or color value) may begin to decrease; however, "for X days" (or "for X years") is met if the specified property was present at X days (or X years). In this regard, the terms "for X days" and the term "for at least X days" are meant to be synonymous terms.

In an example, when the biocidal composition is stored as a liquid (for example, aqueous) composition or suspension at ambient conditions for a period of 7 days or at least 7 days (for example, 10 days or at least 10 days, 15 days or at least 15 days, 20 days or at least 20 days, 25 days or at least 25 days, 30 days or at least 30 days, 40 days or at least 40 days, 50 days or at least 50 days, 60 days or at least 60 days, 75 days or at least 75 days, 90 days or at least 90 days, 100 days or at least 100 days, 120 days or at least 120 days, 150 days or at least 150 days, 180 days or at least 180 days, 365 days or at least 365 days (1 year), 2 years or at least 2 years, 3 years or at least 3 years, 4 years or at least 4 years, 5 years or at least 5 years, or 6 years or at least 6 years; alternatively, or additionally, less than 6 years, less than 5 years, less than 4 years, less than 3 years, less than 2 years, less than 365 days, less than 180 days, less than 150 days, less than 120 days, less than 100 days, less than 90 days, less than 75 days, less than 60 days, less than 50 days, less than 40 days, less than 30 days, less than 25 days, less than 20 days, less than 15 days, or less than 10 days) to form a stored liquid (for example, aqueous) composition or suspension, a coating or article prepared from the stored liquid (or example, aqueous) composition or suspension within one day exhibits greater than 1 logarithmic reduction (for example, greater than 2.5 logarithmic reduction, greater than 3 logarithmic reduction, greater than 3.5 logarithmic reduction, greater than 4 logarithmic reduction, greater than 4.5 logarithmic reduction, or greater than 5 logarithmic reduction; alternatively, or additionally, less than 6 logarithmic reduction, less than 5.5 logarithmic reduction, less than 5 logarithmic reduction, less than 4.5 logarithmic reduction, less than 4 logarithmic reduction, less than 3.5 logarithmic reduction, less than 3 logarithmic reduction, less than 2.5 logarithmic reduction, less than 2 logarithmic reduction, or less than 1.5 logarithmic reduction) in the concentration of microbe selected from the group consisting of *Staphylococcus aureus*, *Enterobacter aerogenes*, *Pseudomonas aeruginosa*, Methicillin Resistant *Staphylococcus aereus*, *E. coli*, SARS-Cov-2, and mixtures thereof. Generally, and without wishing to be bound by theory, it is believed that the above feature shows the antimicrobial efficacy of a coating (for example, dry film) or article after the biocidal composition has been stored in liquid (for example, aqueous) form (for example, a can of paint stored on a shelf or masterbatch awaiting extrusion) for a certain time period. Antimicrobial efficacy may be measured as described elsewhere herein, such as by using the EPA Test.

In an example, minimizing a change in color corresponds to a CIE ΔE* value of the biocidal composition being less than 10, or less than 9, or less than 8, or less than 7, or less than 6, or less than 5, or less than 4, or less than 3, or less than 2, as measured according to formula (V):

$$\Delta E^* = \sqrt{((L^* - L^*_{control})^2 + (a^* - a^*_{control})^2 + (b^* - b^*_{control})^2)} \quad (V)$$

wherein L*, a*, and b* are the CIE L*, a*, and b* values of the biocidal compositions and the L*$_{control}$, a*$_{control}$, and b*$_{control}$ are the CIE L*, a*, and b* values of an otherwise identical composition without either the copper(I) salt or the copper-assisting additive.

In an example, a biocidal composition or a film prepared from the biocidal composition may exhibit (1) a transmittance as measured at each wavelength from 400 to 700 nm, and/or (2) an average transmittance as measured over the wavelength range of from 400 to 700 nm, of at least 50%, or at least 51%, or at least 52%, or at least 53%, or at least 54%, or at least 55%, or at least 56%, or at least 57%, or at least 58%, or at least 59%, or at least 60%, or at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or at least 76%, or at least 77%, or at least 78%, or at least 79%, or at least 80%, or at least 81%, or at least 82%, or at least 83%, or at least 84%, or at least 85%, or at least 86%, or at least 87%, or at least 88%, or at least 89%, or at least 90%, or at least 90.5%, or at least 91.0%, or at least 91.5%, or at least 92.0%, or at least 92.5%, or at least 93.0%, or at least 93.5%, or at least 94.0%, or at least 94.5%, or at least 95.0%, or at least 95.1%, or at least 95.2%, or at least 95.3%, or at least 95.4%, or at least 95.5%, or at least 95.6%, or at least 95.7%, or at least 95.8%, or at least 95.9%, or at least 96.0%, or at least 96.1%, or at least 96.2%, or at least 96.3%, or at least 96.4%, or at least 96.5%, or at least 96.6%, or at least 96.7%, or at least 96.8%, or at least 96.9%, or at least 97.0%, or at least 97.1%, or at least 97.2%, or at least 97.3%, or at least 97.4%, or at least 97.5%, or at least 97.6%, or at least 97.7%, or at least 97.8%, or at least 97.9%, or at least 98.0%, or at least 98.1%, or at least 98.2%, or at least 98.3%, or at least 98.4%, or at least 98.5%, or at least 98.6%, or at least 98.7%, or at least 98.8%, or at least 98.9%, or at least 99.0%, or at least 99.1%, or at least 99.2%, or at least 99.3%, or at least 99.4%, or at least 99.5%, or at least 99.6%, or at least 99.7%, or at least 99.8%, or at least 99.9%, or at least >99.9%; when measured at a thickness of 30 μm. Average transmittance is calculated by summing the transmittance at each wavelength between 400 and 700 nm and dividing by the total number of such wavelengths.

In an example, a biocidal composition, or a film thereof, may exhibit a transmittance as measured at each wavelength from 400 to 700 nanometers that is within 20 percentage points of a second transmittance of an otherwise identical composition or film thereof without either the copper(I) salt or the copper-assisting additive when measured at a thickness of 30 μm; including, for example, within 19.5 percentage points, or within 19.0 percentage points, or within 18.5 percentage points, or within 18.0 percentage points, or within 17.5 percentage points, or within 17.0 percentage points, or within 16.5 percentage points, or within 16.0 percentage points, or within 15.5 percentage points, or within 15.0 percentage points, or within 14.5 percentage points, or within 14.0 percentage points, or within 13.5 percentage points, or within 13.0 percentage points, or within 12.5 percentage points, or within 12.0 percentage points, or within 11.5 percentage points, or within 11.0 percentage points, or within 10.5 percentage points, or within 10.0 percentage points, or within 9.9 percentage points, or within 9.8 percentage points, or within 9.7 percentage points, or within 9.6 percentage points, or within 9.5 percentage points, or within 9.4 percentage points, or within 9.3 percentage points, or within 9.2 percentage points, or within 9.1 percentage points, or within 9.0 percentage points, or within 8.9 percentage points, or within 8.8 percentage points, or within 8.7 percentage points, or within 8.6 percentage points, or within 8.5 percentage points, or within 8.4 percentage points, or within 8.3 percentage points, or within 8.2 percentage points, or within 8.1 percentage points, or within 8.0 percentage points, or within 7.9 percentage points, or within 7.8 percentage points, or within 7.7 percentage points, or within 7.6 percentage points, or within 7.5 percentage points, or within 7.4 percentage points, or within 7.3 percentage points, or within 7.2 percentage points, or within 7.1 percentage points, or within 7.0 percentage points, or within 6.9 percentage points, or within 6.8 percentage points, or within 6.7 percentage points, or within 6.6 percentage points, or within 6.5 percentage points, or within 6.4 percentage points, or within 6.3 percentage points, or within 6.2 percentage points, or within 6.1 percentage points, or within 6.0 percentage points, or within 5.9 percentage points, or within 5.8 percentage points, or within 5.7 percentage points, or within 5.6 percentage points, or within 5.5 percentage points, or within 5.4 percentage points, or within 5.3 percentage points, or within 5.2 percentage points, or within 5.1 percentage points, or within 5.0 percentage points, or within 4.9 percentage points, or within 4.8 percentage points, or within 4.7 percentage points, or within 4.6 percentage points, or within 4.5 percentage points, or within 4.4 percentage points, or within 4.3 percentage points, or within 4.2 percentage points, or within 4.1 percentage points, or within 4.0 percentage points, or within 3.9 percentage points, or within 3.8 percentage points, or within 3.7 percentage points, or within 3.6 percentage points, or within 3.5 percentage points, or within 3.4 percentage points, or within 3.3 percentage points, or within 3.2 percentage points, or within 3.1 percentage points, or within 3.0 percentage points, or within 2.9 percentage points, or within 2.8 percentage points, or within 2.7 percentage points, or within 2.6 percentage points, or within 2.5 percentage points, or within 2.4 percentage points, or within 2.3 percentage points, or within 2.2 percentage points, or within 2.1 percentage points, or within 2.0 percentage points, or within 1.9 percentage points, or within 1.8 percentage points, or within 1.7 percentage points, or within 1.6 percentage points, or within 1.5 percentage points, or within 1.4 percentage points, or within 1.3 percentage points, or within 1.2 percentage points, or within 1.1 percentage points, or within 1.0 percentage points, or within 0.9 percentage points, or within 0.8 percentage points, or within 0.7 percentage points, or within 0.6 percentage points, or within 0.5 percentage points, or within 0.4 percentage points, or within 0.3 percentage points, or within 0.2 percentage points, or within 0.1 percentage points.

In an example, a film of a biocidal composition may have a thickness of from 30 µm to 3000 µm, including, for example, from 40 µm, or from 50 µm, or from 60 µm, or from 70 µm, or from 80 µm, or from 90 µm, or from 100 µm, or from 110 µm, or from 120 µm, or from 130 µm, or from 140 µm, or from 150 µm, or from 160 µm, or from 170 µm, or from 180 µm, or from 190 µm, or from 200 µm, or from 210 µm, or from 220 µm, or from 230 µm, or from 240 µm, or from 250 µm, or from 260 µm, or from 270 µm, or from 280 µm, or from 290 µm, or from 300 µm, or from 310 µm, or from 320 µm, or from 330 µm, or from 340 µm, or from 350 µm, or from 360 µm, or from 370 µm, or from 380 µm, or from 390 µm, or from 400 µm, or from 410 µm, or from 420 µm, or from 430 µm, or from 440 µm, or from 450 µm, or from 460 µm, or from 470 µm, or from 480 µm, or from 490 µm, or from 500 µm, or from 510 µm, or from 520 µm, or from 530 µm, or from 540 µm, or from 550 µm, or from 560 µm, or from 570 µm, or from 580 µm, or from 590 µm, or from 600 µm, or from 610 µm, or from 620 µm, or from 630 µm, or from 640 µm, or from 650 µm, or from 660 µm, or from 670 µm, or from 680 µm, or from 690 µm, or from 700 µm, or from 710 µm, or from 720 µm, or from 730 µm, or from 740 µm, or from 750 µm, or from 760 µm, or from 770 µm, or from 780 µm, or from 790 µm, or from 800 µm, or from 810 µm, or from 820 µm, or from 830 µm, or from 840 µm, or from 850 µm, or from 860 µm, or from 870 µm, or from 880 µm, or from 890 µm, or from 900 µm, or from 910 µm, or from 920 µm, or from 930 µm, or from 940 µm, or from 950 µm, or from 960 µm, or from 970 µm, or from 980 m, or from 990 µm, or from 1000 µm, or from 1050 µm, or from 1100 µm, or from 1150 µm, or from 1200 µm, or from 1250 µm, or from 1300 µm, or from 1350 µm, or from 1400 µm, or from 1450 µm, or from 1500 µm, or from 1550 µm, or from 1600 µm, or from 1650 µm, or from 1700 µm, or from 1750 µm, or from 1800 µm, or from 1850 µm, or from 1900 µm, or from 1950 µm, or from 2000 µm, or from 2050 µm, or from 2100 µm, or from 2150 µm, or from 2200 µm, or from 2250 µm, or from 2300 µm, or from 2350 µm, or from 2400 µm, or from 2450 µm, or from 2500 µm, or from 2550 µm, or from 2600 µm, or from 2650 µm, or from 2700 µm, or from 2750 µm, or from 2800 µm, or from 2850 µm, or from 2900 µm, or from 2950 µm to 3000 µm; or from 30 µm to 40 µm, or to 50 µm, or to 60 µm, or to 70 µm, or to 80 µm, or to 90 µm, or to 100 µm, or to 110 µm, or to 120 µm, or to 130 µm, or to 140 µm, or to 150 µm, or to 160 µm, or to 170 µm, or to 180 µm, or to 190 µm, or to 200 µm, or to 210 µm, or to 220 µm, or to 230 µm, or to 240 µm, or to 250 µm, or to 260 µm, or to 270 µm, or to 280 µm, or to 290 µm, or to 300 µm, or to 310 µm, or to 320 µm, or to 330 µm, or to 340 µm, or to 350 µm, or to 360 µm, or to 370 µm, or to 380 µm, or to 390 µm, or to 400 µm, or to 410 µm, or to 420 µm, or to 430 µm, or to 440 µm, or to 450 µm, or to 460 µm, or to 470 µm, or to 480 µm, or to 490 µm, or to 500 µm, or to 510 µm, or to 520 µm, or to 530 µm, or to 540 µm, or to 550 µm, or to 560 µm, or to 570 µm, or to 580 µm, or to 590 µm, or to 600 µm, or to 610 µm, or to 620 µm, or to 630 µm, or to 640 µm, or to 650 µm, or to 660 µm, or to 670 µm, or to 680 µm, or to 690 µm, or to 700 µm, or to 710 µm, or to 720 µm, or to 730 µm, or to 740 µm, or to 750 µm, or to 760 µm, or to 770 µm, or to 780 µm, or to 790 µm, or to 800 µm, or to 810 µm, or to 820 µm, or to 830 µm, or to 840 µm, or to 850 µm, or to 860 µm, or to 870 µm, or to 880 µm, or to 890 µm, or to 900 µm, or to 910 µm, or to 920 µm, or to 930 µm, or to 940 µm, or to 950 µm, or to 960 µm, or to 970 µm, or to 980 µm, or to 990 µm; or to 1000 µm, or to 1050 µm, or to 1100 µm, or to 1150 µm, or to 1200 µm, or to 1250 µm, or to 1300 µm, or to 1350 µm, or to 1400 µm, or to 1450 µm, or to 1500 µm, or to 1550 µm, or to 1600 µm, or to 1650 µm, or to 1700 µm, or to 1750 µm, or to 1800 µm, or to 1850 µm, or to 1900 µm, or to 1950 µm, or to 2000 µm, or to 2050 µm, or to 2100 µm, or to 2150 µm, or to 2200 µm, or to 2250 µm, or to 2300 µm, or to 2350 µm, or to 2400 µm, or to 2450 µm, or to 2500 µm, or to 2550 µm, or to 2600 µm, or to 2650 µm, or to 2700 µm, or to 2750 µm, or to 2800 µm, or to 2850

μm, or to 2900 μm, or to 2950 μm, or a range formed from any two of the foregoing thicknesses; including any subranges therebetween.

In an example, disclosed is a method of preparing a biocidal composition, the method including combining the copper(I) salt, the copper-assisting additive, and the carrier. In certain examples, the copper(I) salt is first combined with the copper-assisting additive to form a mixture, and the mixture is then combined with the carrier to form the biocidal composition. In other examples, the copper(I) salt and the carrier are first combined to form a mixture, and then the mixture is then combined with the copper-assisting additive to form the biocidal composition. In still other examples, the carrier and the copper-assisting additive are first combined to form a mixture, followed by addition of the copper(I) salt.

In an example, disclosed is a method including applying a biocidal composition to a surface. The biocidal composition may include any of the components described elsewhere herein. In an example, the surface is or includes wood polymer (for example, plastic or rubber), metal (for example, steel, iron, copper, gold, silver, aluminum, tin, platinum, alloys thereof, or any combination thereof), glass (for example, lithium aluminosilicate, borosilicate, chemical strengthened, or ion-exchanged), ceramic, glass-ceramic, stone, concrete, cement, mineral, drywall, asphalt, or any combination thereof. In an example, the method of applying to a surface may be any suitable method, including painting (for example, with a brush or applicator), spraying, spin coating, dipping, and the like, or any combination thereof. For example, the composition may be sprayed on a surface. In some aspects of applying to a surface, such as in a sprayed composition, the copper(I) species (for example, the ion or salt) may be at least partially in a solubilized form (for example, facilitated by complexation with a copper-assisting additive), though such copper(I) species may alternatively or additionally be in a suspension.

In an example, disclosed is a method of improving or sustaining antimicrobial efficacy in a biocidal composition (any biocidal composition disclosed herein), including: combining a carrier, a copper(I) salt, and a copper-assisting additive, wherein the biocidal composition includes copper in an amount of 0.01 at. % to 10 at. %, and the carrier and the copper-assisting additive are different. In certain examples, a molar ratio of the amount of copper to the amount of the copper-assisting additive is from 1:0.1 to 1:25. In certain examples, the copper(I) salt is first combined with the copper-assisting additive to form a mixture, and the mixture is then combined with the carrier to form the biocidal composition. In other examples, the color change in the biocidal composition is minimized relative to a change in color of an otherwise identical composition in the absence of the copper-assisting additive, or an otherwise identical composition absent the copper(I) salt, or an otherwise identical composition absent both the copper-assisting additive and the copper(I) salt. In still other examples, a method of minimizing a color change in a biocidal composition is provided, wherein the copper-assisting additive is any compound or formula disclosed herein (for example, any of compounds of formula (I) to (IV), such as a compound of formula (I), (II), (III), (IV), or any combination thereof). In still other examples, a method of minimizing a color change in a biocidal composition is provided, wherein the copper-assisting additive is any compound disclosed herein, such as 2-ethylhexyl phosphate, bis(2-ethylhexyl)phosphate, methyl phosphate, dimethyl phosphate, trimethyl phosphate, butyl phosphate (for example, n-butyl, sec-butyl, or tert-butyl), dibutyl phosphate (for example, n-butyl, sec-butyl, and/or tert-butyl), tributyl phosphate (for example, n-butyl, sec-butyl, and/or tert-butyl), phenyl phosphate, diphenyl phosphate, triphenyl phosphate, monosodium phosphate, disodium phosphate, trisodium phosphate, benzyl phosphate, dibenzyl phosphate, tribenzyl phosphate, trimethyl phosphite, triethyl phosphite, tris(2,2,2-trifluoroethyl) phosphite, tris(2-ethylhexyl) phosphite, triisopropyl phosphite, tris(hydroxylpropyl) phosphine, tributyl phosphine, 1-butyl-3-methylimidazolium bromide, 1-butyl-3-methylimidazolium bromide, any salt thereof, or any combination thereof. In still other examples, a method of minimizing a color change in a biocidal composition is provided, wherein the composition demonstrates a greater than 3 logarithmic reduction in a concentration of a microbe selected from the group consisting of Staphylococcus aureus, Enterobacter aerogenes, Pseudomonas aeruginosa, Methicillin Resistant Staphylococcus aureus, E. coli, SARS-Cov-2, and mixtures thereof. Antimicrobial efficacy may be measured as described elsewhere herein, such as by using the EPA Test. In still other examples, a method of minimizing a color change in a biocidal composition is provided, wherein a CIE ΔE* value of the biocidal material is less than 10, as measured according to formula (V):

$$\Delta E^* = \sqrt{((L^* - L^*_{control})^2 + (a^* - a^*_{control})^2 + (b^* - b^*_{control})^2)} \quad (V)$$

wherein L*, a*, and b* are the CIE L*, a*, and b* values of the biocidal material and the L*$_{control}$, a*$_{control}$, and b*$_{control}$ are the CIE L*, a*, and b* values of an otherwise identical composition without either the copper(I) salt or the copper-assisting additive.

In an example, a biocidal composition may exhibit a ΔE of less than 10, or less than 9, or less than 8, or less than 7, or less than 6, or less than 5, or less than 4, or less than 3, or less than 2, as measured according to formula (V):

$$\Delta E^* = \sqrt{((L^* - L^*_{control})^2 + (a^* - a^*_{control})^2 + (b^* - b^*_{control})^2)} \quad (V)$$

wherein L*, a*, and b* are CIE values of the biocidal composition after preparing and then, within one day of preparing, storing the biocidal composition at ambient temperature and ambient relative humidity for 7 days (for example, 10 days, 15 days, 20 days, 25 days, 30 days, 40 days, 50 days, 60 days, 75 days, 90 days, 100 days, 120 days, 150 days, 180 days, 365 days, 2 years, 3 years, 4 years, or 5 years, and the L*$_{control}$, a*$_{control}$, and b*$_{control}$ are CIE values of an otherwise identical composition without either the copper(I) salt or the copper-assisting additive.

In an example, the present disclosure provides a biocidal additive formulation that includes a copper(I) salt and a copper-assisting additive. In some aspects, the biocidal additive formulation may be a relatively concentrated formulation to be added to a carrier so as to provide a biocidal composition. In this regard, in some aspects, the biocidal additive formulation may be in the form of a package that may be added to, for example, a can of paint by an end user so as to make the can of paint have antimicrobial properties without substantially impacting color and/or transparency. Such a biocidal additive formulation may also be added by a paint manufacturer during or after production of a bulk quantity of paint so as to impart, for example, desired antimicrobial properties. Examples of a form of a biocidal additive formulation may include a powder, a slurry, a gel, a liquid, a concentrate, and a solution. In certain examples, the biocidal additive formulation may include an antioxidant package.

Antioxidant packages may include single components or ternary mixtures. Examples of antioxidant packages may include primary antioxidants; phenolics, such as BHT; secondary antioxidants, such as Ultranox™ 626, Weston™ 430 ZP, thioester-based antioxidants (thiosynergists), such as dioctadecyl 3,3'-thiodipropionate; ascorbate esters, such as ascorbyl palmitate; or any combination thereof. In certain examples, the biocidal additive formulation may include a reducing agent. Examples of reducing agents may include ascorbic acid, hydroxylamine hydrochloride, various phosphines, sulfite compounds, oxalic acid, sodium thiosulfate, or any combination thereof. In certain examples, the biocidal additive formulation may be in a sealed container including an inert atmosphere.

In an example, the biocidal additive formulation has a molarity of the copper(I) salt dissolved in the biocidal additive formulation of from 20 mM to 200 mM, including, for example, from 25 mM, or from 30 mM, or from 35 mM, or from 40 mM, or from 45 mM, or from 50 mM, or from 55 mM, or from 60 mM, or from 65 mM, or from 70 mM, or from 75 mM, or from 80 mM, or from 85 mM, or from 90 mM, or from 95 mM, or from 100 mM, or from 105 mM, or from 110 mM, or from 115 mM, or from 120 mM, or from 125 mM, or from 130 mM, or from 135 mM, or from 140 mM, or from 145 mM, or from 150 mM, or from 155 mM, or from 160 mM, or from 165 mM, or from 170 mM, or from 175 mM, or from 180 mM, or from 185 mM, or from 190 mM, or from 195 mM to 200 mM; from 20 mM to 25 mM, or to 30 mM, or to 35 mM, or to 40 mM, or to 45 mM, or to 50 mM, or to 55 mM, or to 60 mM, or to 65 mM, or to 70 mM, or to 75 mM, or to 80 mM, or to 85 mM, or to 90 mM, or to 95 mM, or to 100 mM, or to 105 mM, or to 110 mM, or to 115 mM, or to 120 mM, or to 125 mM, or to 130 mM, or to 135 mM, or to 140 mM, or to 145 mM, or to 150 mM, or to 155 mM, or to 160 mM, or to 165 mM, or to 170 mM, or to 175 mM, or to 180 mM, or to 185 mM, or to 190 mM, or to 195 mM; or a range formed from any two of the foregoing molarities; including any subranges therebetween.

In certain examples, the biocidal additive formulation may include a copper-assisting additive at a molarity of the copper-assisting additive in the biocidal additive formulation of from 0.06 mM to 0.6 mM, including, for example, from 0.065 mM, or from 0.07 mM, or from 0.075 mM, or from 0.08 mM, or from 0.085 mM, or from 0.09 mM, or from 0.095 mM, or from 0.1 mM, or from 0.105 mM, or from 0.110 mM, or from 0.115 mM, or from 0.120 mM, or from 0.125 mM, or from 0.130 mM, or from 0.135 mM, or from 0.140 mM, or from 0.145 mM, or from 0.150 mM, or from 0.155 mM, or from 0.160 mM, or from 0.165 mM, or from 0.170 mM, or from 0.175 mM, or from 0.180 mM, or from 0.185 mM, or from 0.190 mM, or from 0.195 mM, or from 0.200 mM, or from 0.205 mM, or from 0.210 mM, or from 0.215 mM, or from 0.220 mM, or from 0.225 mM, or from 0.230 mM, or from 0.235 mM, or from 0.240 mM, or from 0.245 mM, or from 0.250 mM, or from 0.255 mM, or from 0.260 mM, or from 0.265 mM, or from 0.270 mM, or from 0.275 mM, or from 0.280 mM, or from 0.285 mM, or from 0.290 mM, or from 0.295 mM, or from 0.300 mM, or from 0.305 mM, or from 0.310 mM, or from 0.315 mM, or from 0.320 mM, or from 0.325 mM, or from 0.330 mM, or from 0.335 mM, or from 0.340 mM, or from 0.345 mM, or from 0.350 mM, or from 0.355 mM, or from 0.360 mM, or from 0.365 mM, or from 0.370 mM, or from 0.375 mM, or from 0.380 mM, or from 0.385 mM, or from 0.390 mM, or from 0.395 mM, or from 0.400 mM, or from 0.405 mM, or from 0.410 mM, or from 0.415 mM, or from 0.420 mM, or from 0.425 mM, or from 0.430 mM, or from 0.435 mM, or from 0.440 mM, or from 0.445 mM, or from 0.450 mM, or from 0.455 mM, or from 0.460 mM, or from 0.465 mM, or from 0.470 mM, or from 0.475 mM, or from 0.480 mM, or from 0.485 mM, or from 0.490 mM, or from 0.495 mM, or from 0.500 mM, or from 0.505 mM, or from 0.510 mM, or from 0.515 mM, or from 0.520 mM, or from 0.525 mM, or from 0.530 mM, or from 0.535 mM, or from 0.540 mM, or from 0.545 mM, or from 0.550 mM, or from 0.555 mM, or from 0.560 mM, or from 0.565 mM, or from 0.570 mM, or from 0.575 mM, or from 0.580 mM, or from 0.585 mM, or from 0.590 mM, or from 595 mM to 0.600 mM; or from 0.06 mM to 0.065 mM, or to 0.07 mM, or to 0.075 mM, or to 0.08 mM, or to 0.085 mM, or to 0.09 mM, or to 0.095 mM, or to 0.100 mM, or to 0.105 mM, or to 0.110 mM, or to 0.115 mM, or to 0.120 mM, or to 0.125 mM, or to 0.130 mM, or to 0.135 mM, or to 0.140 mM, or to 0.145 mM, or to 0.150 mM, or to 0.155 mM, or to 0.160 mM, or to 0.165 mM, or to 0.170 mM, or to 0.175 mM, or to 0.180 mM, or to 0.185 mM, or to 0.190 mM, or to 0.195 mM, or to 0.200 mM, or to 0.205 mM, or to 0.210 mM, or to 0.215 mM, or to 0.220 mM, or to 0.225 mM, or to 0.230 mM, or to 0.235 mM, or to 0.240 mM, or to 0.245 mM, or to 0.250 mM, or to 0.255 mM, or to 0.260 mM, or to 0.265 mM, or to 0.270 mM, or to 0.275 mM, or to 0.280 mM, or to 0.285 mM, or to 0.290 mM, or to 0.295 mM, or to 0.300 mM, or to 0.305 mM, or to 0.310 mM, or to 0.315 mM, or to 0.320 mM, or to 0.325 mM, or to 0.330 mM, or to 0.335 mM, or to 0.340 mM, or to 0.345 mM, or to 0.350 mM, or to 0.355 mM, or to 0.360 mM, or to 0.365 mM, or to 0.370 mM, or to 0.375 mM, or to 0.380 mM, or to 0.385 mM, or to 0.390 mM, or to 0.395 mM, or to 0.400 mM, or to 0.405 mM, or to 0.410 mM, or to 0.415 mM, or to 0.420 mM, or to 0.425 mM, or to 0.430 mM, or to 0.435 mM, or to 0.440 mM, or to 0.445 mM, or to 0.450 mM, or to 0.455 mM, or to 0.460 mM, or to 0.465 mM, or to 0.470 mM, or to 0.475 mM, or to 0.480 mM, or to 0.485 mM, or to 0.490 mM, or to 0.495 mM, or to 0.500 mM, or to 0.505 mM, or to 0.510 mM, or to 0.515 mM, or to 0.520 mM, or to 0.525 mM, or to 0.530 mM, or to 0.535 mM, or to 0.540 mM, or to 0.545 mM, or to 0.550 mM, or to 0.555 mM, or to 0.560 mM, or to 0.565 mM, or to 0.570 mM, or to 0.575 mM, or to 0.580 mM, or to 0.585 mM, or to 0.590 mM, or to 0.595 mM; or a range formed from any two of the foregoing molarities; including any subranges therebetween.

In some examples, the biocidal additive formulation may include a copper(I) salt and a copper-assisting additive at any of the ratios disclosed elsewhere herein.

In certain examples, the biocidal additive formulation may include a solvent at a molarity of the solvent in the biocidal additive formulation of from 0.8 mM to 8.00 mM, including, for example, from 0.85 mM, or from 0.90 mM, or from 0.95 mM, or from 1.00 mM, or from 1.05 mM, or from 1.10 mM, or from 1.15 mM, or from 1.20 mM, or from 1.25 mM, or from 1.30 mM, or from 1.35 mM, or from 1.40 mM, or from 1.45 mM, or from 1.50 mM, or from 1.55 mM, or from 1.60 mM, or from 1.65 mM, or from 1.70 mM, or from 1.75 mM, or from 1.80 mM, or from 1.85 mM, or from 1.90 mM, or from 1.95 mM, or from 2.00 mM, or from 2.05 mM, or from 2.10 mM, or from 2.15 mM, or from 2.20 mM, or from 2.25 mM, or from 2.30 mM, or from 2.35 mM, or from 2.40 mM, or from 2.45 mM, or from 2.50 mM, or from 2.55 mM, or from 2.60 mM, or from 2.65 mM, or from 2.70 mM, or from 2.75 mM, or from 2.80 mM, or from 2.85 mM, or from 2.90 mM, or from 2.95 mM, or from 3.00 mM, or from 3.05 mM, or from 3.10 mM, or from 3.15 mM, or from 3.20 mM, or from 3.25 mM, or from 3.30 mM, or from 3.35 mM, or from 3.40 mM, or from 3.45 mM, or from 3.50 mM, or from 3.55 mM, or from 3.60 mM, or from 3.65 mM, or from 3.70 mM, or from 3.75 mM, or from 3.80 mM, or from 3.85 mM, or from 3.90 mM, or from 3.95 mM, or from 4.00 mM, or from 4.05 mM, or from 4.10 mM, or from 4.15 mM, or from 4.20 mM, or from 4.25 mM, or from 4.30 mM, or from 4.35 mM, or from 4.40 mM, or from 4.45 mM, or from 4.50 mM, or from 4.55 mM, or from 4.60 mM, or from 4.65 mM, or from 4.70 mM, or from 4.75 mM, or from 4.80 mM, or from 4.85 mM, or from 4.90 mM, or from 4.95 mM, or from 5.00 mM, or from 5.05 mM, or from 5.10 mM, or from 5.15 mM, or from 5.20 mM, or from 5.25 mM, or from 5.30 mM, or from 5.35 mM, or from 5.40 mM, or from 5.45 mM, or from 5.50 mM, or from 5.55 mM, or from 5.60 mM, or from 5.65 mM, or from 5.70 mM, or from 5.75 mM, or from 5.80 mM, or from 5.85 mM, or from 5.90 mM, or from 5.95 mM, or from 6.00 mM, or from 6.05 mM, or from 6.10 mM, or from 6.15 mM, or from 6.20 mM, or from 6.25 mM, or from 6.30 mM, or from 6.35 mM, or from 6.40 mM, or from 6.45 mM, or from 6.50 mM, or from 6.55 mM, or from 6.60 mM, or from 6.65 mM, or from 6.70 mM, or from 6.75 mM, or from 6.80 mM, or from 6.85 mM, or from 6.90 mM, or from 6.95 mM, or from 7.00 mM, or from 7.05 mM, or from 7.10 mM, or from 7.15 mM, or from 7.20 mM, or from 7.25 mM, or from 7.30 mM, or from 7.35 mM, or from 7.40 mM, or from 7.45 mM, or from 7.50 mM, or from 7.55 mM, or from 7.60 mM, or from 7.65 mM, or from 7.70 mM, or from 7.75 mM, or from 7.80 mM, or from 7.85 mM, or from 7.90 mM, or from 7.95 mM to 8.00 mM; or from 0.80 mM to 0.85 mM, or to 0.90 mM, or to 0.95 mM, or to 1.00 mM, or to 1.05 mM, or to 1.10 mM, or to 1.15 mM, or to 1.20 mM, or to 1.25 mM, or to 1.30 mM, or to 1.35 mM, or to 1.40 mM, or to 1.45 mM, or to 1.50 mM, or to 1.55 mM, or to 1.60 mM, or to 1.65 mM, or to 1.70 mM, or to 1.75 mM, or to 1.80 mM, or to 1.85 mM, or to 1.90 mM, or to 1.95 mM, or to 2.00 mM, or to 2.05 mM, or to 2.10 mM, or to 2.15 mM, or to 2.20 mM, or to 2.25 mM, or to 2.30 mM, or to 2.35 mM, or to 2.40 mM, or to 2.45 mM, or to 2.50 mM, or to 2.55 mM, or to 2.60 mM, or to 2.65 mM, or to 2.70 mM, or to 2.75 mM, or to 2.80 mM, or to 2.85 mM, or to 2.90 mM, or to 2.95 mM, or to 3.00 mM, or to 3.05 mM, or to 3.10 mM, or to 3.15 mM, or to 3.20 mM, or to 3.25 mM, or to 3.30 mM, or to 3.35 mM, or to 3.40 mM, or to 3.45 mM, or to 3.50 mM, or to 3.55 mM, or to 3.60 mM, or to 3.65 mM, or to 3.70 mM, or to 3.75 mM, or to 3.80 mM, or to 3.85 mM, or to 3.90 mM, or to 3.95 mM, or to 4.00 mM, or to 4.05 mM, or to 4.10 mM, or to 4.15 mM, or to 4.20 mM, or to 4.25 mM, or to 4.30 mM, or to 4.35 mM, or to 4.40 mM, or to 4.45 mM, or to 4.50 mM, or to 4.55 mM, or to 4.60 mM, or to 4.65 mM, or to 4.70 mM, or to 4.75 mM, or to 4.80 mM, or to 4.85 mM, or to 4.90 mM, or to 4.95 mM, or to 5.00 mM, or to 5.05 mM, or to 5.10 mM, or to 5.15 mM, or to 5.20 mM, or to 5.25 mM, or to 5.30 mM, or to 5.35 mM, or to 5.40 mM, or to 5.45 mM, or to 5.50 mM, or to 5.55 mM, or to 5.60 mM, or to 5.65 mM, or to 5.70 mM, or to 5.75 mM, or to 5.80 mM, or to 5.85 mM, or to 5.90 mM, or to 5.95 mM, or to 6.00 mM, or to 6.05 mM, or to 6.10 mM, or to 6.15 mM, or to 6.20 mM, or to 6.25 mM, or to 6.30 mM, or to 6.35 mM, or to 6.40 mM, or to 6.45 mM, or to 6.50 mM, or to 6.55 mM, or to 6.60 mM, or to 6.65 mM, or to 6.70 mM, or to 6.75 mM, or to 6.80 mM, or to 6.85 mM, or to 6.90 mM, or to 6.95 mM, or to 7.00 mM, or to 7.05 mM, or to 7.10 mM, or to 7.15 mM, or to 7.20 mM, or to 7.25 mM, or to 7.30 mM, or to 7.35 mM, or to 7.40 mM, or to 7.45 mM, or to 7.50 mM, or to 7.55 mM, or to 7.60 mM, or to 7.65 mM, or to 7.70 mM, or to 7.75 mM, or to 7.80 mM, or to 7.85 mM, or to 7.90 mM, or to 7.95 mM; or a range formed from any two of the foregoing molarities; including any subranges therebetween. Examples of organic solvents in biocidal compositions and biocidal additive formulations may include acetonitrile and ethyl acetate.

In an example, the present disclosure provides a biocidal composition, including a carrier; a copper(I) salt; and a copper-assisting additive different from the carrier. The copper-assisting additive may be a compound of formula (I), (II), (III), (IV), or any combination thereof:

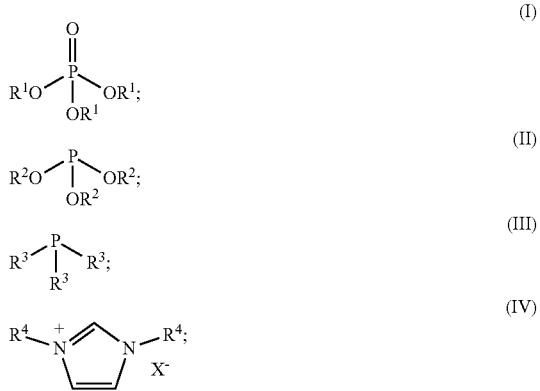

wherein each $R^1$ may be independently selected from hydrogen, $C_1$-$C_{20}$ alkyl, aryl, and aryl($C_1$-$C_4$)alkyl; wherein each $R^2$ may be independently selected from $C_1$-$C_{20}$ alkyl, optionally fluorosubstituted; wherein each $R^3$ may be independently selected from $C_1$-$C_{20}$ alkyl, optionally substituted with a hydroxy group; wherein each $R^4$ may be independently selected from $C_1$-$C_{20}$ alkyl; wherein X may be a counterion; and wherein the biocidal composition, a film thereof, or an article thereof may exhibit an antimicrobial efficacy of at least 3 log kill as measured with an EPA Test after storage of the biocidal composition or the film or article thereof at ambient temperature and ambient relative humidity for 50 days.

In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) tetrafluoromethanesulfonate, tetrakis(acetonitrile)copper(I) hydrogen oxalate-oxalic acid-acetonitrile, copper(I) acetate, or any combination thereof.

In certain examples, the copper-assisting additive may be 2-ethylhexyl phosphate, diphenyl phosphate, dibutyl phosphate, dibenzyl phosphate, triethyl phosphate, trimethyl phosphate, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof.

In certain examples, the biocidal composition may be in a form of a paint, a coating, an elastomeric coating, a caulk, a sealant, a floor polish, a fabric treatment, a stain, a clear coat, a primer, a UV cured composition, a UV curable composition, or a plastic.

In certain examples, the carrier may include an acrylate, a polyvinyl chloride, a latex, an organic solvent, water, or any combination thereof.

In certain examples, the copper(I) salt may be copper(I) bromide; the copper-assisting additive may be trimethyl phosphite, triethyl phosphite, tris(2,2,2-trifluoroethyl) phosphite, or any combination thereof, and wherein the biocidal composition or the film or article thereof may exhibit the antimicrobial efficacy of at least 3 log kill after storage for 60 days.

In certain examples, the copper-assisting additive may be triethyl phosphite; and the biocidal composition or the film or article thereof may exhibit the antimicrobial efficacy of at least 3 log kill after storage for 150 days.

In certain examples, the copper(I) salt may be tetrakis(acetonitrile)copper(I) hexafluorophosphate; the copper-assisting additive may be 2-ethylhexyl phosphate; and the biocidal composition or the film or article thereof may exhibit the antimicrobial efficacy of at least 3 log kill after storage for 1 year.

In certain examples, the copper(I) salt may be copper(I) bromide; the copper-assisting additive may be trimethyl phosphite, triethyl phosphite, tris(2,2,2-trifluoroethyl) phosphite, or any combination thereof; and the biocidal composition may exhibit a ΔE of less than 6, as calculated according to $$\Delta E = \sqrt{((L^* - L^*_{control})^2 + (a^* - a^*_{control})^2 + (b^* - b^*_{control})^2)};$$

L*, a*, and b* may be CIE values of the biocidal composition after preparing and then storing the biocidal composition at ambient temperature and ambient relative humidity for 150 days, and $L^*_{control}$, $a^*_{control}$, and $b^*_{control}$ may be CIE values of an otherwise identical composition without either the copper(I) salt or the copper-assisting additive.

In certain examples, each $R^1$ may be selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; each $R^2$ may be selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; each $R^3$ may be selected from $C_1$-$C_6$ alkyl (or $C_2$-$C_5$ alkyl, or $C_2$-$C_4$ alkyl, or $C_1$-$C_4$ alkyl), optionally substituted with a hydroxy group; and each $R^4$ may be selected from $C_1$-$C_6$ alkyl (or $C_2$-$C_5$ alkyl, or $C_2$-$C_4$ alkyl, or $C_1$-$C_4$ alkyl).

In another example, the present disclosure provides a biocidal composition, including a carrier; a copper(II) salt; and a copper-assisting additive different from the carrier; wherein the biocidal composition or a film thereof may exhibit an antimicrobial efficacy of at least 3 log kill as measured with an EPA Test after the biocidal composition or the film thereof has been stored at ambient temperature and ambient relative humidity for 90 days; and wherein the biocidal composition or the film or article thereof may exhibit a transmittance of at least 98% as measured at each wavelength from 400 to 700 nanometers when measured at a thickness of 30 μm.

In certain examples, a film of the biocidal composition may have a thickness of from 30 μm to 1000 μm.

In certain examples, the copper-assisting additive may be a compound of formula (II), (III), or any combination thereof:

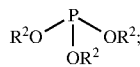
(II)

-continued

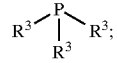
(III)

wherein each $R^2$ may be independently selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; and wherein each $R^3$ may be independently selected from $C_1$-$C_6$ alkyl (or $C_2$-$C_5$ alkyl, or $C_2$-$C_4$ alkyl, or $C_1$-$C_4$ alkyl), optionally substituted with a hydroxy group.

In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof.

In certain examples, the copper-assisting additive may be triethyl phosphite, trimethyl phosphite, tris(2,2,2-trifluoroethyl) phosphite, tributyl phosphine, tris(3-hydroxypropyl) phosphine, or any combination thereof.

In certain examples, the copper(I) salt may be copper(I) bromide; and the copper-assisting additive may be triethyl phosphite, trimethyl phosphite, tris(2,2,2-trifluoroethyl) phosphite, or any combination thereof.

In certain examples, the biocidal composition may exhibit a ΔE of less than 6, as calculated according to $$\Delta E = \sqrt{((L^* - L^*_{control})^2 + (a^* - a^*_{control})^2 + (b^* - b^*_{control})^2)};$$

L*, a*, and b* may be CIE values of the biocidal composition after preparing and then storing the biocidal composition at ambient temperature and ambient relative humidity for 150 days, and $L^*_{control}$, $a^*_{control}$, and $b^*_{control}$ may be CIE values of an otherwise identical composition without either the copper(I) salt or the copper-assisting additive; and the biocidal composition, or the film thereof, may exhibit the antimicrobial efficacy of at least 3 log kill after storage for 150 days.

In certain examples, the biocidal composition, or the film thereof, may exhibit a transmittance as measured at each wavelength from 400 to 700 nanometers that is within 10 percentage points of a second transmittance of an otherwise identical composition or film thereof without either the copper(I) salt or the copper-assisting additive when measured at a thickness of 30 μm.

In yet another example, the present disclosure provides a biocidal composition, including a carrier; a copper(I) salt; and a copper-assisting additive different from the carrier. The copper-assisting additive may be a compound of formula (I), (II), (III), (IV), or any combination thereof:

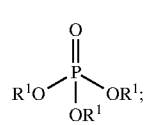
(I)

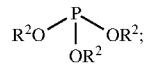
(II)

-continued

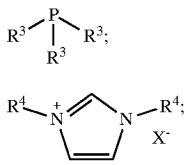
(III)

$$R^4\underset{N}{\overset{+}{\diagdown}}\underset{\diagup}{\overset{}{\diagdown}}N-R^4; \quad X^-$$
(IV)

wherein each $R^1$ may be independently selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; wherein each $R^2$ may be independently selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; wherein each $R^3$ may be independently selected from $C_1$-$C_6$ alkyl (or $C_2$-$C_5$ alkyl, or $C_2$-$C_4$ alkyl, or $C_1$-$C_4$ alkyl), optionally substituted with a hydroxy group; wherein each $R^4$ may be independently selected from $C_1$-$C_6$ alkyl (or $C_2$-$C_5$ alkyl, or $C_2$-$C_4$ alkyl, or $C_1$-$C_4$ alkyl); wherein X may be a counterion; wherein the copper(I) salt may be a copper(I) halide, a tetrakis(acetonitrile)copper(I) salt, or any combination thereof; and wherein the biocidal composition, a film thereof, or an article thereof may exhibit an antimicrobial efficacy of at least 3 log kill as measured with an EPA Test after storage of the biocidal composition or the film or article thereof at ambient temperature and ambient relative humidity for 50 days.

In certain examples, the copper(I) salt may be copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper (I) perchlorate, tetrakis(acetonitrile)copper(I) trifluoromethanesulfonate, tetrakis(acetonitrile)copper(I) hydrogen oxalate-oxalic acid-acetonitrile, or any combination thereof.

In certain examples, the copper-assisting additive may be 2-ethylhexyl phosphate, diphenyl phosphate, dibutyl phosphate, dibenzyl phosphate, triethyl phosphite, trimethyl phosphite, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof.

In certain examples, the biocidal composition may be in a form of a paint, a coating, an elastomeric coating, a caulk, a sealant, a floor polish, a fabric treatment, a stain, a clear coat, a primer, a UV cured composition, a UV curable composition, or a plastic.

In certain examples, the carrier may include an acrylate, a polyvinyl chloride, a latex, an organic solvent, water, or any combination thereof.

In certain examples, the copper(I) salt may be copper(I) bromide; the copper-assisting additive may be trimethyl phosphite, triethyl phosphite, tris(2,2,2-trifluoroethyl) phosphite, or any combination thereof; and the biocidal composition or the film or article thereof may exhibit the antimicrobial efficacy of at least 3 log kill after storage for 60 days.

In yet another example, the present disclosure provides a biocidal additive formulation, including a copper(I) salt and a copper-assisting additive. A biocidal composition including the biocidal additive formulation and a carrier, or a film or article of the biocidal composition, may exhibit an antimicrobial efficacy of at least 3 log kill as measured with an EPA Test after storage of the biocidal composition, the film thereof, or the article thereof at ambient temperature and ambient relative humidity for 1 year. The biocidal composition may exhibit a ΔE of less than 6, as calculated according to:

$$\Delta E = \sqrt{((L^* - L^*_{control})^2 + (a^* - a^*_{control})^2 + (b^* - b^*_{control})^2)};$$

L*, a*, and b* may be CIE values of the biocidal composition after preparing and then storing the biocidal composition at ambient temperature and ambient relative humidity for 150 days, and $L^*_{control}$, $a^*_{control}$, and $b^*_{control}$ may be CIE values of an otherwise identical composition without either the copper(I) salt or the copper-assisting additive.

In certain examples, the copper-assisting additive may be a compound of formula (I), (II), (III), or any combination thereof:

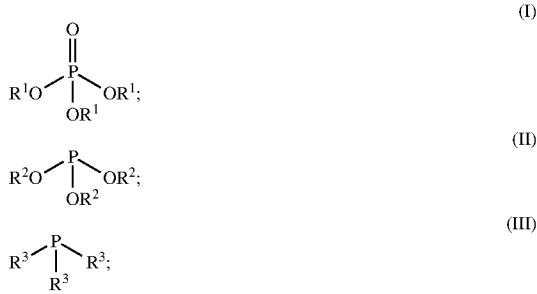

wherein each $R^1$ may be independently selected from hydrogen, $C_1$-$C_{20}$ alkyl, aryl, and benzyl; wherein each $R^2$ may be independently selected from $C_1$-$C_{20}$ alkyl, optionally substituted with a hydroxy group or fluorosubstituted; and wherein each $R^3$ may be independently selected from $C_1$-$C_{20}$ alkyl.

In certain examples, the copper(I) salt may be copper(I) bromide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile) copper(I) hydrogen oxalate-oxalic acid-acetonitrile, or any combination thereof.

In certain examples, the copper-assisting additive may be 2-ethylhexyl phosphate, triethyl phosphite, trimethyl phosphite, tris(2,2,2-trifluoroethyl) phosphite, or any combination thereof. In certain examples, a molarity of the copper(I) salt dissolved in the biocidal additive formulation may be at least 20 mM.

In certain examples, a film of the biocidal composition may have a transmittance of at least 98% as measured at each wavelength from 400 to 700 nanometers when measured at a thickness of 30 μm.

Although the present disclosure has been described with reference to examples and the accompanying figures and charts, the present disclosure is not limited there to, but may be variously modified and altered by those skilled in the art to which the present disclosure pertains without department from the spirit and scope of the present disclosure.

Various aspects are contemplated herein, several of which are set forth in the paragraphs below. It is explicitly contemplated that any aspect or portion thereof can be combined to form a combination.

A first aspect relates to a biocidal composition, comprising: a carrier; a copper(I) salt; and a copper-assisting additive different from the carrier; wherein the copper-assisting additive is a compound of formula (I), (II), (III), (IV), or any combination thereof:

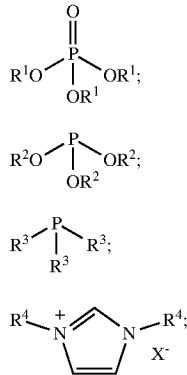

wherein each $R^1$ is independently selected from hydrogen, $C_1$-$C_{20}$ alkyl, aryl, and aryl($C_1$-$C_4$)alkyl; wherein each $R^2$ is independently selected from $C_1$-$C_{20}$ alkyl, optionally fluorosubstituted; wherein each $R^3$ is independently selected form $C_1$-$C_{20}$ alkyl, optionally substituted with a hydroxy group; wherein each $R^4$ is independently selected from $C_1$-$C_{20}$ alkyl; wherein X is a counterion; and wherein the biocidal composition, a film thereof, or an article thereof exhibits an antimicrobial efficacy of at least 3 log kill as measured with an EPA Test after storage of the biocidal composition or the film or article thereof at ambient temperature and ambient relative humidity for 50 days or at least 50 days (or any other time period disclosed herein).

A second aspect relates to the biocidal composition of aspect 1, wherein the copper(I) salt is copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof.

A third aspect relates to the biocidal composition of any preceding aspect, wherein the copper-assisting additive is 2-ethylhexyl phosphate, diphenyl phosphate, dibutyl phosphate, dibenzyl phosphate, triethyl phosphite, trimethyl phosphite, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof.

A fourth aspect relates to the biocidal composition of any preceding aspect, wherein the biocidal composition is in a form of a paint, a coating, an elastomeric coating, a caulk, a sealant, a floor polish, a fabric treatment, a stain, a clear coat, a primer, a UV cured composition, a UV curable composition, or a plastic.

A fifth aspect relates to the biocidal composition of any preceding aspect, wherein the carrier comprises an acrylate, a polyvinyl chloride, a latex, an organic solvent, water, or any combination thereof.

A sixth aspect relates to the biocidal composition of any preceding aspect, wherein the copper(I) salt is copper(I) bromide; wherein the copper-assisting additive is trimethyl phosphite, triethyl phosphite, tris(2,2,2-triefluoroethyl) phosphite, or any combination thereof; and wherein the biocidal composition or the film or article thereof exhibits the antimicrobial efficacy of at least 3 log kill after storage for 60 days or at least 60 days (or any other time period disclosed herein).

A seventh aspect relates to the biocidal composition of any preceding aspect, wherein the copper-assisting additive is triethyl phosphite; and wherein the biocidal composition or the film or article thereof exhibits the antimicrobial efficacy of at least 3 log kill after storage for 150 days or at least 150 days (or any other time period disclosed herein).

An eighth aspect relates to the biocidal composition of aspects 1 to 5, wherein the copper(I) salt is tetrakis(acetonitrile)copper(I) hexafluorophosphate; wherein the copper-assisting additive is 2-ethylhexyl phosphate; and wherein the biocidal composition or the film or article thereof exhibits the antimicrobial efficacy of at least 3 log kill after storage for 1 year.

A ninth aspect relates to the biocidal composition of aspects 1 to 6, wherein the copper(I) salt is copper(I) bromide; wherein the copper-assisting additive is trimethyl phosphite, triethyl phosphite, tris(2,2,2-trifluoroethyl) phosphite, or any combination thereof; and wherein the biocidal composition exhibits a ΔE of less than 6, as calculated according to $$\Delta E = \sqrt{((L^* - L^*_{control})^2 + (a^* - a^*_{control})^2 + (b^* - b^*_{control})^2)};$$

wherein L*, a*, and b* are CIE values of the biocidal composition after preparing and then storing the biocidal composition at ambient temperature and ambient relative humidity for 150 days or at least 150 days (or any other time period disclosed herein), and $L^*_{control}$, $a^*_{control}$, and $b^*_{control}$ are CIE values of an otherwise identical composition without either the copper(I) salt or the copper-assisting additive.

A tenth aspect relates to the biocidal composition of any preceding aspect, wherein each $R^1$ is selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; wherein each $R^2$ is selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; wherein each $R^3$ is selected from $C_1$-$C_6$ alkyl (or $C_2$-$C_5$ alkyl, or $C_2$-$C_4$ alkyl, or $C_1$-$C_4$ alkyl), optionally substituted with a hydroxy group; and wherein each $R^4$ is selected from $C_1$-$C_6$ alkyl (or $C_2$-$C_5$ alkyl, or $C_2$-$C_4$ alkyl, or $C_1$-$C_4$ alkyl).

An eleventh aspect relates to a biocidal composition, comprising: a carrier; a copper(I) salt; and a copper-assisting additive different from the carrier; wherein the biocidal composition or a film thereof exhibits an antimicrobial efficacy of at least 3 log kill as measured with an EPA Test after the biocidal composition or the film thereof has been stored at ambient temperature and ambient relative humidity for 90 days or at least 90 days (or any other time period disclosed herein); and wherein the biocidal composition or the film or article thereof exhibits a transmittance of at least 98% as measured at each wavelength from 400 to 700 nanometers when measured at a thickness of 30 µm.

A twelfth aspect relates to the biocidal composition of aspect 11, or any preceding aspect, having a thickness of from 30 µm to 1000 µm.

A thirteenth aspect relates to the biocidal composition of aspect 11 or 12, or any preceding aspect, wherein the copper-assisting additive is a compound of formula (II), (III), or any combination thereof:

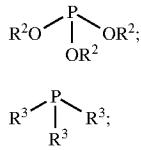

(II)

(III)

wherein each $R^2$ is independently selected from $C_1$-$C_5$ alkyl, optionally fluorosubstituted; and wherein each $R^3$ is independently selected from $C_1$-$C_6$ alkyl, optionally substituted with a hydroxy group.

A fourteenth aspect relates to the biocidal composition of aspects 11 to 13, or any preceding aspect, wherein the copper(I) salt is copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof.

A fifteenth aspect relates to the biocidal composition of aspects 11 to 14, or any preceding aspect, wherein the copper-assisting additive is triethyl phosphite, trimethyl phosphite, tris(2,2,2-trifluoroethyl) phosphite, tributyl phosphine, tris(3-hydroxypropyl) phosphine, or any combination thereof.

A sixteenth aspect relates to the biocidal composition of aspects 11 to 15, or any preceding aspect, wherein the copper(I) salt is copper(I) bromide; and wherein the copper-assisting additive is triethyl phosphite, trimethyl phosphite, tris(2,2,2-trifluoroethyl) phosphite, or any combination thereof.

A seventeenth aspect relates to the biocidal composition of aspects 11 to 16, or any preceding aspect, wherein the biocidal composition exhibits a ΔE of less than 6, as calculated according to $$\Delta E = \sqrt{((L^* - L^*_{control})^2 + (a^* - a^*_{control})^2 + (b^* - b^*_{control})^2)};$$

wherein $L^*$, $a^*$, and $b^*$ are CIE values of the biocidal composition after preparing and then storing the biocidal composition at ambient temperature and ambient relative humidity for 150 days or at least 150 days (or any other time period disclosed herein), and $L^*_{control}$, $a^*_{control}$, and $b^*_{control}$ are CIE values of an otherwise identical composition without either the copper(I) salt or the copper-assisting additive; and wherein the biocidal composition, or the film thereof, exhibits the antimicrobial efficacy of at least 3 log kill after storage for 150 days or at least 150 days (or any other time period disclosed herein).

An eighteenth aspect relates to the biocidal composition of aspects 11 to 17, or any preceding aspect, wherein the biocidal composition, or the film thereof, exhibits a transmittance as measured at each wavelength from 400 to 700 nanometers that is within 10 percentage points of a second transmittance of an otherwise identical composition or film thereof without either the copper(I) salt or the copper-assisting additive when measured at a thickness of 30 μm.

A nineteenth aspect relates to a biocidal composition, comprising: a carrier; a copper(I) salt; and a copper-assisting additive different from the carrier; wherein the copper-assisting additive is a compound of formula (I), (II), (III), (IV), or any combination thereof:

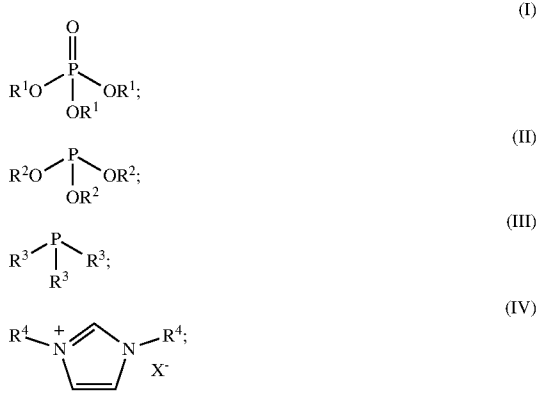

wherein each $R^1$ is independently selected from hydrogen, $C_1$-$C_{13}$ alkyl (or $C_1$-$C_8$ alkyl, or $C_1$-$C_6$ alkyl, or $C_2$-$C_5$ alkyl, or $C_2$-$C_4$ alkyl), phenyl, and benzyl; wherein each $R^2$ is independently selected from $C_1$-$C_5$ alkyl (or $C_1$-$C_6$ alkyl, or $C_2$-$C_5$ alkyl, or $C_2$-$C_4$ alkyl, or $C_1$-$C_4$ alkyl), optionally fluorosubstituted; wherein each $R^3$ is independently selected from $C_1$-$C_6$ alkyl (or $C_2$-$C_5$ alkyl, or $C_2$-$C_4$ alkyl, or $C_1$-$C_4$ alkyl), optionally substituted with a hydroxy group; wherein each $R^4$ is independently selected from $C_1$-$C_6$ alkyl (or $C_2$-$C_5$ alkyl, or $C_2$-$C_4$ alkyl, or $C_1$-$C_4$ alkyl); wherein X is a counterion; wherein the copper(I) salt is a copper(I) halide, a tetrakis(acetonitrile)copper(I) salt, or any combination thereof; and wherein the biocidal composition, a film thereof, or an article thereof exhibits an antimicrobial efficacy of at least 3 log kill as measured with an EPA Test after storage of the biocidal composition or the film or article thereof at ambient temperature and ambient relative humidity for 50 days or at least 50 days (or any other time period disclosed herein).

A twentieth aspect relates to the biocidal composition of aspect 19, or any preceding aspect, wherein the copper(I) salt is copper(I) chloride, copper(I) bromide, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, or any combination thereof.

A twenty-first aspect relates to the biocidal composition of aspect 19 or 20, or any preceding aspect, wherein the copper-assisting additive is 2-ethylhexylphosphate, diphenyl phosphate, dibenzyl phosphate, triethyl phosphite, trimethyl phosphite, tris(2,2,2-trifluoroethyl) phosphite, tributyl phosphine, tris(3-hydroxypropyl) phosphine, 1-butyl-3-methylimidazolium chloride, 1-butyl-3-methylimidazolium bromide, or any combination thereof.

A twenty-second aspect relates to the biocidal composition of aspects 19 to 21, or any preceding aspect, wherein the biocidal composition is in a form of a paint, a coating, an elastomeric coating, a caulk, a sealant, a floor polish, a fabric treatment, a stain, a clear coat, a primer, a UV cured composition, a UV curable composition, or a plastic.

A twenty-third aspect relates to the biocidal composition of aspects 19 to 22, or any preceding aspect, wherein the carrier comprises an acrylate, a polyvinyl chloride, an organic solvent, water, or any combination thereof.

A twenty-fourth aspect relates to the biocidal composition of aspects 19 to 23, or any preceding aspect, wherein the copper(I) salt is copper(I) bromide; wherein the copper-assisting additive is trimethyl phosphite, triethyl phosphite, tris(2,2,2-trifluoroethyl) phosphite, or any combination thereof; and wherein the biocidal composition or the film or article thereof exhibits the antimicrobial efficacy of at least 3 log kill after storage for 60 days or at least 60 days (or any other time period disclosed herein).

A twenty-fifth aspect relates to a biocidal additive formulation, comprising a copper(I) salt and a copper-assisting additive; wherein a biocidal composition comprising the biocidal additive formulation and a carrier, or a film or article of the biocidal composition, exhibits an antimicrobial efficacy of at least 3 log kill as measured with an EPA Test after storage of the biocidal composition, the film thereof, or the article thereof at ambient temperature and ambient relative humidity for 1 year; wherein the biocidal composition exhibits a ΔE of less than 6, as calculated according to $$\Delta E = \sqrt{\left((L^* - L^*_{control})^2 + (a^* - a^*_{control})^2 + (b^* - b^*_{control})^2\right)};$$

wherein L*, a*, and b* are CIE values of the biocidal composition after preparing and then storing the biocidal composition at ambient temperature and ambient relative humidity for 150 days or at least 150 days (or any other time period disclosed herein), and $L^*_{control}$, $a^*_{control}$, and $b^*_{control}$ are CIE values of an otherwise identical composition without either the copper(I) salt or the copper-assisting additive.

A twenty-sixth aspect relates to the biocidal additive formulation of aspect 25, or any preceding aspect, wherein the copper-assisting additive is a compound of formula (I), (II), (III), or any combination thereof:

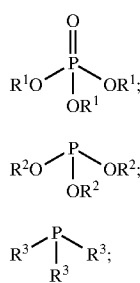

wherein each $R^1$ is independently selected from hydrogen, $C_1$-$C_{20}$ alkyl, aryl, and aryl($C_1$-$C_4$)alkyl; wherein each $R^2$ is independently selected from $C_1$-$C_{20}$ alkyl, optionally substituted with a hydroxy group or fluorosubstituted; and wherein each $R^3$ is independently selected from $C_1$-$C_{20}$ alkyl.

A twenty-seventh aspect relates to the biocidal additive formulation of aspect 25 or 26, or any preceding aspect, wherein the copper(I) salt is copper(I) bromide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, or any combination thereof.

A twenty-eighth aspect relates to the biocidal additive formulation of aspects 25 to 27, or any preceding aspect, wherein the copper-assisting additive is 2-ethylhexyl phosphate, triethyl phosphite, trimethyl phosphite, tris(2,2,2-trifluoroethyl) phosphite, or any combination thereof.

A twenty-ninth aspect relates to the biocidal additive formulation of aspects 25 to 28, or any preceding aspect, wherein a molarity of the copper(I) salt dissolved in the biocidal additive formulation is at least 20 mM.

A thirtieth aspect relates to a film of the biocidal composition of aspects 25 to 29, or any preceding aspect, having a transmittance of at least 98% as measured at each wavelength from 400 to 700 nanometers when measured at a thickness of 30 μm.

The compositions and methods described above may be better understood in connection with the following Examples, which are non-limiting examples provided as an illustration of the concepts disclosed herein. The illustrated methods are applicable to other examples of biocidal compositions of the present disclosure. The procedures described as general methods describe what is believed will be typically effective to prepare the compositions indicated. However, the person skilled in the art will appreciate that it may be necessary to vary the procedures for any given example of the present disclosure, for example, vary the order or steps and/or the chemical reagents used.

EXAMPLES

I. General Considerations.

All experiments were carried out in a fume hood with 18.3 MΩ Millipore grade water that was not degassed. All $Cu^{2+}$ salts were dissolved completely in water. All $Cu^{1+}$ salts (copper(I) salts) were added to biphasic $CH_3CN/H_2O$ mixtures. The copper salt solubility experiments to generate in situ complexes were conducted in either glass dram or scintillation vials. For photochemistry studies, a 2-liter stainless steel liquid nitrogen transporter container cased Dewar with a lid was used to submerge glass vials and ~6"×3" cut paint coupons with stainless curved blunt tweezers.

For paint studies, a one-gallon interior eggshell enamel, Ultra-pure white® 2050, Behr premium plus, and PPG Diamond white paints were purchased. Copper salts procured from Aldrich include: copper(I) acetate (97%), tetrakis(acetonitrile)copper(I) heptafluorophosphate (97%), and copper(I) thiocyanate (99%). Copper salts purchased from Sigma-Aldrich include copper(I) bromide (>98%), copper(I) chloride (reagent grade, 97%), copper(I) iodide (purum, >99.95%), copper(II) sulfate pentahydrate (ACS reagent), and copper(II) acetate monohydrate. Acetonitrile (anhydrous, 99.8%) and ethylamine diamine (reagent plus, >99%) were purchased from Sigma-Aldrich. Tributylphosphine ("TBP") (mixture of isomers, 97%) and Tris(hydroxypropyl) phosphine ("THPP") (>80%) were both purchased from Aldrich. Trimethyl phosphite ("TMP") (>99%), triethyl phosphite ("TEP") (for synthesis, ≥97.0%, GC), Tris(2,2,2-trifluoroethyl) phosphite ("PO—$CF_3$"), and Tris(2,4-di-tert-butylphenyl) phosphite ("TDPP") were all purchased from Sigma-Aldrich.

Trace metals copper(I) oxide ($Cu_2O$), dibenzyl phosphate ("DBzP") (99%), and dibutyl phosphate ("DBP") (≥97.0%, T) were all purchased from Sigma-Aldrich. Microcrystalline diphenyl phosphate ("DPP") with 97% purity was purchased from Thermos Scientific. 2-Ethylhexyl phosphate (mixture of esters for synthesis) ("2-EHP") and L-(+)-ascorbic acid EMD ACS grade was purchased from Millipore Corporation, an affiliate of Merck KGaA. Citric acid monohydrate (Granular/certified ACS) was purchased from Fisher Scientific. 2-Amino-2-methyl-1-propanol ("AMP-95") was purchased from Angus Chemical Company. Sodium hydroxide ("NaOH") solution 50% w/w was purchased from Fisher Chemical.

II. Preparation of Complexes.

A. Preparation of the In Situ [Copper(I) Salt+Phosphine] Complexes.

To a stirring solution of Cu(I)X, where X is —OAc (56 mg, 0.457 mmol), Cl⁻ (44.3 mg, 0.447 mmol), I⁻ (85.7 mg, 0.450 mmol), or SCN⁻ (54.3 mg, 0.446 mmol) in $CH_3CN$ (2.0 mL, 38.3 mmol) was added either tributyl phosphine (TBP) (112 µL, 0.448 mmol) or tris(hydroxypropyl)phosphine (THPP) (87.2 µL, 0.476 mmol) in air. The cloudy mixture was stirred for 5 minutes and then $H_2O$ (3.0 mL) was added. For some samples, the cloudy or colored solutions became colorless, which was used as an indication of reaction/complexation completion. Some reaction times with the Cu(I)X salts and TBP: 2 hours for Cu(I)OAc+TBP; <5 minutes for $Cu(I)C_l$+TBP; up to 3 days for Cu(I)I+TBP; <1 minute for Cu(I)SCN+TBP; <1 minute for Cu(I)X+THPP.

Once the precursor [Cu(I)X+phosphine] solution was prepared, the solution was directly added to paint and thoroughly mixed with a glass rod, then with an overhead mixer fitted with a PTFE-coated stirrer set at 915 rpm, and further with the glass rod. Once the precursor solution was completely mixed with the paint formulation, initial drawdowns were performed with a 7-mil drawdown bar. The drawdowns were cured for at least 7 days before the International Commission on Illumination CIE L*a*b* color space coordinate measurements were recorded using an X-Rite VS450 non-contact spectrophotometer (45/0 geometry).

B. Preparation of the In Situ [Copper(I) Salt+Phosphite] Complexes.

To a stirring solution of Cu(I)Br (64.8 mg, 0.452 mmol) in $CH_3CN$ (2.0 mL, 38.3 mmol) was added either trimethyl phosphite (TMP) (53.0 µL, 0.449 mmol), Triethyl phosphite (TEP) (77.0 µL, 0.449 mmol or 231 µL, 1.35 mmol), or Tris(2,2,2-trifluoroethyl) phosphite (PO—$CF_3$) (99.0 µL, 0.449 mmol) in air. The cloudy mixture was stirred for 5 minutes and then $H_2O$ (3.0 mL) was added. Water in this reaction may be substituted with an alcohol like ethanol at the same volume. All green mixtures [Cu(I)Br in $CH_3CN$] became completely colorless in ~2 hours except for [CuBr+3 equivalents of TEP], which required 3+ hours for reaction completion.

Once the precursor [Cu(I)X+phosphite] solution was prepared, it was directly added to paint stirred at 1100 rpm by overhead mixture. All other procedures were kept the same as above for the [Cu(I)X+phosphine] systems.

C. Preparation of the In Situ [Copper(I) Salt+Phosphate] Complexes.

To a stirring solution of either dibenzyl phosphate (DBzP) (1125.2 mg, 0.450 mmol), diphenyl phosphate (DPP) (112.6 mg, 0.450), or 2-EHP (0.450 mmol) in $CH_3CN$ (2.0 mL, 38.3 mmol) was added Cu(I)Br (64.8 mg, 0.452 mmol), which turned the cloudy mixture dark green. $H_2O$ (3.0 mL) was added to the cloudy mixture and the mixture turned colorless. Unlike the phosphite or phosphine system, a neutralizer was added to the paint prior to adding the Cu mixture. All other procedures described were the same as for phosphite and phosphine systems.

D. Preparation of the [Copper(I) Salt+Phosphite] Precursor Solution for UV Curable film.

To a stirring solution of Cu(I)Br (114.7 mg, 0.800 mmol) in EtOH (2.0 mL, 34.3 mmol) was added triethyl phosphite (TEP) (411.3 µL, 2.40 mmol) in air. This was then added to 1 ID UV-curable formulation to account for a max of 10% ethanol added to the mixture. The copper-containing mixture was stirred and drawdowns were performed like the paints and coatings with a bar before the film was UV-cured.

Figure 11:
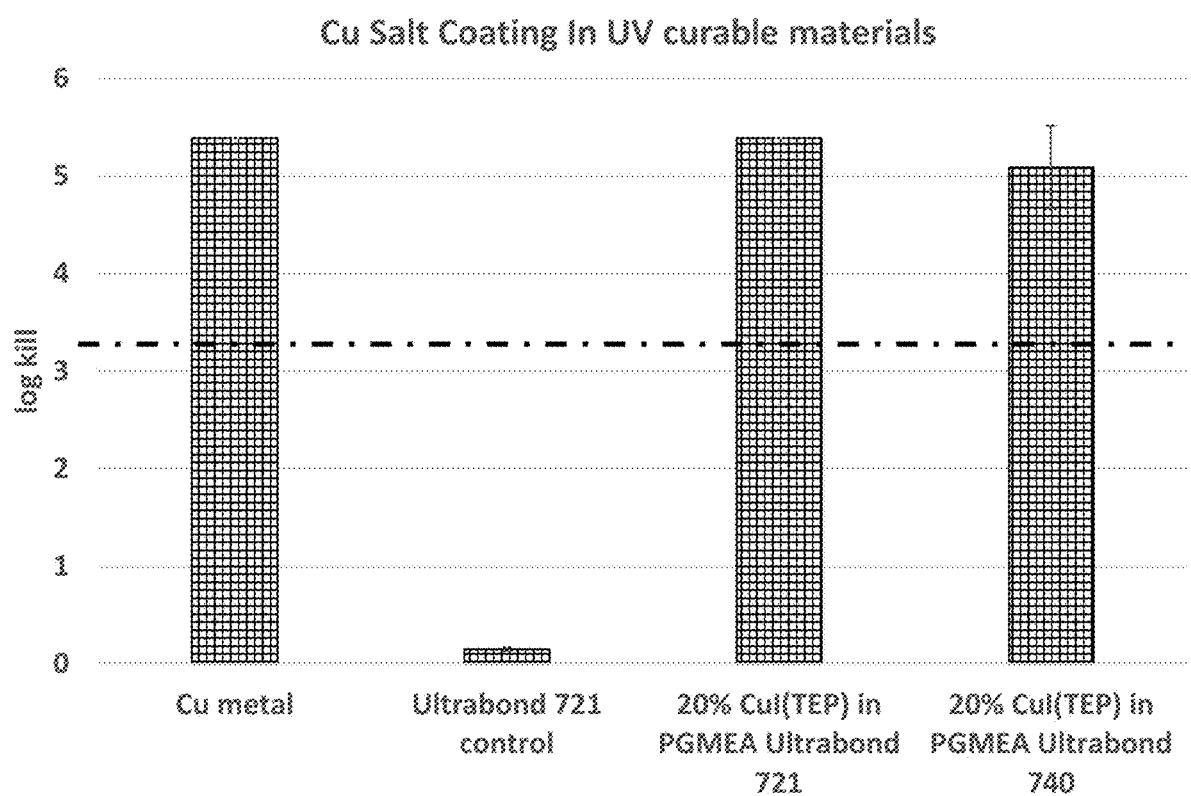
FIG. 11 illustrates a plot of antimicrobial efficacy for UV curable films prepared from examples of biocidal compositions according to the present disclosure including 20 weight % iodo(triethyl phosphite)copper(I) in PGMEA mixed with examples of UV curable films.

Two UV-curable clear and colorless coatings were doped with 20 weight % of iodo(triethyl phosphite)copper(I) ("CuI (TEP)") dissolved in propylene glycol methyl ether acetate ("PGMEA") and samples were prepared by spin coating. The coatings were: (1) all purpose, more reactive, and flexible (Ultrabond® 721, acrylate-based); and (2) glass/metal coating (Ultrabond® 740, methacrylate-based), with CuI(TEP), PGMEA, and UV curable resins as provided below in Table 1. The films remained as colorless as the original coating material, and upon cure, the films demonstrated essentially full kill, as illustrated in FIG. 11.

The coatings had a slight haze, which could be resolved by improving material compability.

TABLE 1

| Condition | Mass CuI(TEP) Salt (g) | Mass PGMEA (g) | Ultrabond ® 721 | Ultrabond ® 740 |
|---|---|---|---|---|
| Ultrabond ® 721 control | 0 | 3 | 0.25 | 0 |
| 20% CuI(TEP) in PGMEA Ultrabond ® 721 | 0.05 | 3 | 0.25 | 0 |
| 20% CuI(TEP) in PGMEA Ultrabond ® 740 | 0.05 | 3 | 0 | 0.25 |

III. Comparison of Complexes with Copper(I) Salts to Mixtures including Copper-Containing Glass.

In the Examples herein, the complexes with copper(I) salts may be compared to mixtures including copper-containing material including a plurality of copper-containing glass or glass-ceramic particles. As used herein, the term "copper-containing glass" is meant to include "copper-containing glass-ceramic" unless clearly contradicted by context. In this regard, the "ceramic" portion of the copper-containing glass-ceramic may include, in some aspects, cuprite crystals.

In certain examples, the copper-containing material may include copper-containing glass or copper-containing glass-ceramic particles. The copper-containing glass or glass-ceramic particles may be a biocidal inorganic glass or glass-ceramic powder including copper particles. Although the individual particles of the copper-containing glass particles may be effective as a biocidal agent, such copper-containing glass may have potential drawbacks related to color of the resulting composition and stability of copper(I).

The copper-containing glass or glass-ceramic particles may independently include a Cu metal, $Cu^{1+}$, $Cu^{2+}$, or a combination of $Cu^{1+}$ and $Cu^{2+}$. The combined total of the Cu species may be 10 weight % or more of the copper-containing material. However, as will be discussed in more detail below, the amount of $Cu^{2+}$ may be minimized or reduced such that the copper-containing glass or glass-ceramic particles may be substantially free of $Cu^{2+}$. The copper may be non-complexed or may have a ligand bonded thereto to form a complex. The $Cu^{1+}$+ ions may be present on or in the surface and/or the bulk of the copper-containing glass or glass-ceramic particles. The copper-containing glass or glass-ceramic particles may include copper-containing glass or glass-ceramic, copper metal, copper(I) oxide, copper(II) oxide, or a combination thereof. In certain examples, the copper-containing glass or glass-ceramic particles may include only one of copper-containing glass or glass-ceramic, copper metal, copper(I) oxide, or copper(II) oxide. In certain examples, the $Cu^{1+}$ ions may be present in a glass or glass-ceramic network and/or a glass or glass-ceramic matrix of the copper-containing glass or glass-ceramic particles. Where the $Cu^{1+}$ ions are present in the glass or glass-ceramic network, the $Cu^{1+}$ ions and atomically bonded to the atoms in the glass or glass-ceramic mixture. Where the $Cu^{1+}$ ions are present in the glass or glass-ceramic matrix, the $Cu^{1+}$ ions may be present in the form of $Cu^{1+}$ crystals that are dispersed in the glass or glass-ceramic matrix. In certain examples, the $Cu^{1+}$ crystals may include cuprite ($Cu_2O$). In certain examples, where $Cu^{1+}$ crystals are present, the material may be referred to as a glass-ceramic or ceramic, which is intended to refer to a specific type of glass or glass-ceramic with crystals that may or may not be subjected to a traditional ceramming process by which one or more crystalline phases are introduced and/or generated in the glass or glass-ceramic. Where the $Cu^{1+}$ ions are present in a non-crystalline form, the material may be referred to as a copper-containing glass. In certain examples, both $Cu^{1+}$ crystals and $Cu^{1+}$ ions not associated with a crystal may be present in the copper-containing glasses or glass-ceramics described herein.

Copper-containing glasses or glass-ceramics may include a copper-containing oxide in an amount, in mole percent, in the range from 10 to 50, from 10 to 49, from 10 to 48, from 10 to 47, from 10 to 46, from 10 to 45, from 10 to 44, from 10 to 43, from 10 to 42, from 10 to 41, from 10 to 40, from 10 to 39, from 10 to 38, from 10 to 37, from 10 to 36, from 10 to 35, from 10 to 34, from 10 to 33, from 10 to 32, from 10 to 31, from 10 to 30, from 10 to 29, from 10 to 28, from 10 to 27, from 10 to 26, from 10 to 25, from 10 to 24, from 10 to 23, from 10 to 22, from 10 to 21, from 10 to 20, from 11 to 50, from 12 to 50, from 13 to 50, from 14 to 50, from 15 to 50, from 16 to 50, from 17 to 50, from 18 to 50, from 19 to 50, from 20 to 50, from 10 to 30, from 11 to 29, from 12 to 28, from 13 to 27, from 14 to 26, from 15 to 25, from 16 to 24, from 17 to 23, from 18 to 22, from 19 to 21; or a range formed from any two of the foregoing mole percents; and all sub-ranges therebetween. The copper-containing oxide may be present in the copper-containing glasses or glass-ceramics in an amount of 20 mole percent, 25 mole percent, 30 mole percent, or 35 mole percent. The copper-containing oxide may include CuO, $Cu_2O$, and/or combinations thereof. The copper-containing glass or glass-ceramic particles may include cuprous oxide in an amount from 29.0 to 36.0 weight percent of the copper-containing glass or glass-ceramic particles. The copper-containing oxides in the copper-containing glasses or glass-ceramics form the $Cu^{1+}$ ions present in the resulting glass or glass-ceramic. Copper may be present in a glass or glass-ceramic, or compositions thereof, in various forms, including $Cu^0$, $Cu^{1+}$, and $Cu^{2+}$.

The copper-containing glass or glass-ceramic portion of the individual particles of the copper-containing glass or glass-ceramic particles may be formed from a glass composition that may include, but is not limited to, in mole percent, $SiO_2$ in the range from 30 to 70, $Al_2O_3$ in the range from 0 to 20, a copper-containing oxide in the range from 10 to 50, CaO in the range from 0 to 15, MgO in the range from 0 to 15, $P_2O_5$ in the range from 0 to 25, $B_2O_3$ in the range from 0 to 25, $K_2O$ in the range from 0 to 20, ZnO in the range from 0 to 5, $Na_2O$ in the range from 0 to 20, and/or $Fe_2O_3$ in the range from 0 to 5, nanoparticles thereof, and/or a mixture thereof. In such examples, the amount of the copper-containing oxide is greater than the amount of $Al_2O_3$. In certain examples, the glass composition may include a content of $R_2O$, where R may include K, Na, Li, Rb, Cs, and combinations thereof.

In certain examples, the glass composition may include one or more divalent cation oxides, such as alkaline earth oxides and/or ZnO. In certain examples, the glass composition may include NiO, $TiO_2$, $Fe_2O_3$, $Cr_2O_3$, or $Co_3O_4$ in an amount in the range up to 10 mol %, or from 0.01 mol % to 10 mol %, from 1 mol % to 10 mol %, from 2 mol % to 10 mol %, from 5 mol % to 10 mol %, from 0.01 mol % to 0.8 mol %, or from 0.01 mol % to 5 mol %.

The copper-containing glasses or glass-ceramics formed from the glass compositions may include a plurality of $Cu^{1+}$ ions. In certain examples, such $Cu^{1+}$ ions form part of the glass network. In certain examples, the $Cu^{1+}$ ions that are dispersed in the glass matrix are $Cu^{1+}$ crystals. The $Cu^{1+}$ may be present in the form of cuprite. The cuprite present in the copper-containing glass-ceramic may form a phase distinct from the glass matrix or glass phase. In other examples, the cuprite may form part of or may be associated with one or more glass phases.

The copper-containing glass may be produced by any suitable method. For example, the copper-containing glass may be performed using melting tanks that are typically used for melting glass compositions such as soda lime silicate. In certain examples, the copper-containing glass may be formed into a sheet using forming processes known in the art. Forming methods may include float glass processes and down-draw processes such as fusion draw and slot draw. After formation, the copper-containing glass may be formed into sheets and may be shaped, polished, or otherwise processed for a desired end use. In certain examples, the copper-containing glass may be ground to a powder or particulate form. In certain examples, the particulate copper-containing glass may be combined with other materials or carriers.

IV. Results.

A. Antimicrobial Efficacy

The representative measurement of antimicrobial efficacy of examples of biocidal compositions is provided herein and representative antimicrobial efficacies are provided.

As illustrated in FIG. 1, triethyl phosphite $(EtO)_3P$ with copper(I) iodide, and tributyl phosphine (TBP) with each of copper(I) acetate, copper(I) chloride, and copper(I) iodide, in Behr 2050® paint or as dry film exhibited an antimicrobial efficacy of at least 3 log kill as measured with an EPA Test after storage of the biocidal composition or the film prepared therefrom at ambient temperature and ambient relative humidity for 50 days. For copper(I) iodide and TBP, FIG. 1 illustrates that the antimicrobial efficacy increased from the initial drawdown value to the value after storage for 50 days. By contrast, THPP with each of copper(I) iodide, copper chloride, and copper(I) thiocyanate, and TBP with copper(I) thiocyanate each demonstrated no antimicrobial efficacy after storage.

Figure 2:
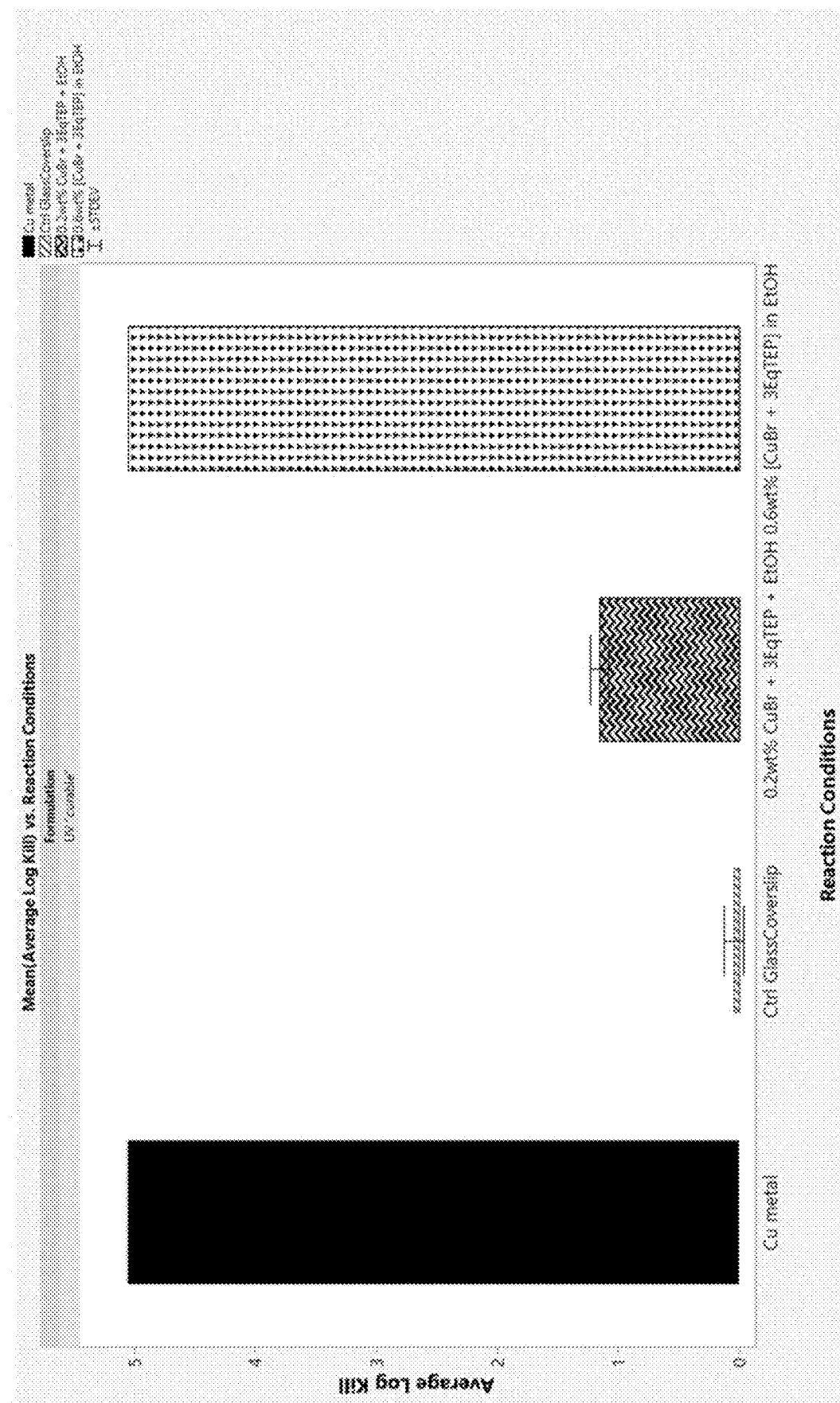
FIG. 2 illustrates a plot of antimicrobial efficacy for UV curable films prepared from an example of a biocidal composition according to the present disclosure including copper(I) bromide and triethyl phosphite.
Figure 7:
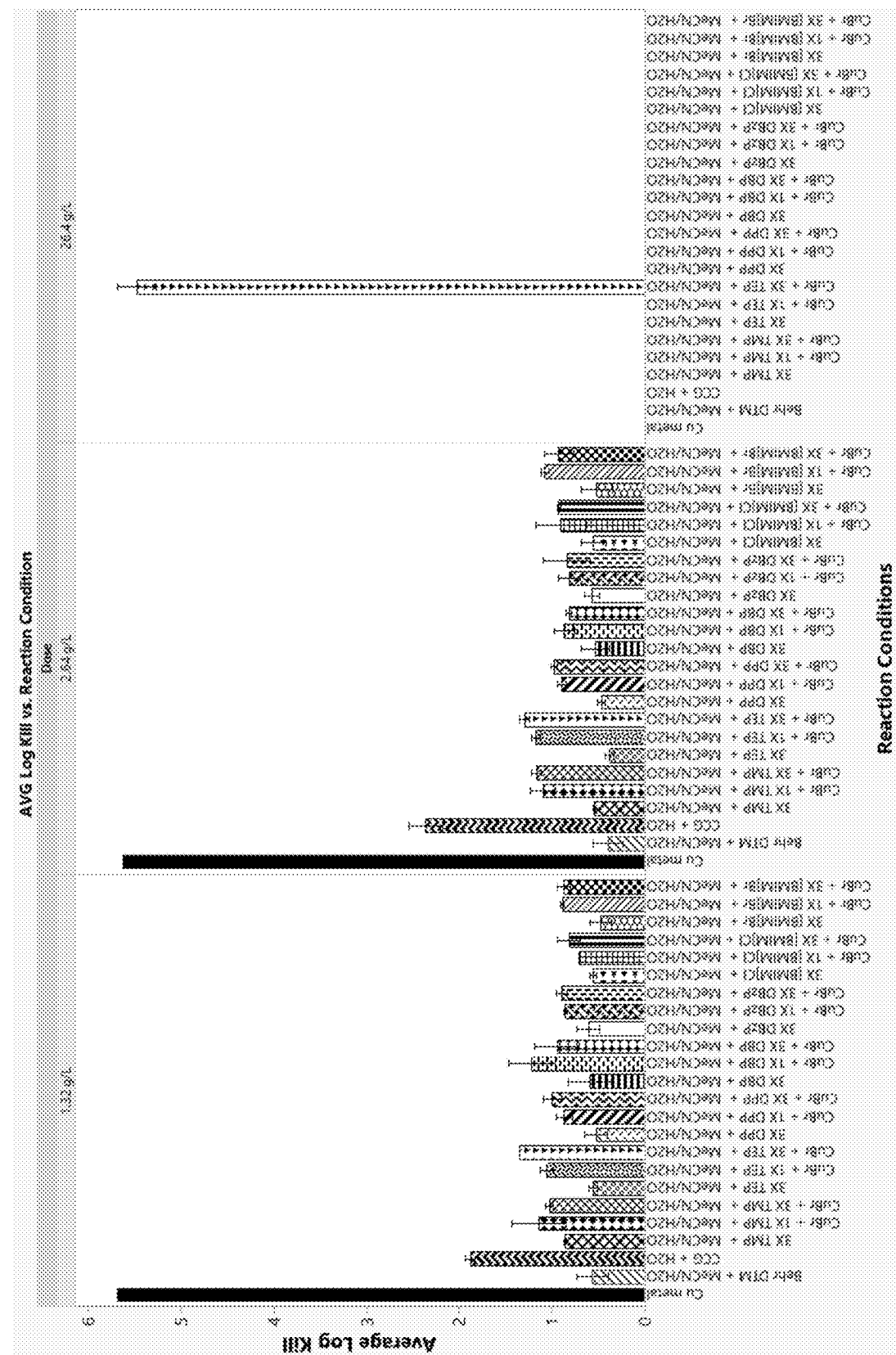
FIG. 7 illustrates a plot of antimicrobial efficacy for various examples of biocidal compositions according to the present disclosure including copper(I) bromide, various copper-assisting additives, and acetonitrile/water as solvent, at concentrations in paint of 0.264 g/L, 2.642 g/L, and 26.42 g/L.

As illustrated in FIG. 2, 11D UV curable film prepared with a precursor solution including 3 weight % copper(I) bromide and 3 molar equivalents of triethyl phosphite (TEP) demonstrated at least 3 log kill after storage of the film or the precursor solution at ambient temperature and ambient relative humidity for 60 days, compared to 1 weight % copper(I) bromide, which demonstrated >2 log kill after storage. Copper metal served as a positive control and a glass coverslip was added as a negative control. Copper(I) bromide with 3 equivalents of TEP in a 2:3 acetonitrile:water solution at a concentration of 26.4 grams per liter in Behr DTM paint demonstrated at least 3 log kill after 30 days at room temperature, as illustrated in FIG. 7. By contrast, copper(I) bromide with each of TMP, DPP, DBzP, DBP, BMIMBr, or BMIMCl at any concentration of 2:3 acetonitrile:water solution in Behr DTM paint, demonstrated log kill values below 3 log kill.

Figure 10:
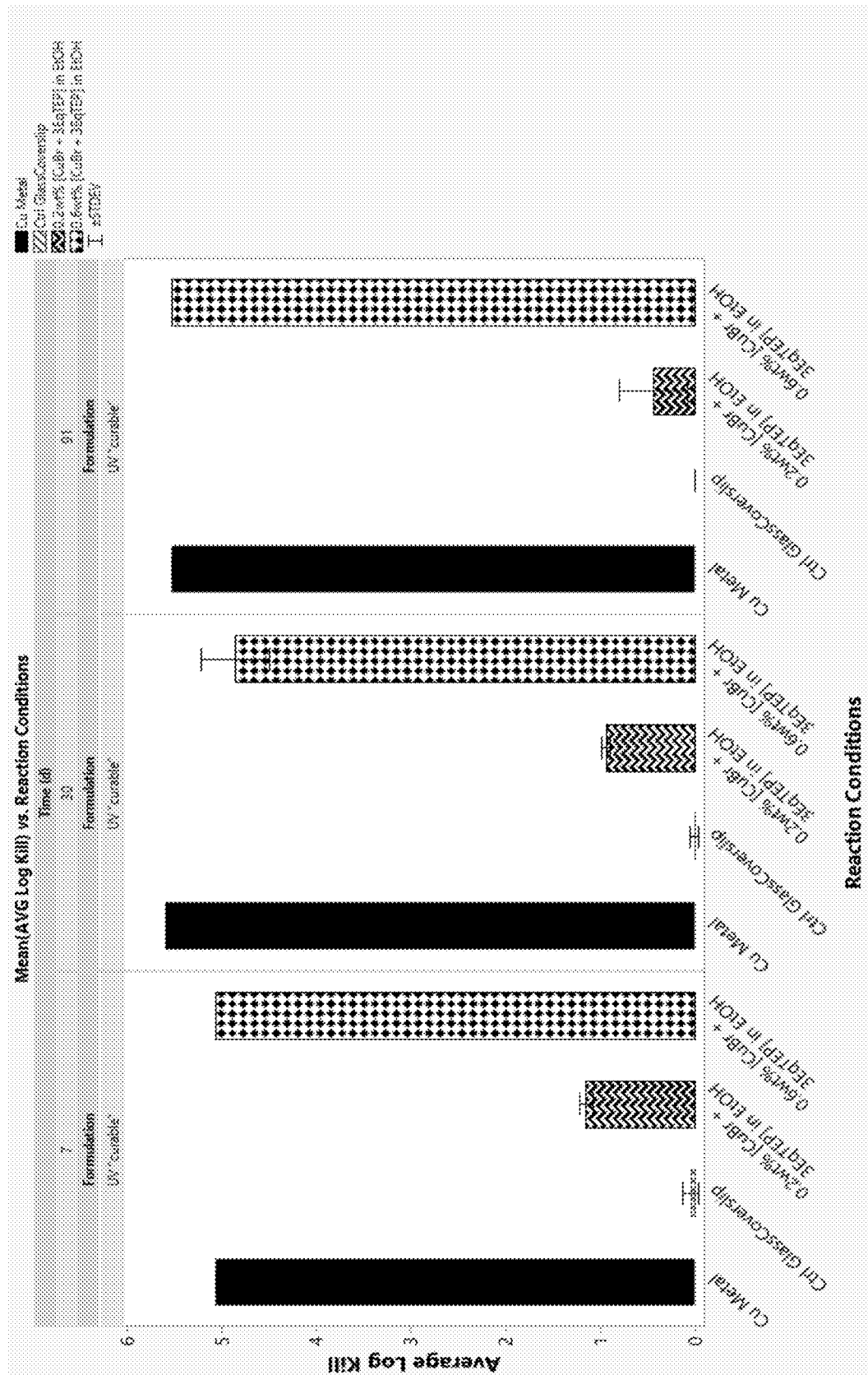
FIG. 10 illustrates a plot of antimicrobial efficacy at 7 days, 30 days, and 91 days for UV curable films prepared from examples of a biocidal composition according to the present disclosure including 0.2 or 0.6 weight % copper(I) bromide and 3 molar equivalents of triethyl phosphite in ethanol.

Further, UV curable films prepared from a precursor solution including ethanol, 0.6 weight 0 copper(I) bromide, and 3 molar equivalents of TEP demonstrated at least 5 log kill for 90 days, whereas films prepared from a precursor solution including 0.2 weight 00 copper(I) bromide with three equivalents of TEP demonstrated less than 3 log kill at 7 days, 30 days, and 90 days, as illustrated in FIG. 10 and Table 2 below.

TABLE 2

| Reaction Conditions | Time (days) | Average Log Kill | Standard Deviation |
|---|---|---|---|
| Cu Metal | 7 | 5.06 | 0.00 |
| Control Glass Coverslip | 7 | 0.04 | 0.08 |
| 0.2 weight % CuBr and 3 equiv. TEP in EtOH | 7 | 1.32 | 0.13 |
| 0.2 weight % CuBr and 3 equiv. TEP in EtOH | 7 | 0.99 | 0.01 |
| 0.6 weight % CuBr and 3 equiv. TEP in EtOH | 7 | 5.06 | 0.00 |
| 0.6 weight % CuBr and 3 equiv. TEP in EtOH | 7 | 5.06 | 0.00 |
| Cu Metal | 30 | 5.58546073 | 0 |
| Control Glass Coverslip | 30 | 0.007034779 | 0.048589 |
| 0.2 weight % CuBr and 3 equiv. TEP in EtOH | 30 | 1.052092832 | 0.081595 |
| 0.2 weight % CuBr and 3 equiv. TEP in EtOH | 30 | 0.831932388 | 0.00975 |
| 0.6 weight % CuBr and 3 equiv. TEP in EtOH | 30 | 4.355764486 | 0.38955 |
| 0.6 weight % CuBr and 3 equiv. TEP in EtOH | 30 | 5.346900102 | 0.337376 |
| Cu Metal | 91 | 5.51851394 | 0 |
| Control Glass Coverslip | 91 | 0 | 0 |
| 0.2 weight % CuBr and 3 equiv. TEP in EtOH | 91 | 0.46205316 | 0.409139 |
| 0.2 weight % CuBr and 3 equiv. TEP in EtOH | 91 | 0.409987379 | 0.306869 |
| 0.6 weight % CuBr and 3 equiv. TEP in EtOH | 91 | 5.51851394 | 0 |
| 0.6 weight % CuBr and 3 equiv. TEP in EtOH | 91 | 5.51851394 | 0 |

Figure 3:
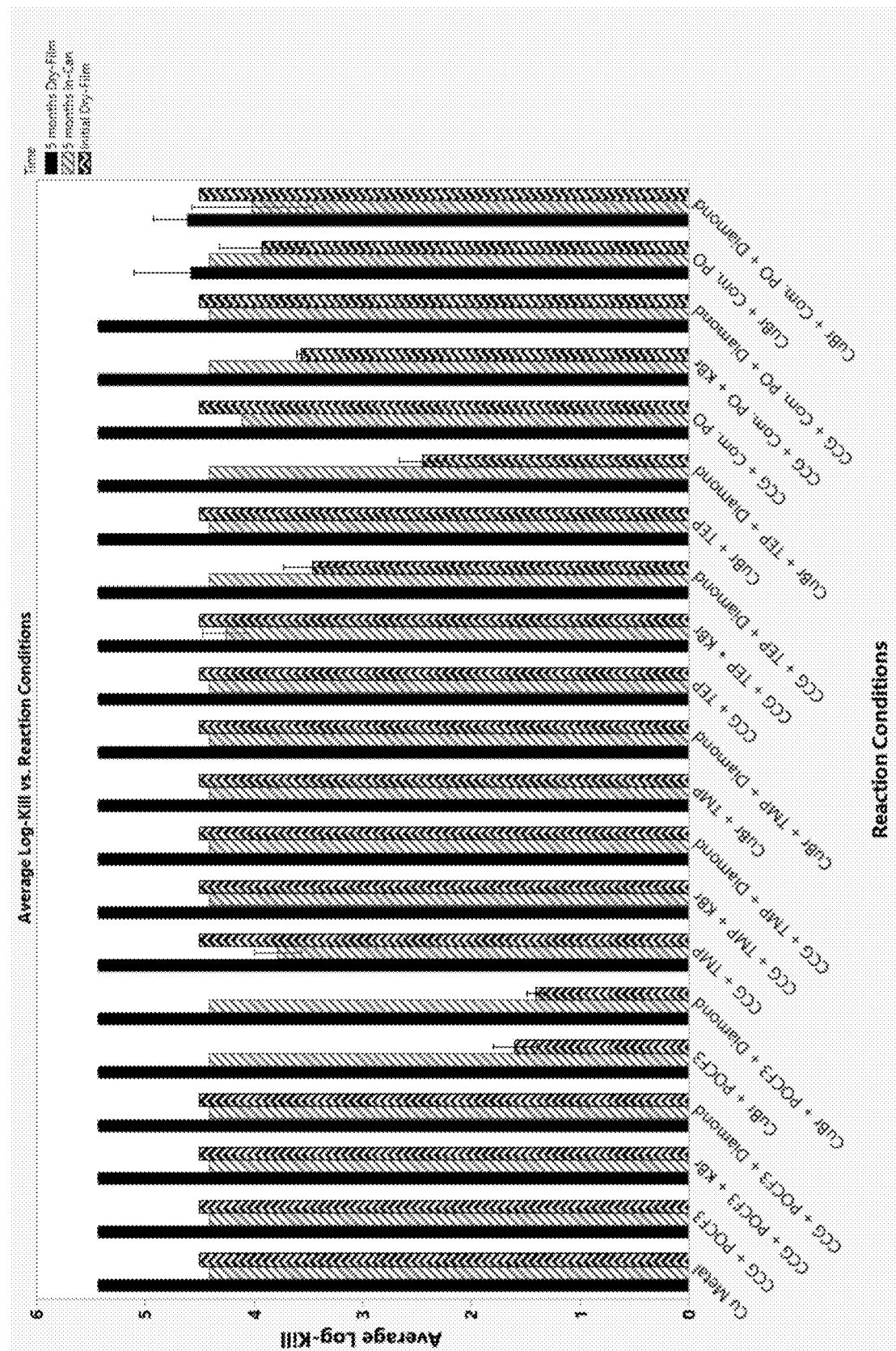
FIG. 3 illustrates a plot of antimicrobial efficacy for various examples of biocidal compositions according to the present disclosure at initial drawdown, as well as after 150 days in-can and after 150 days application as a dry-film, as compared to control paint samples and compositions including a copper-containing glass.

As illustrated in FIG. 3, examples of biocidal compositions were tested for antimicrobial efficacy as dry-film compositions both initially and at 5 months after application as a dry-film; and after 5 months of storage in a paint can followed by 7 days after application as a dry-film. The examples of biocidal compositions included copper(I) bromide and each of PO—CF$_3$, trimethyl phosphite (TMP), and triethyl phosphite (TEP) in each of Behr 2050@ and PPG Diamond® paints. After 5 months (or 150 days), each composition including copper(I) bromide and PO—CF$_3$, TMP, or TEP demonstrated at least 3 log kill, demonstrating antimicrobial efficacy values that are comparable to either copper metal or to biocidal compositions including copper-containing glass.

Figure 4:
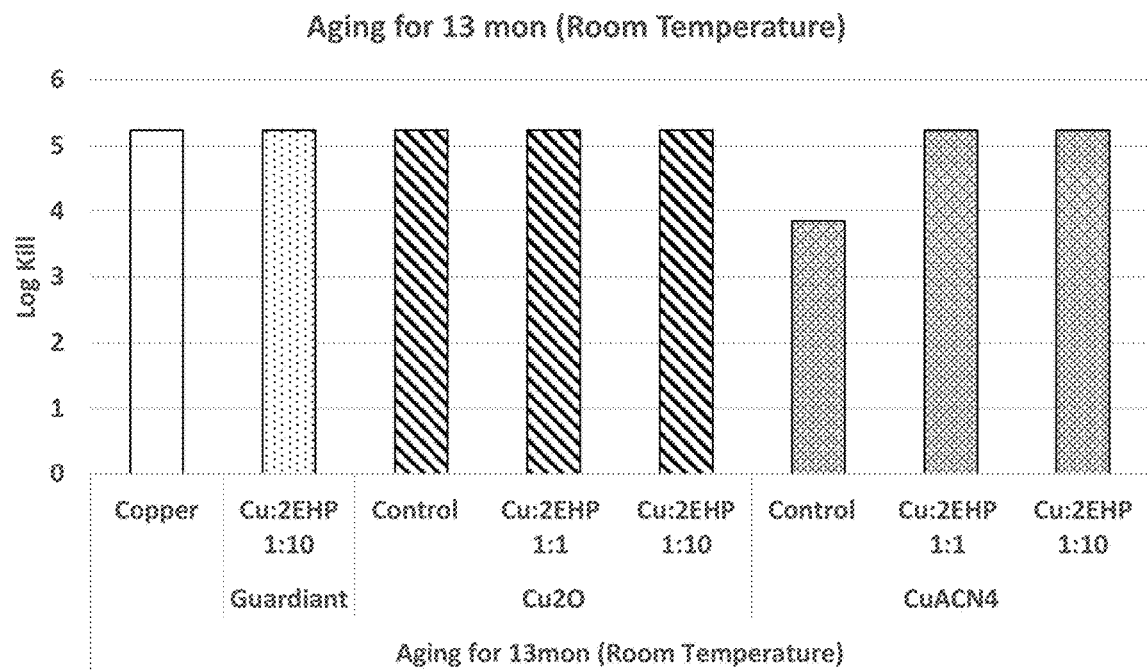
FIG. 4 illustrates a plot of antimicrobial efficacy for various examples of biocidal compositions according to the present disclosure including tetrakis(acetonitrile)copper(I) hexafluorophosphate and 2-ethylhexyl phosphate at different molar ratios, after 13 months of storage at ambient temperature.

As illustrated in FIG. 4, an example of a biocidal composition including tetrakis(acetonitrile)copper(I) hexafluorophosphate and 2-ethylhexyl phosphate (2-EHP) in a 1:1 or 1:10 molar ratio demonstrated at least 3 log kill antimicrobial efficacy after storage at ambient temperature for over 1 year.

Figure 5:
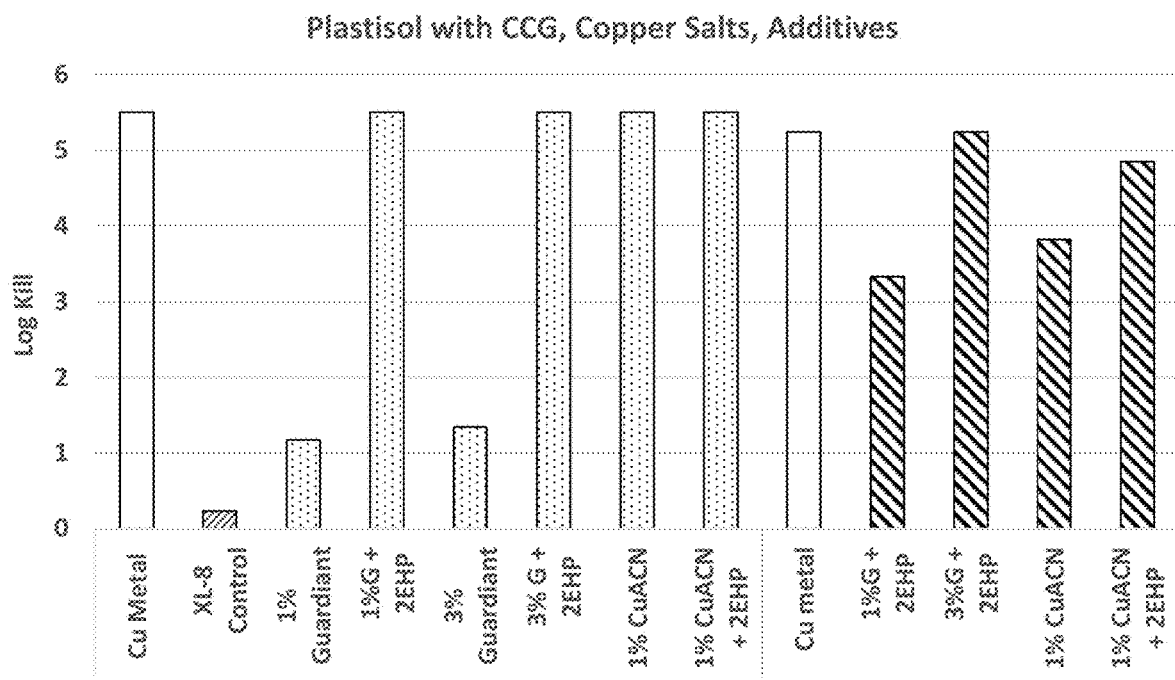
FIG. 5 illustrates a plot of antimicrobial efficacy for examples of biocidal compositions according to the present disclosure including PVC plastisol, tetrakis(acetonitrile) copper(I) hexafluorophosphate, and 2-ethylhexyl phosphate, both as initially prepared and after 4 months of storage at ambient temperature.
Figure 6:
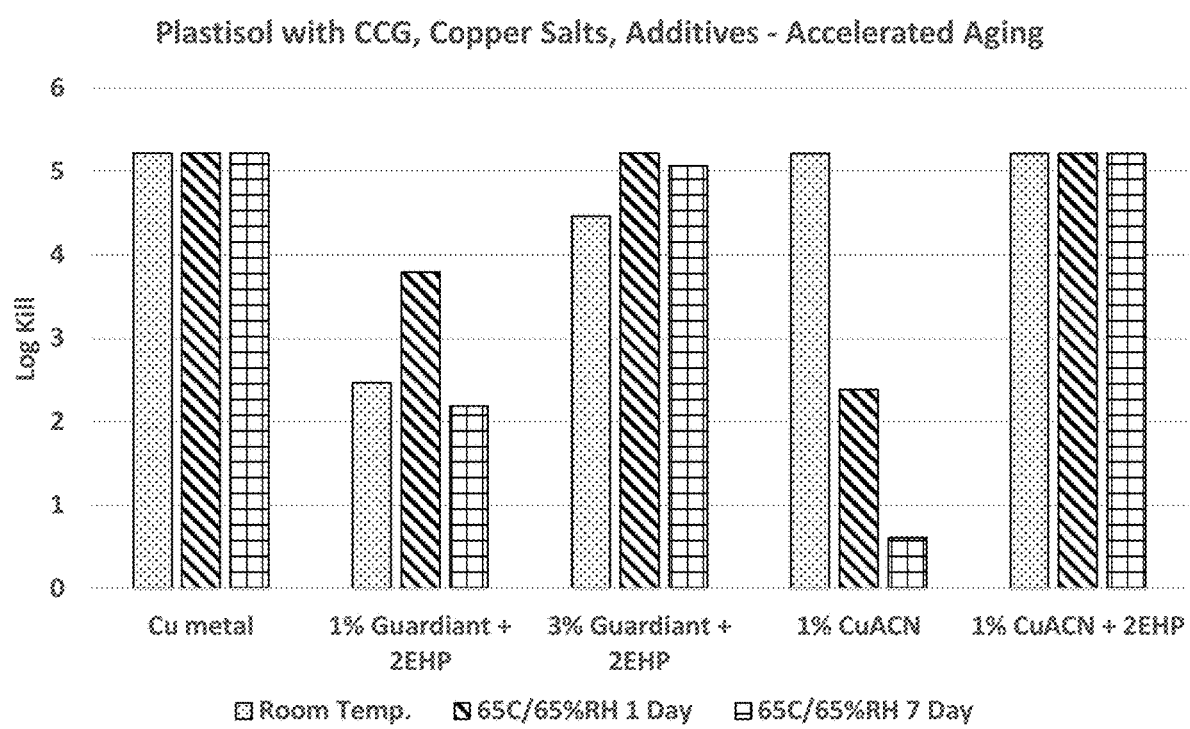
FIG. 6 illustrates a plot of antimicrobial efficacy for examples of biocidal compositions according to the present disclosure including PVC plastisol, tetrakis(acetonitrile) copper(I) hexafluorophosphate, and 2-ethylhexyl phosphate, as stored at ambient temperature and after storage for 7 days under accelerated aging conditions at 65° C. and 65% relative humidity.

Examples of biocidal compositions including PVC plastisol, tetrakis(acetonitrile)copper(I) hexafluorophosphate, and 2-EHP were evaluated for antimicrobial efficacy after 4 months of storage at ambient temperature and ambient relative humidity, and demonstrated at least 3 log kill after 4 months of storage, as illustrated in FIG. 5. Further, the biocidal compositions also demonstrated at least 3 log kill after 7 days of storage under accelerated aging conditions (65° C. and 65% relative humidity), as illustrated in FIG. 6.

B. Biocidal Composition Paint Total Color Difference (ΔE).

The ΔE values of various examples of compositions were determined according to formula (V) from biocidal compositions prepared in Behr 2050@ and PPG Diamond® paint cans using an X-Rite VS450 Non-Contact Color Measurement Instrument Spectrophotomoter:

$$\Delta E^* = \sqrt{((L^* - L^*_{control})^2 + (a^* - a^*_{control})^2 + (b^* - b^*_{control})^2)} \quad (V)$$

wherein L*, a*, and b* are the values of the examples of biocidal compositions measured after preparing ("time zero") and storing the biocidal compositions from the listed copper(I) species and copper-assisting additives below in Table 3 for 5 months (or 150 days, "time final"), and L*$_{control}$, a*$_{control}$, and b*$_{control}$ are the values of an otherwise identical composition without either the copper(I) species or the copper-assisting additive. Three spots of a film of each composition were measured, and the average reported.

TABLE 3

| Composition Elements | Time Zero a* | Time Final a* | Color Shift (Δa*) | Color Drift (Δa*) | ΔE* |
|---|---|---|---|---|---|
| Behr 2050 Formulations | | | | | |
| CuBr + PO-CF$_3$ | −1.04 | −2.24 | −0.23 | −1.2 | 1.50 |
| Copper-Containing Glass ("CCG") + PO-CF$_3$ | 0.07 | −2.10 | 0.74 | −2.03 | 6.12 |
| CuBr + TMP | −1.39 | −2.37 | −0.58 | −0.98 | 1.76 |
| CCG + TMP | −0.94 | −2.22 | −0.13 | −1.28 | 5.79 |
| CuBr + TEP | −2.07 | −2.62 | −1.26 | −0.55 | 2.15 |
| CCG + TEP | −1.27 | −2.32 | −0.46 | −1.05 | 5.74 |
| CuBr + tris(2,4-di-tert-butylphenyl)phosphite ("TDDP") | −2.04 | −3.07 | −1.23 | −1.03 | 2.89 |
| CCG + TDDP | −1.92 | −3.17 | −1.11 | −1.25 | 5.11 |
| PPG Diamond Formulations | | | | | |
| CuBr + PO-CF$_3$ | −0.75 | −4.14 | 0.04 | −3.39 | 4.08 |
| CCG + PO-CF$_3$ | 0.55 | −2.41 | −1.62 | −2.96 | 5.15 |
| CuBr + TMP | −1.32 | −3.13 | −0.53 | −1.81 | 2.58 |
| CCG + TMP | −0.55 | −2.36 | 0.24 | −1.81 | 5.85 |
| CuBr + TEP | −2.33 | −3.24 | −1.54 | −0.91 | 2.89 |
| CCG + TEP | −0.37 | −2.33 | 0.42 | −1.96 | 5.80 |
| CuBr + TDDP | −1.7 | −3.74 | −0.91 | −2.04 | 3.97 |
| CCG + TDDP | −1.58 | −3.35 | −0.79 | −1.77 | 5.15 |

CIE color data for BEHR 2050® base paint is (a*=−0.81, b*=1.7, L*=98.06, C*=1.88, h°=115.49, and Gloss=12.93) and PPG Diamond® base paint is (a*=−0.79, b*=2.06, L*=98.34, C*=2.2, h°=110.91, and Gloss=20.23). Color Shift (Δa*) values were calculated by taking the difference between the base paint a* value and the [copper(I) species+copper-assisting additive] time zero a* value. Color Drift (Δa*) values were calculated by taking the difference between the [copper(I) species+copper-assisting additive] time zero a* value and the time final a* value.

As demonstrated by Table 3, for all copper-assisting additives, the ΔE* value for each example of a biocidal composition including copper(I) bromide and one of PO—CF₃, TMP, TEP, or TDDP is lower than the ΔE* value for a corresponding composition including CCG and the respective one of PO—CF₃, TMP, TEP, or TDDP.

C. Ultraviolet Transmittance of Films Prepared from Biocidal Compositions.

Figure 8:
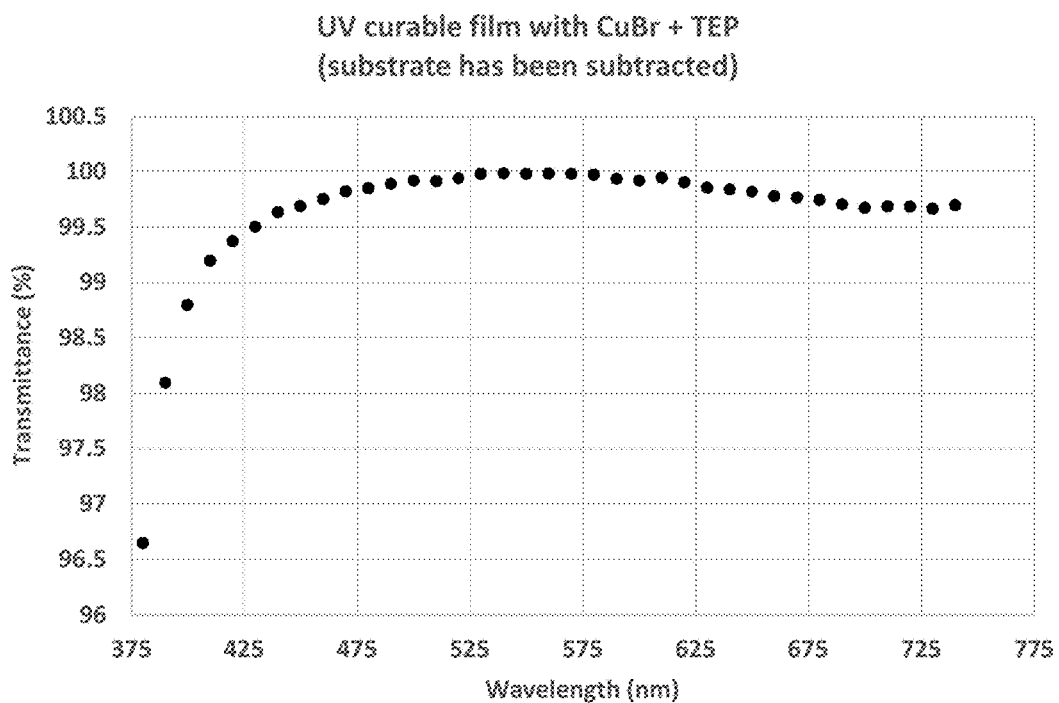
FIG. 8 illustrates a plot of % transmittance at each wavelength from 375 nanometers to 750 nanometers, of an UV curable film of a biocidal composition including copper (I) bromide and triethyl phosphite, in which the glass substrate to which the UV curable has been applied has been subtracted.

A UV curable film was prepared from an example of a biocidal composition including copper(I) bromide and triethyl phosphite. The % transmittance was measured using an x-Rite Ci7800 Spectrophotometer (D65 illuminant (daylight), 10-degree observation angle, SCI, 25 mm aperture) in the visible range of the electromagnetic spectrum, at each wavelength from 400 nanometers to 700 nanometers. The film for which % transmittance was measured had a thickness of 30 μm. The % transmittance of the glass substrate on which the UV curable film was applied was subtracted from the % transmittance of the UV curable film. As demonstrated in FIG. 8, the % transmittance for the film of a thickness of 30 μm at each wavelength from 400 to 700 nanometers was at least 98%.

D. UV-Vis Absorption of Biocidal Additive Formulations

Figure 9:
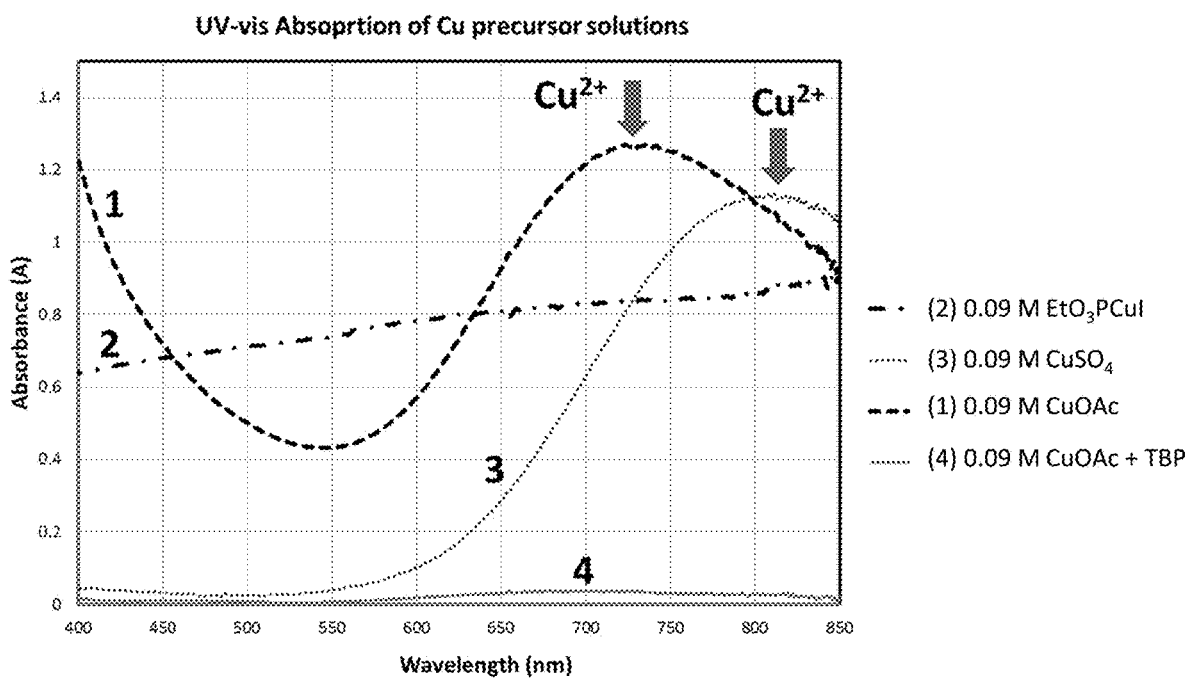
FIG. 9 illustrates a plot of UV-Vis Absorption of examples of biocidal composition precursor solutions, the absorption spectra providing an indication about the oxidation state of the copper ion in the precursor solutions.

In an example, a copper(I) molarity in an example of a biocidal additive formulation may have a molarity of from 20 mM to 200 mM; a copper-assisting additive molarity in the example of the biocidal additive formulation may have a molarity of from 0.06 mM to 0.6 mM; and a solvent molarity in the example of the biocidal additive formulation may have a molarity of from 0.8 mM to 8 mM. Optical properties may vary. In certain examples, a biocidal additive formulation may be colorless and transparent; in other examples, a biocidal additive formulation may have a slight color. An example of a biocidal additive formulation including copper(I) bromide and triethyl phosphite is colorless and has no appreciable absorption in the visible range, and would appear similar to the plot for absorption spectrum 4 illustrated in FIG. 9 (though spectrum 4 is actually data for a different additive formulation). Also illustrated in FIG. 9 is absorption data for copper(II) sulfate dissolved in water (spectrum 1); copper(I) acetate that oxidized during solubilization in water/acetonitrile (spectrum 2); and a commercial copper(I) complex in a 2:3 acetonitrile:water solution (spectrum 3).

It will be appreciated that the various disclosed aspects or examples may involve particular features, elements, or steps that are described in connection with that particular aspect or example. It will also be appreciated that a particular feature, element, or step, although described in relation to one particular aspect or example, may be interchanged or combined with alternate aspects or examples in various non-illustrated combinations or permutations.

While various features, elements, or steps of particular aspects or examples may be disclosed using the transitional phrase "comprising," it is to be understood that alternative aspects or examples, including those that may be described using the transitional phrases "consisting of" or "consisting essentially of," are implied. Thus, for example, implied alternative aspects or examples to a device that comprises A+B+C include aspects or examples where a device consists of A+B+C and aspects or examples where a device consists essentially of A+B+C.

It will be apparent to those ordinarily skilled in the art that various modifications and variations may be made to the present disclosure without departing from the spirit and scope of the disclosure. Because modifications, combinations, sub-combinations, and variations of the disclosed examples incorporating the spirit and substance of the disclosure may occur to persons ordinarily skilled in the art, the disclosure should be construed to include everything within the scope of the appended claims and their equivalents.

What is claimed is:

1. A biocidal composition, comprising:
   a carrier;
   a copper(I) salt; and
   a copper-assisting additive different from the carrier;
   wherein the copper(I) salt is copper(I) bromide;
   wherein the copper-assisting additive is trimethyl phosphite, triethyl phosphite, tris(2,2,2-trifluoroethyl) phosphite, or any combination thereof;
   wherein the copper-assisting additive promotes the persistence and/or availability of copper(I) ions; and
   wherein the biocidal composition, a film thereof, or an article thereof exhibits an antimicrobial efficacy of at least 3 log kill as measured with an EPA Test after storage of the biocidal composition or the film or article thereof at ambient temperature and ambient relative humidity for 50 days.

2. The biocidal composition of claim 1, further comprising copper(I) chloride, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof.

3. The biocidal composition of claim 1, further comprising 2-ethylhexyl phosphate, diphenyl phosphate, dibutyl phosphate, dibenzyl phosphate, tributyl phosphine, tris(3-hydroxypropyl) phosphine, 1-butyl-3-methylimidazolium chloride, 1-butyl-3-methylimidazolium bromide, or any combination thereof.

4. The biocidal composition of claim 1, wherein the biocidal composition is in a form of a paint, a coating, an elastomeric coating, a caulk, a sealant, a floor polish, a fabric treatment, a stain, a clear coat, a primer, a UV cured composition, a UV curable composition, or a plastic.

5. The biocidal composition of claim 1, wherein the carrier comprises an acrylate, a polyvinyl chloride, a latex, an organic solvent, water, or any combination thereof.

6. The biocidal composition of claim 1,
   wherein the biocidal composition or the film or article thereof exhibits the antimicrobial efficacy of at least 3 log kill after storage for 60 days.

7. The biocidal composition of claim 1,
   wherein the copper-assisting additive is triethyl phosphite; and
   wherein the biocidal composition or the film or article thereof exhibits the antimicrobial efficacy of at least 3 log kill after storage for 150 days.

8. The biocidal composition of claim 1,
   wherein the biocidal composition exhibits a ΔE of less than 6, as calculated according to $$\Delta E = \sqrt{((L^* - L^*_{control})^2 + (a^* - a^*_{control})^2 + (b^* - b^*_{control})^2)};$$

and
   wherein L*, a*, and b* are CIE values of the biocidal composition after preparing and then storing the biocidal composition at ambient temperature and ambient relative humidity for 150 days, and $L^*_{control}$, $a^*_{control}$, and b*$_{control}$ are CIE values of an otherwise identical composition without either the copper(I) salt or the copper-assisting additive.

9. A biocidal composition, comprising:
a carrier;
a copper(I) salt; and
a copper-assisting additive different from the carrier;
wherein the copper(I) salt is copper(I) bromide;
wherein the copper-assisting additive is trimethyl phosphite, triethyl phosphite, tris(2,2,2-trifluoroethyl) phosphite, or any combination thereof;
wherein the copper-assisting additive promotes the persistence and/or availability of copper(I) ions;
wherein the biocidal composition or a film thereof exhibits an antimicrobial efficacy of at least 3 log kill as measured with an EPA Test after the biocidal composition or the film thereof has been stored at ambient temperature and ambient relative humidity for 90 days; and
wherein the biocidal composition or the film or article thereof exhibits a transmittance of at least 98% as measured at each wavelength from 400 to 700 nanometers when measured at a thickness of 30 μm.

10. A film of the biocidal composition of claim 9, having a thickness of from 30 μm to 1000 μm.

11. The biocidal composition of claim 9, further comprising copper(I) chloride, copper(I) iodide, tetrakis(acetonitrile)copper(I) hexafluorophosphate, tetrakis(acetonitrile)copper(I) tetrafluoroborate, tetrakis(acetonitrile)copper(I) perchlorate, tetrakis(acetonitrile)copper(I) trifluoromethanesulfonate, tetrakis(acetonitrile)copper(I) hydrogen oxalate-oxalic acid-acetonitrile, copper(I) acetate, or any combination thereof.

12. The biocidal composition of claim 1, further comprising tributyl phosphine, tris(3-hydroxypropyl) phosphine, or any combination thereof.

13. The biocidal composition of claim 9,
wherein the biocidal composition exhibits a ΔE of less than 6, as calculated according to $$\Delta E = \sqrt{((L^* - L^*_{control})^2 + (a^* - a^*_{control})^2 + (b^* - b^*_{control})^2)};$$

wherein L*, a*, and b* are CIE values of the biocidal composition after preparing and then storing the biocidal composition at ambient temperature and ambient relative humidity for 150 days, and L*$_{control}$, a*$_{control}$, and b*$_{control}$ are CIE values of an otherwise identical composition without either the copper(I) salt or the copper-assisting additive; and
wherein the biocidal composition, or the film thereof, exhibits the antimicrobial efficacy of at least 3 log kill after storage for 150 days.

14. The biocidal composition of claim 9, wherein the biocidal composition, or the film thereof, exhibits a transmittance as measured at each wavelength from 400 to 700 nanometers that is within 10 percentage points of a second transmittance of an otherwise identical composition or film thereof without either the copper(I) salt or the copper-assisting additive when measured at a thickness of 30 μm.

15. A biocidal additive formulation, comprising a copper (I) salt and a copper-assisting additive;
wherein the copper-assisting additive is 2-ethylhexyl phosphate, triethyl phosphite, trimethyl phosphite, tris (2,2,2-trifluoroethyl) phosphite, or any combination thereof;
wherein the copper-assisting additive promotes the persistence and/or availability of copper(I) ions;
wherein a biocidal composition comprising the biocidal additive formulation and a carrier, or a film or article of the biocidal composition, exhibits an antimicrobial efficacy of at least 3 log kill as measured with an EPA Test after storage of the biocidal composition, the film thereof, or the article thereof at ambient temperature and ambient relative humidity for 1 year;
wherein the biocidal composition exhibits a ΔE of less than 6, as calculated according to $$\Delta E = \sqrt{((L^* - L^*_{control})^2 + (a^* - a^*_{control})^2 + (b^* - b^*_{control})^2)};$$

and
wherein L*, a*, and b* are CIE values of the biocidal composition after preparing and then storing the biocidal composition at ambient temperature and ambient relative humidity for 150 days, and L*$_{control}$, a*$_{control}$, and b*$_{control}$ are CIE values of an otherwise identical composition without either the copper(I) salt or the copper-assisting additive.

16. The biocidal additive formulation of claim 15, wherein the copper(I) salt is copper(I) bromide, tetrakis (acetonitril)copper(I) hexafluorophosphate, tetrakis(acetonitrile)copper(I) tetrafluoroborate, tetrakis(acetonitrile)copper (I) perchlorate, tetrakis(acetonitrile)copper(I) trifluoromethanesulfonate, tetrakis(acetonitrile)copper(I) hydrogen oxalate-oxalic acid-acetonitrile, or any combination thereof.

17. The biocidal additive formulation of claim 15,
wherein a molarity of the copper(I) salt dissolved in the biocidal additive formulation is at least 20 mM.

18. A film of the biocidal composition of claim 15, having a transmittance of at least 98% as measured at each wavelength from 400 to 700 nanometers when measured at a thickness of 30 μm.

* * * * *

UNITED STATES PATENT AND TRADEMARK OFFICE
CERTIFICATE OF CORRECTION

PATENT NO. : 12,063,933 B1
APPLICATION NO. : 18/224348
DATED : August 20, 2024
INVENTOR(S) : Chang et al.

Page 1 of 1

It is certified that error appears in the above-identified patent and that said Letters Patent is hereby corrected as shown below:

In the Claims

Claim 12, Column 63, Line 34, delete "claim 1" and insert -- claim 9 --.

Claim 16, Column 64, Lines 39-40, delete "tetrakis(acetonitril)copper(I) hexafluorophosphate" and insert -- tetrakis(acetonitrile)copper(I) hexafluorophosphate --.

Signed and Sealed this
Fourteenth Day of January, 2025

Derrick Brent
*Acting Director of the United States Patent and Trademark Office*